US012095218B2

(12) United States Patent
Cartier, Jr. et al.

(10) Patent No.: US 12,095,218 B2
(45) Date of Patent: Sep. 17, 2024

(54) HIGH DENSITY, HIGH SPEED ELECTRICAL CONNECTOR

(71) Applicant: Amphenol Corporation, Wallingford, CT (US)

(72) Inventors: Marc B. Cartier, Jr., Durham, NH (US); John Robert Dunham, Windham, NH (US); Mark W. Gailus, Concord, MA (US); John Pitten, Merrimack, NH (US)

(73) Assignee: Amphenol Corporation, Wallingford, CT (US)

( * ) Notice: Subject to any disclaimer, the term of this patent is extended or adjusted under 35 U.S.C. 154(b) by 0 days.

(21) Appl. No.: 18/339,708

(22) Filed: Jun. 22, 2023

(65) Prior Publication Data

US 2024/0097360 A1 Mar. 21, 2024

Related U.S. Application Data

(63) Continuation of application No. 17/674,631, filed on Feb. 17, 2022, now Pat. No. 11,742,601, which is a (Continued)

(51) Int. Cl.
*H01R 9/24* (2006.01)
*H01R 13/6585* (2011.01)

(52) U.S. Cl.
CPC ........... *H01R 9/24* (2013.01); *H01R 13/6585* (2013.01)

(58) Field of Classification Search
CPC ...... H01R 9/24; H01R 9/2408; H01R 9/2458; H01R 9/2466; H01R 13/6585
(Continued)

(56) References Cited

U.S. PATENT DOCUMENTS 5,895,278 A 4/1999 Humphrey
6,652,319 B1 11/2003 Billman
(Continued)

FOREIGN PATENT DOCUMENTS

CN 1224912 A 8/1999
CN 101496217 A 7/2009
(Continued)

OTHER PUBLICATIONS

Chinese Office Action dated Aug. 25, 2023 in connection with Chinese Appliation No. 202080051739.9.
(Continued)

*Primary Examiner* — Khiem M Nguyen
(74) *Attorney, Agent, or Firm* — Wolf, Greenfield & Sacks, P.C.

(57) ABSTRACT

A modular high speed, high density electrical connector configurable for use in multiple configurations, including a direct attach orthogonal configuration. The connector is assembled with modules that include shielded pairs of signal conductors with mating ends that are rotated approximately 45 degrees with respect to intermediate portions of the signal conductors. The connector may have a mating interface with receptacles in one connector and pins in the mating connector. The pins may be small diameter and may be implemented with superelastic wires so as to resist damage despite having very small effective diameter. A compact mating interface resulting from small diameter mating contact portions may enable other portions of the connector, including the shielding surrounding the signal conductors to be smaller, which may raise the resonant frequency of the connector and extend its bandwidth.

30 Claims, 24 Drawing Sheets

Related U.S. Application Data continuation of application No. 16/878,558, filed on May 19, 2020, now Pat. No. 11,289,830.

(60) Provisional application No. 62/850,391, filed on May 20, 2019.

(58) Field of Classification Search
USPC ............................................ 439/607.55, 701
See application file for complete search history.

(56) References Cited

U.S. PATENT DOCUMENTS

| | | | |
|---|---|---|---|
| 7,331,830 | B2 | 2/2008 | Minich |
| 7,354,274 | B2 | 4/2008 | Minich |
| 7,448,909 | B2 | 11/2008 | Regnier et al. |
| 7,731,537 | B2 | 6/2010 | Amleshi et al. |
| 7,744,414 | B2 | 6/2010 | Scherer et al. |
| 7,789,676 | B2 | 9/2010 | Morgan et al. |
| 7,794,278 | B2 | 9/2010 | Cohen et al. |
| D629,355 | S | 12/2010 | Bodley et al. |
| 7,914,304 | B2 | 3/2011 | Cartier et al. |
| 7,985,097 | B2 | 7/2011 | Gulla |
| 7,999,192 | B2 | 8/2011 | Chan et al. |
| 8,057,267 | B2 | 11/2011 | Johnescu |
| 8,251,745 | B2 | 8/2012 | Johnescu |
| 8,641,448 | B2 | 2/2014 | Lappoehn |
| 8,678,860 | B2 | 3/2014 | Minich et al. |
| 8,771,016 | B2 | 7/2014 | Atkinson et al. |
| D710,797 | S | 8/2014 | Awiszus et al. |
| 8,814,595 | B2 | 8/2014 | Cohen et al. |
| 8,841,560 | B1 | 9/2014 | Roberts |
| 8,889,999 | B2 | 11/2014 | Thurairajaratnam et al. |
| 9,011,172 | B2 | 4/2015 | Weber et al. |
| D749,042 | S | 2/2016 | Gecawicz et al. |
| D755,122 | S | 5/2016 | Gecawicz et al. |
| 9,450,344 | B2 | 9/2016 | Cartier, Jr. et al. |
| 9,560,741 | B2 | 1/2017 | Rose et al. |
| 9,807,869 | B2 | 10/2017 | Gailus et al. |
| D810,028 | S | 2/2018 | Lambrecht |
| 9,905,975 | B2 | 2/2018 | Cartier, Jr. et al. |
| D813,827 | S | 3/2018 | Worsham |
| 10,034,366 | B2 | 7/2018 | Gailus et al. |
| D832,792 | S | 11/2018 | Lambrecht |
| D832,794 | S | 11/2018 | Maegawa et al. |
| D832,795 | S | 11/2018 | Maegawa |
| 10,205,286 | B2 | 2/2019 | Provencher et al. |
| 10,243,307 | B2 | 3/2019 | Ljubijankic et al. |
| D850,380 | S | 6/2019 | Tabata et al. |
| D854,503 | S | 7/2019 | Gieski et al. |
| D858,439 | S | 9/2019 | Li |
| D858,453 | S | 9/2019 | Lang et al. |
| D863,227 | S | 10/2019 | Abdalla |
| D864,858 | S | 10/2019 | Clark |
| 10,446,955 | B2 | 10/2019 | Hoyack et al. |
| 10,455,689 | B2 | 10/2019 | Gailus et al. |
| D879,032 | S | 3/2020 | Yang et al. |
| D883,936 | S | 5/2020 | Chen |
| 10,707,626 | B2 | 7/2020 | Cartier, Jr. et al. |
| D892,058 | S | 8/2020 | Cartier, Jr. et al. |
| 10,849,218 | B2 | 11/2020 | Gailus et al. |
| D908,633 | S | 1/2021 | Cartier et al. |
| D919,578 | S | 5/2021 | Zarnescu |
| D928,096 | S | 8/2021 | Nakamura |
| 11,289,830 | B2 * | 3/2022 | Cartier, Jr. ......... H01R 13/6474 |
| 11,688,980 | B2 | 6/2023 | Cartier, Jr. et al. |
| 11,742,601 | B2 * | 8/2023 | Cartier, Jr. ............... H01R 9/24 439/607.55 |
| 11,950,356 | B2 | 4/2024 | Gailus et al. |
| 2006/0024983 | A1 | 2/2006 | Cohen et al. |
| 2006/0024984 | A1 | 2/2006 | Cohen et al. |
| 2009/0011641 | A1 | 1/2009 | Cohen et al. |
| 2009/0056999 | A1 | 3/2009 | Kashiwakura |
| 2009/0311908 | A1 | 12/2009 | Fogg et al. |
| 2010/0124848 | A1 | 5/2010 | Atkinson et al. |
| 2010/0178779 | A1 | 7/2010 | Davis et al. |
| 2010/0197149 | A1 | 8/2010 | Davis et al. |
| 2010/0304581 | A1 | 12/2010 | Davis et al. |
| 2011/0230096 | A1 | 9/2011 | Atkinson et al. |
| 2012/0077380 | A1 | 3/2012 | Minich et al. |
| 2012/0156929 | A1 | 6/2012 | Manter et al. |
| 2012/0214344 | A1 | 8/2012 | Cohen et al. |
| 2013/0052877 | A1 | 2/2013 | Chang et al. |
| 2013/0077268 | A1 | 3/2013 | Brunker et al. |
| 2013/0109232 | A1 | 5/2013 | Paniaqua |
| 2013/0130554 | A1 | 5/2013 | Girard et al. |
| 2013/0143442 | A1 | 6/2013 | Cohen et al. |
| 2013/0217263 | A1 | 8/2013 | Pan |
| 2013/0288539 | A1 | 10/2013 | McClellan et al. |
| 2013/0309910 | A1 | 11/2013 | Gulla |
| 2013/0316579 | A1 | 11/2013 | Nakayama et al. |
| 2014/0004724 | A1 | 1/2014 | Cartier, Jr. et al. |
| 2014/0004746 | A1 | 1/2014 | Cartier, Jr. et al. |
| 2014/0057494 | A1 | 2/2014 | Cohen |
| 2014/0209370 | A1 | 7/2014 | Minich |
| 2014/0273557 | A1 | 9/2014 | Cartier, Jr. et al. |
| 2014/0273627 | A1 | 9/2014 | Cartier, Jr. et al. |
| 2015/0236451 | A1 | 8/2015 | Cartier, Jr. et al. |
| 2016/0141807 | A1 | 5/2016 | Gailus et al. |
| 2016/0150633 | A1 | 5/2016 | Cartier, Jr. |
| 2016/0150645 | A1 | 5/2016 | Gailus et al. |
| 2016/0344141 | A1 | 11/2016 | Cartier, Jr. et al. |
| 2017/0025783 | A1 | 1/2017 | Astbury et al. |
| 2017/0358883 | A1 | 12/2017 | Chen |
| 2018/0034175 | A1 | 2/2018 | Lloyd et al. |
| 2018/0109043 | A1 | 4/2018 | Provencher et al. |
| 2018/0233858 | A1 | 8/2018 | Cartier, Jr. et al. |
| 2018/0324941 | A1 | 11/2018 | Gailus et al. |
| 2019/0044284 | A1 | 2/2019 | Dunham |
| 2019/0044285 | A1 | 2/2019 | Dunham |
| 2019/0089103 | A1 | 3/2019 | Chang et al. |
| 2019/0157797 | A1 | 5/2019 | McDowell et al. |
| 2019/0157819 | A1 | 5/2019 | Hieda |
| 2019/0181579 | A1 | 6/2019 | Ju et al. |
| 2019/0296496 | A1 | 9/2019 | Cartier, Jr. et al. |
| 2020/0022252 | A1 | 1/2020 | Gailus et al. |
| 2020/0259297 | A1 | 8/2020 | Cartier, Jr. et al. |
| 2020/0295512 | A1 | 9/2020 | Zhang |
| 2020/0373689 | A1 | 11/2020 | Cartier et al. |
| 2020/0381868 | A1 | 12/2020 | Lin et al. |
| 2021/0076486 | A1 | 3/2021 | Gailus et al. |
| 2021/0083434 | A1 | 3/2021 | Gailus et al. |
| 2021/0151939 | A1 | 5/2021 | Hsueh et al. |
| 2021/0175670 | A1 | 6/2021 | Cartier, Jr. et al. |
| 2022/0173534 | A1 | 6/2022 | Cartier, Jr. et al. |
| 2023/0113153 | A1 | 4/2023 | Gailus et al. |
| 2024/0014609 | A1 | 1/2024 | Cartier, Jr. et al. |

FOREIGN PATENT DOCUMENTS

| | | | |
|---|---|---|---|
| CN | 101916931 | A | 12/2010 |
| CN | 201709040 | U | 1/2011 |
| CN | 102106041 | A | 6/2011 |
| CN | 102157857 | A | 8/2011 |
| CN | 102265708 | A | 11/2011 |
| CN | 102356517 | A | 2/2012 |
| CN | 102405564 | A | 4/2012 |
| CN | 102448249 | A | 5/2012 |
| CN | 102570105 | A | 7/2012 |
| CN | 102760986 | A | 10/2012 |
| CN | 103151650 | A | 6/2013 |
| CN | 103296510 | A | 9/2013 |
| CN | 103491727 | A | 1/2014 |
| CN | 103857197 | A | 6/2014 |
| CN | 104040787 | A | 9/2014 |
| CN | 105655785 | A | 6/2016 |
| CN | 106463859 | A | 2/2017 |
| CN | 107112696 | A | 8/2017 |
| EP | 1530270 | B1 | 11/2006 |
| EP | 2209170 | A2 | 7/2010 |
| EP | 2259385 | A1 | 12/2010 |
| JP | 2009-037972 | A | 2/2009 |
| JP | 2014-107494 | A | 6/2014 |
| TW | D163315 | S | 10/2014 |
| TW | D163690 | S | 10/2014 |

(56) References Cited

FOREIGN PATENT DOCUMENTS

| | | | |
|---|---|---|---|
| TW | D172197 | S | 12/2015 |
| TW | D172199 | S | 12/2015 |
| TW | D192838 | S | 9/2018 |
| TW | I635676 | B | 9/2018 |
| WO | WO 2009/023238 | A1 | 2/2009 |
| WO | WO 2010/111379 | A2 | 9/2010 |
| WO | WO 2014/105435 | A1 | 7/2014 |

OTHER PUBLICATIONS

Extended European Search Report dated May 31, 2023 in connection with European Application No. 20809681.8.

International Search Report and Written Opinion in connection with International Application No. PCT/US2020/033561, mailed Sep. 21, 2020.

Taiwanese Office Action dated Nov. 6, 2023 in connection with Taiwanese Appliation No. 109116581.

[No Author Listed], Zipline Connector System, http://www.slideshare.net/element14/zipline-connector-system Mar. 10, 2011. Last accessed Oct. 12, 2015. 15 pages.

[No Author Listed], Strada Whisper High Speed Backplane Connector System. Tyco Electronics. Presentation. Mar. 24, 2010. 15 pages.

[No Author Listed], Strada Whisper Connector Daughtercard Footprint. Tyco Electronics, Mar. 24, 2010, 1 page.

[No Author Listed], SFF-8643 Specification for Mini Multilane 12 Gbs 8/4x Unshielded Connector, Rev 2.3. SFF Committee, Jan. 11, 2011, 24 pages.

[No Author Listed], ExaMAX™ Connector System, press-fit products. FCI Application Specification No. GS-20-0361. Preliminary. Revision 6. Mar. 12, 2014. 25 pages.

[No Author Listed], Aseries Family. Plastic & Metal Rectangular & Circular Connectors—Heavy Duty. Amphenol. 2019. 7 pages. URL:https://www.amphenol-sine.com/a-series-connectors [retrieved on Feb. 13, 2020].

[No Author Listed], Spring Loaded Connectors. Amphenol. 2 pages. URL:https://www.amphenol.com/node/3996 [retrieved on Feb. 13, 2020].

Gailus et al., Mating Backplane For High Speed, High Density Electrical Connector, U.S. Appl. No. 18/583,199, filed Feb. 21, 2024.

* cited by examiner

HIGH DENSITY, HIGH SPEED ELECTRICAL CONNECTOR

CROSS-REFERENCE TO RELATED APPLICATIONS

This application is a continuation of U.S. application Ser. No. 17/674,631, filed on Feb. 17, 2022, entitled "HIGH DENSITY, HIGH SPEED ELECTRICAL CONNECTOR," which is a continuation of U.S. application Ser. No. 16/878,558, filed on May 19, 2020, entitled "HIGH DENSITY, HIGH SPEED ELECTRICAL CONNECTOR," which claims the benefit under 35 U.S.C. § 119(e) of U.S. Provisional Patent Application Ser. No. 62/850,391, filed on May 20, 2019, entitled "HIGH DENSITY, HIGH SPEED ELECTRICAL CONNECTOR," which is hereby incorporated herein by reference in its entirety.

BACKGROUND

This patent application relates generally to interconnection systems, such as those including electrical connectors, used to interconnect electronic assemblies.

Electrical connectors are used in many electronic systems. It is generally easier and more cost effective to manufacture a system as separate electronic assemblies, such as printed circuit boards ("PCBs"), which may be joined together with electrical connectors. A known arrangement for joining several printed circuit boards is to have one printed circuit board serve as a backplane. Other printed circuit boards, called "daughterboards" or "daughtercards," may be connected through the backplane.

A known backplane is a printed circuit board onto which many connectors may be mounted. Conducting traces in the backplane may be electrically connected to signal conductors in the connectors so that signals may be routed between the connectors. Daughtercards may also have connectors mounted thereon. The connectors mounted on a daughtercard may be plugged into the connectors mounted on the backplane. In this way, signals may be routed among the daughtercards through the backplane. The daughtercards may plug into the backplane at a right angle. The connectors used for these applications may therefore include a right angle bend and are often called "right angle connectors."

Connectors may also be used in other configurations for interconnecting printed circuit boards. Some systems use a midplane configuration. Similar to a backplane, a midplane has connectors mounted on one surface that are interconnected by routing channels within the midplane. The midplane additionally has connectors mounted on a second side so that daughter cards are inserted into both sides of the midplane.

The daughter cards inserted from opposite sides of the midplane often have orthogonal orientations. This orientation positions one edge of each printed circuit board adjacent the edge of every board inserted into the opposite side of the midplane. The traces within the midplane connecting the boards on one side of the midplane to boards on the other side of the midplane can be short, leading to desirable signal integrity properties.

A variation on the midplane configuration is called "direct attach." In this configuration, daughter cards are inserted from opposite sides of the system. These boards likewise are oriented orthogonally so that the edge of a board inserted from one side of the system is adjacent to the edges of the boards inserted from the opposite side of the system. These daughter cards also have connectors. However, rather than plug into connectors on a midplane, the connectors on each daughter card plug directly into connectors on printed circuit boards inserted from the opposite side of the system.

Connectors for this configuration are sometimes called orthogonal connectors. Examples of orthogonal connectors are shown in U.S. Pat. Nos. 7,354,274, 7,331,830, 8,678,860, 8,057,267 and 8,251,745.

BRIEF SUMMARY

Embodiments of a high density, high speed electrical connector and associated modules and assemblies are described. In accordance with some embodiments, a connector module may comprise a pair of signal conductors, the pair of signal conductors comprising a pair of mating ends, a pair of contact tails and a pair of intermediate portions connecting the pair of mating ends to the pair of contact tails, the pair of mating ends being elongated in a direction that is at a right angle relative to a direction in which the pair of contact tails are elongated, the mating ends of the pair of mating ends being separated in a direction of a first line, the intermediate portions of the pair of intermediate portions being separated in a direction of a second line, and the first line being disposed at an angle greater than 0 degrees and less than 90 degrees relative to the second line.

In accordance with some embodiments, a wafer may comprise a plurality of signal conductor pairs, each signal conductor pair comprising a pair of mating ends, a pair of contact tails and a pair of intermediate portions connecting the pair of mating ends to the pair of contact tails, the pairs of mating ends of the plurality of signal conductor pairs being positioned in a column along a column direction, the intermediate portions of the pairs of intermediate portions of the plurality of signal conductor pairs being aligned in a direction perpendicular to the column direction and positioned for broadside coupling, and the mating ends of the plurality of signal conductor pairs being separated along lines disposed at an angle of greater than 0 degrees and less than 90 degrees relative to the column direction.

In accordance with some embodiments, a connector may comprise a plurality of signal conductor pairs, where, for each signal conductor pair of the plurality of signal conductor pairs, the signal conductor pair comprises a pair of mating ends, a pair of contact tails, and a pair of intermediate portions connecting the pair of mating ends to the pair of contact tails, the signal conductor pair further comprises a transition region between the pair of mating ends and the pair of intermediate portions, the pairs of mating ends of the plurality of signal conductor pairs are disposed in an array comprising a plurality of rows, the plurality of rows extending along a row direction and spaced from each other in a column direction perpendicular to the row direction, the pairs of mating ends of the plurality of signal conductor pairs are aligned along first parallel lines that are disposed at an angle of greater than 0 degrees and less than 90 degrees relative to the row direction, and, for each signal conductor pair of the plurality of signal conductor pairs, within the transition region, a relative position of the signal conductors of the signal conductor pair varies such that, at a first end of the transition region adjacent the mating end, the signal conductors are aligned along a line of the first parallel lines and at a second end of the transition region the signal conductors are aligned in the row direction.

In accordance with some embodiments, a connector module may comprise an insulative member and a pair of signal conductors held by the insulative member, each signal conductor of the pair of signal conductors comprises a first portion at a first end, a second portion at a second end extending from the insulative portion and an intermediate portion disposed between the first and second ends, and the first portion comprises a wire with a diameter between 5 and 20 mils.

In accordance with some embodiments, an extender module may comprise a pair of signal conductors, each signal conductor of the pair of signal conductors comprising a first portion at a first end and a second portion at a second end and electromagnetic shielding at least partially surrounding the pair of signal conductors, the first portions of the pair of signal conductors being configured as mating portions and are positioned along a first line, and the second portions of the pair of signal conductors being configured to compress upon insertion into a hole and are positioned along a second line parallel to the first line.

In accordance with some embodiments, a connector may comprise an insulative portion, a plurality of signal conductors held by the insulative portion, and a plurality of shielding members, the plurality of signal conductors comprising elongated mating portions extending from the insulative portion, the plurality of signal conductors comprising a plurality of pairs of signal conductors disposed in a plurality of rows extending in a row direction, the plurality of shielding members at least partially surrounding pairs of the plurality of pairs, and the mating portions of the plurality of pairs being separated along first parallel lines disposed an angle of 45 degrees relative to the row direction.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
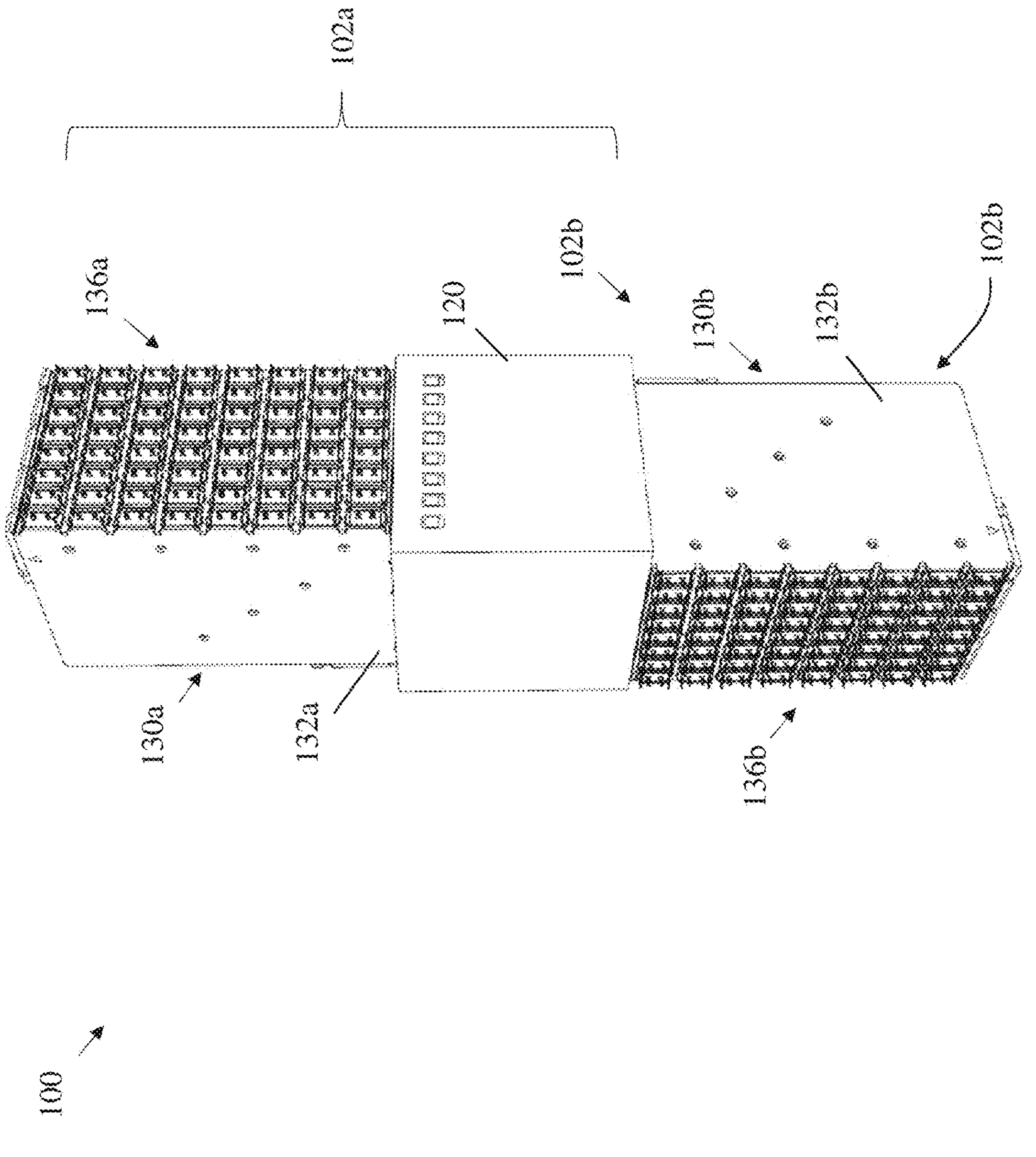
FIG. 1 is a perspective view of mated, direct attach orthogonal connectors, in accordance with some embodiments.

The inventors have developed techniques for making electrical connectors for high speed signals and having high density and that can be manufactured with low cost. These techniques include arrangements of mating interfaces to simply support multiple configurations, including right angle or direct mate orthogonal system configurations or system configurations with cabled connections to mid-board components. The configurations also may provide signal paths with low mode conversion and reduce other electrical effects that may impact signal integrity.

The inventors have recognized and appreciated that electrical connectors with angled mating interfaces (e.g., with mating ends of pairs of signal conductors twisted with respect to intermediate portions of the signal conductors) provide enhanced flexibility in making connections between connectors having direct mate orthogonal, backplane, or other configurations. Such an angled mating interface may be created, for example, in a connector in which signal conductors are routed in pairs and the mating ends of a pair are separated along a first line and the intermediate portions of the pair are separated along a second line that makes an angle more than 0 degrees but less than 90 degrees relative to the first line. Two connectors with similar angled interfaces may be used as part of a direct mate orthogonal connector system. Such connectors may be mated via extender modules that have straight-through signal paths, which are easy to manufacture. As a result of this use of similar, or even identical, connectors that are mated via simple extender modules, the cost of the interconnection system may be low.

In some embodiments, the angled interfaces of two mating connectors may be angled at the same angle with respect to a normal to the mating face of the connector. In some embodiments, the angles of the two mating connectors may have the same magnitude but may be in the opposite direction. The specific angle and direction for each connector may depend on the system configuration. As a specific example, for connectors designed for direct mate orthogonal configurations, the mating connectors may both have mating interfaces angled at 45 degrees in clockwise direction. For a parallel board configuration, the mating connectors may both have mating interfaces angled at 45 degrees, but in one direction the angle may be in a clockwise direction and in the other connector, the mating interface may be angled in a counter-clockwise direction. These angles may be described as 45 degrees and 135 degrees respectively, where the angle of both connectors is measured in a clockwise direction.

An interconnection system as described herein may provide for high signal integrity, as mode conversion may be low as a result of limiting twists in pairs of signal paths to be less than 90 degrees. The inventors have also recognized and appreciated that using connectors with angled mating interfaces reduces the angular amount of twist of the conductors of a signal pair over a signal path, which enables the rate of angular twist to be low. Lowering the rate of angular twist improves integrity of signals carried by the connector system by reducing skew and/or mode conversion associated with the twist, even in a miniaturized connector. The resulting rate of angular twist in at least one transition region may be about 45 degrees per 1.5 mm or less, in some embodiments, which may provide low mode conversion in the transition region. In some embodiments, the rate of angular twist in a transition region between intermediate portions of signal conductors, which may be aligned broadside to broadside, and mating interface portions of the signal conductors may be, for example, in a range of 45 to 90 degrees per mm or 45 to 80 degrees per mm.

An angled interface may also enable simple designs of extender modules that may be attached to a connector to alter the position, orientation or mating contact type of the mating interface of the connector. Such extender module designs allow for a single type of connector to be used on both sides of an interconnect system, with extender modules providing an interface between the connectors. The extender modules may have signal conductors that pass through the module without a twist, which enables the extender module to be substantially encircled by a shield formed from one sheet, or a small number of sheets, of metal that may be cut and folded to partially or fully surround the module.

These techniques also include the use of thin signal conductors in portions of the connector, such as in the mating interface and/or mounting interface. As a result, ground conductors, such as may be used to provide shielding around signal conductors or pairs of signal conductors, may bound small cavities that contain signal conductors or signal conductor pairs. As a result of the small cavities, resonances, which might interfere with high integrity operation of the connector, occur at a high frequency, which may be outside the desired operating frequency range of the connector. In some embodiments, the ground conductor surrounding a signal pair may bound a cavity that has a rectangular cross section and the longer dimension of that cavity may be reduced so as to increase the frequency of the lowest frequency resonance supported by that cavity. In some embodiments, thin signal conductors may be implemented with superelastic conductive materials. At least the mating contact portions of the signal conductors may be formed of superelastic conductive materials, such as superelastic wires, which may have small diameters but suitable mechanical integrity.

The inventors have recognized and appreciated that the shape and location of features in electromagnetic shields, including near mating ends of signal conductor pairs, may reduce impedance discontinuities associated with variability in spacing between mated connectors. Such features may include inwardly projecting portions of a shield adjacent the mating ends.

These techniques may be used separately or together, in any suitable combination. As a result of the improved electrical properties achieved by these techniques, electrical connectors described herein may be configured to operate with high bandwidth for a high data transmission rate. For example, electrical connectors described herein may operate at 40 GHz or above and may have a bandwidth of at least 50 GHz, such as a frequency up to and including 56 GHz and/or a bandwidth in the range of 50-60 GHz. Such electrical connectors may pass data at rates up to 112 Gb/s, for example.

Figure 2B:
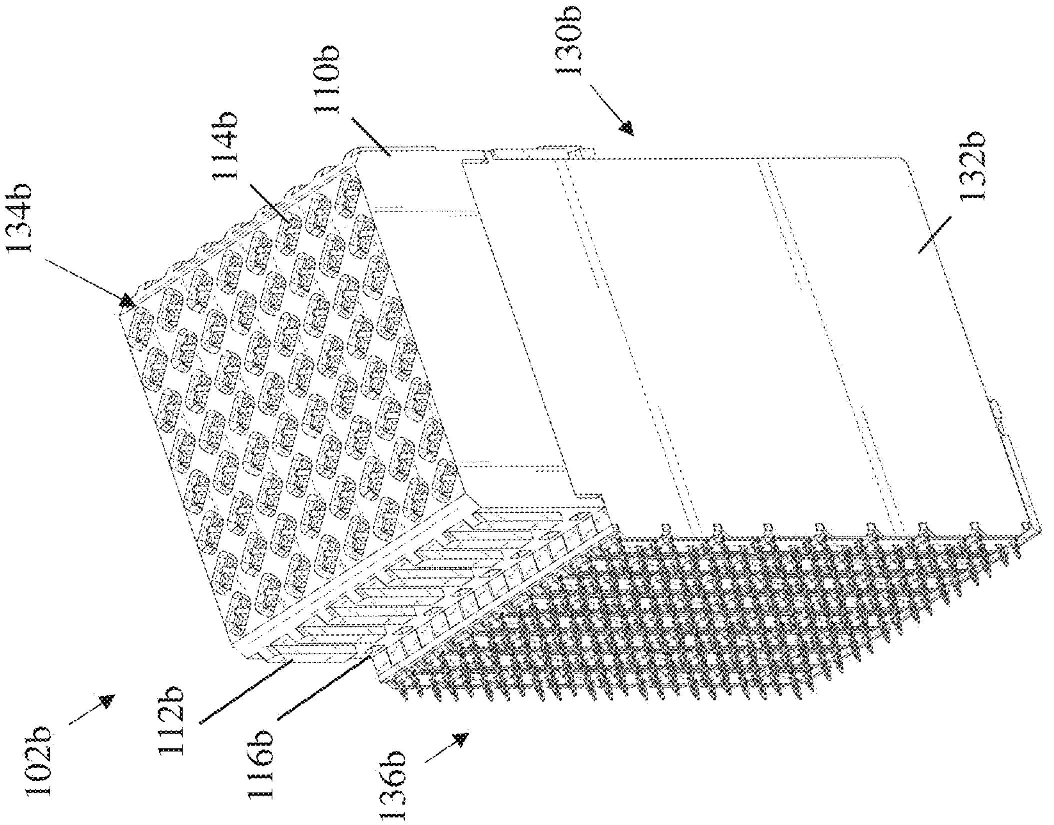
FIG. 2B is a perspective view of electrical connector 102*b* of FIG. 1.
Figure 2A:
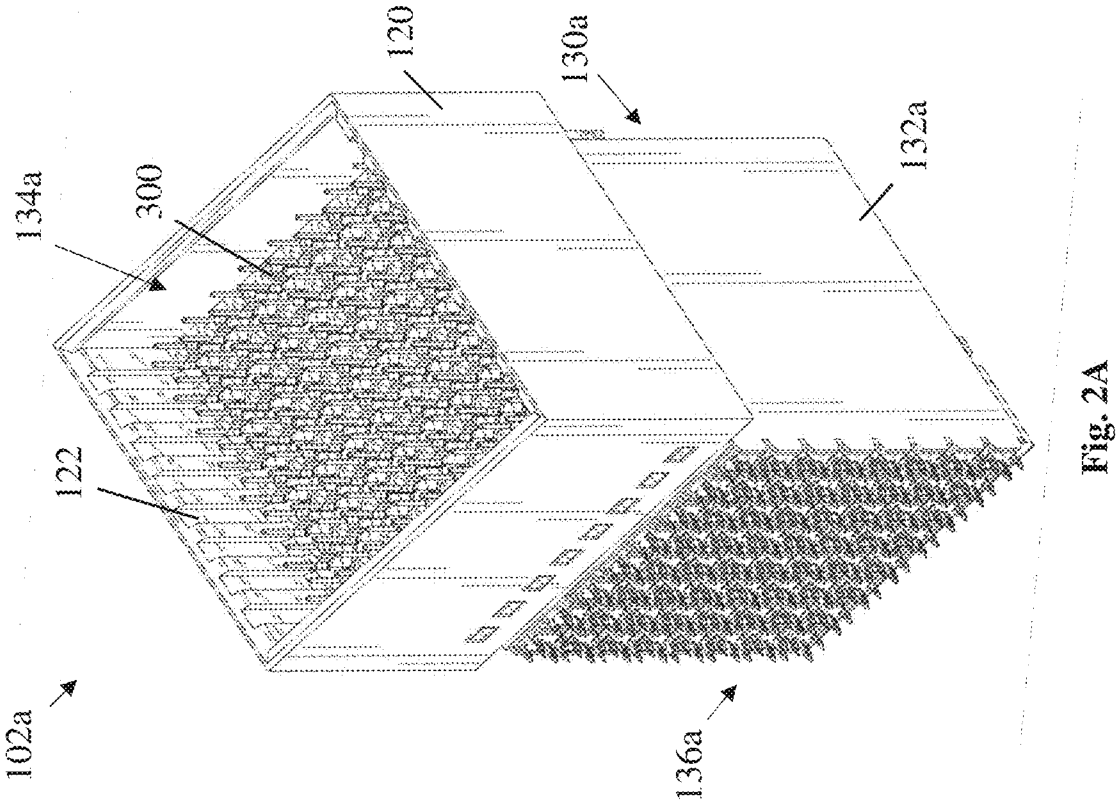
FIG. 2A is a perspective view of electrical connector 102*a* of FIG. 1 having extender modules.

Turning to the figures, FIGS. 1 and 2A-B illustrate electrical connectors of an electrical interconnect system in accordance with some embodiments. FIG. 1 is a perspective view of electrical interconnect system 100 including first and second mated connectors, here configured as direct attach orthogonal connectors 102*a* and 102*b*. FIG. 2A is a perspective view of electrical connector 102*a*, and FIG. 2B is a perspective view of electrical connector 102*b*, showing mating interfaces and mounting interfaces of those connectors. In the embodiment illustrated, the mating interfaces are complementary such that connector 102*a* mates with connector 102*b*. The mounting interfaces, in the embodiment illustrated, are similar, as each comprises an array of press fit contact tails configured for mounting to a printed circuit board.

Electrical connectors 102*a* and 102*b* may be manufactured using similar techniques and materials. For example, electrical connector 102*a* and 102*b* may include wafers 130 that are substantially the same. Electrical connectors 102*a* and 102*b* having wafers 130 that may be manufactured and/or assembled in a same process may have a low manufacturing cost.

In the embodiment illustrated in FIG. 1, first connector 102*a* includes first wafers 130*a*, including one or more individual wafers 130 positioned side-by-side. Wafers 130 are described herein, including with reference to FIG. 10A. Wafers 130 include one or more connector modules 200, described further herein, including with reference to FIG. 10B.

Wafers 130 also include wafer housings 132*a* that hold the connector modules 200. The wafers are held together, side-by-side, such that contact tails extending from the wafers 130 of first connector 102*a* form first contact tail array 136*a*. Contact tails of first contact tail array 136*a* may be configured for mounting to a substrate, such as substrate 104*c* described in connection with FIG. 3A. For example, first contact tail array 136 may be configured for press-fit insertion, solder mount, or any other mounting configuration, either for mounting to a printed circuit board or to conductors within an electrical cable.

In the illustrated embodiment, first connector 102*a* includes extender housing 120, within which are extender modules 300, described further herein including with reference to FIG. 2A. In the illustrated embodiment, first connector 102*a* includes signal conductors that have contact tails forming a portion of first contact tail array 136*a*. The signal conductors have intermediate portions joining the contact tails to mating ends. In the illustrated embodiment, the mating ends are configured to mate with further signal conductors in the extender modules 300. The signal conductors in extender modules 300 likewise have mating ends, which form the mating interface of connector 102*a* visible in FIG. 2A. Ground conductors similarly extend from wafers 130*a*, through the extender modules 300, to the mating interface of connector 102*a* visible in FIG. 2A.

Second connector 102*b* includes second wafers 130*b*, including one or more wafers 130 positioned side-by-side. Wafers 130 of second wafers 130*b* may be configured as described for first wafers 130*a*. For example, wafers 130 of second wafers 130*b* have wafer housings 132*b*. Additionally, second contact tail array 136*b* of second connector 102*b* is formed of contact tails of conductive elements within second wafers 130*b*. As with first contact tail array 136*a*, second contact tail array 136*b* may be configured for press-fit insertion, solder mount, or any other mounting configuration, either for mounting to a printed circuit board or to conductors within an electrical cable.

As shown in FIG. 1, first contact tail array 136*a* faces a first direction and second contact tail array 136*b* faces a second direction perpendicular to the first direction. Thus, when first contact tail array 136*a* is mounted to a first substrate (such as a printed circuit board) and second contact tail array 136*b* is mounted to substrate 104*d*, surfaces of the first and second substrates may be perpendicular to one another. Additionally, first connector 102*a* and second connector 102*b* mate along a third direction perpendicular to each of the first and second directions. During the process of mating first connector 102*a* with second connector 102*b*, one or both of first and second connectors 102*a* and 102*b* move towards the other connector along the third direction.

Figure 21A:
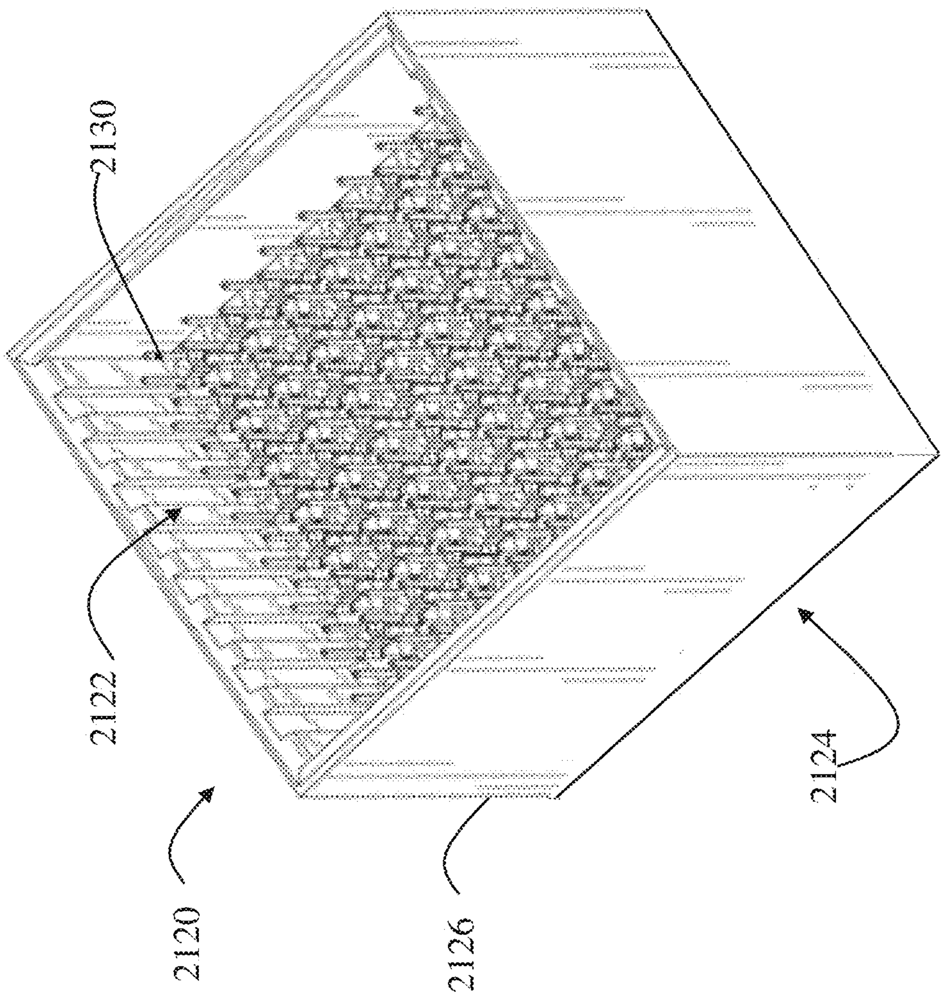
FIG. 21A is a perspective view of a header connector.

It should be appreciated that, while first and second electrical connectors 102*a* and 102*b* are shown in a direct attach orthogonal configuration in FIG. 1, connectors described herein may be adapted for other configurations. For example, connectors illustrated in FIGS. 3C to 3D have mating interfaces angled in opposite directions and may be used for a co-planar configuration. FIG. 21 illustrates that construction techniques as described herein may be used in a backplane, midplane, or mezzanine configuration. However, it is not a requirement that the mating interface be used in board to board configuration. FIG. 22 illustrates that some or all of the signal conductor's within a connector may be terminated to cables, creating a cable connector or hybrid cable connector. Other configurations are also possible.

As shown in FIG. 2A, first electrical connector 102*a* also includes extender modules 300, which provide a mating interface for first connector 102*a*. For example, mating portions of extender modules 300 form first mating end array 134*a*. Additionally, extender modules 300 may be mounted to connector modules 200 of first wafers 130*a*, as described further herein including with reference to FIG. 17A. Extender housing 120 holds extender modules 300, surrounding at least a portion of the extender modules 300. Here, extender housing 120 surrounds the mating interface and includes grooves 122 for receiving second connector 102*b*. Extender housing 120 also includes apertures through which extender modules 300 extend, as described herein including with reference to FIG. 4.

As shown in FIG. 2B, second electrical connector 102*b* has a front housing 110*b* shaped to fit within an opening in extender housing 120. Second wafers 130*b* are attached to front housing 110*b*, as described further herein, including with reference to FIG. 6.

Front housing 110*b* provides a mating interface for second connector 102*b*. For example, front housing 110*b* includes projections 112 which are configured to be received in grooves of extender housing 120. Mating ends of signal conductors of wafers 130*b* are exposed within apertures 114*b* of front housing 110*b*, forming second mating end array 134*b*, such that the mating ends may engage with signal conductors of the wafers 130*a* of first connector 102*a*. For example, extender modules 300 extend from first connector 102*a* and may be received by the pairs of signal conductors of second connector 102*b*. Ground conductors of wafers 130*b* are similarly exposed within apertures 114*b* and may similarly mate with ground conductors in the extender modules 300, which in turn are connected to ground conductors in wafers 130*a*.

In FIGS. 2A-B, first connector 102*a* is configured to receive second connector 102*b*. As illustrated, grooves 122 of extender housing 120 are configured to receive projections of front housing 110*b*. Additionally, apertures 114*b* are configured to receive mating portions of extender modules 300.

It should be appreciated that second wafers 130*a* of first connector 102*a* and second wafers 130*b* of second connector 102*b* may be substantially identical, in some embodiments. For example, first connector 102*a* may include front housing 110*a*, which may receive wafers from one side, and which may be configured similarly to a corresponding side of front housing 110*b*. An opposite side of front housing 110*a* may be configured for attachment to extender housing 120 such that front housing 110*a* is disposed between first wafers 130*a* and extender housing 120. Front housing 110*a* is described further herein, including with reference to FIG. 4.

Front housing 110*b* may be configured to mate with extender housing 120. In some embodiments, extender housing 120 may be configured such that features that might latch to features if inserted into one side of extender housing 120 would slide in an out, to support separable mating, if inserted in an opposite side of extender housing 120. In such a configuration the same component could be used for front housing 110*a* or front housing 110*b*. The inventors have recognized and appreciated that using extender modules to interface between identical connectors allows for manufacturing of a single type of connector to be used on each side of an electrical interconnect system, thus reducing a cost of producing the electrical interconnect system. Even if front housing 110*a* and front housing 110*b* are shaped differently to support either a fixed attachment to extender housing 120 or a sliding engagement to extender housing 120, efficiencies are achieved by using wafers that can be made with the same tooling in both connectors 102*a* and 102*b*. Similar efficiencies may be achieved in other configurations, for example, if front housing 110*a* and extender housing 120 are made as a single component.

Electrical connectors as described herein may be formed with different numbers of signal conductors than shown in FIGS. 2A and 2B. FIG. 3A is a front view of third electrical connector 102*c* mounted to substrate 104*c* and having extender housing 120*c*, in accordance with an alternative embodiment. Although third electrical connector 102*c* is illustrated having fewer signal pairs than first electrical connector 102*a*, third electrical connector 102*c* may be otherwise assembled using components as described with reference to first electrical connector 102*a*. For example, electrical connector 102*c* may be assembled from extender housing 120*c* and third wafers 130*c* having third mating end array 134*c* and third contact tail array 136*c*, which may be configured in the manner described herein with reference to extender housing 120, first wafers 130*a*, first mating end array 134*a*, and first contact tail array 136*a*.

In FIG. 3A, third electrical connector 102*c* is mounted to substrate 104*c*. For example, third connector 102*c* may be a right angle connector mounted adjacent an edge of substrate 104*c*. In some embodiments, substrate 104*c* may comprise a printed circuit board. In the illustrated embodiment of FIG. 3A, pairs of contact tails of third contact tail array 136*c* are mounted to substrate 104*c*. In some embodiments, contact tails of third contact tail array 136*c* are configured for inserting into holes in substrate 104*c*. In some embodiments, contact tails of third contact tail array 136*c* are configured for mounting onto pads on substrate 104*c*, such as by surface mount soldering techniques.

In the illustrated embodiment, pairs of mating ends of third mating end array 134*c* are connected along parallel lines 138*c* and are disposed at a 45 degree angle relative to each of mating column direction 140*c* and mating row direction 142*c*.

Figure 3B:
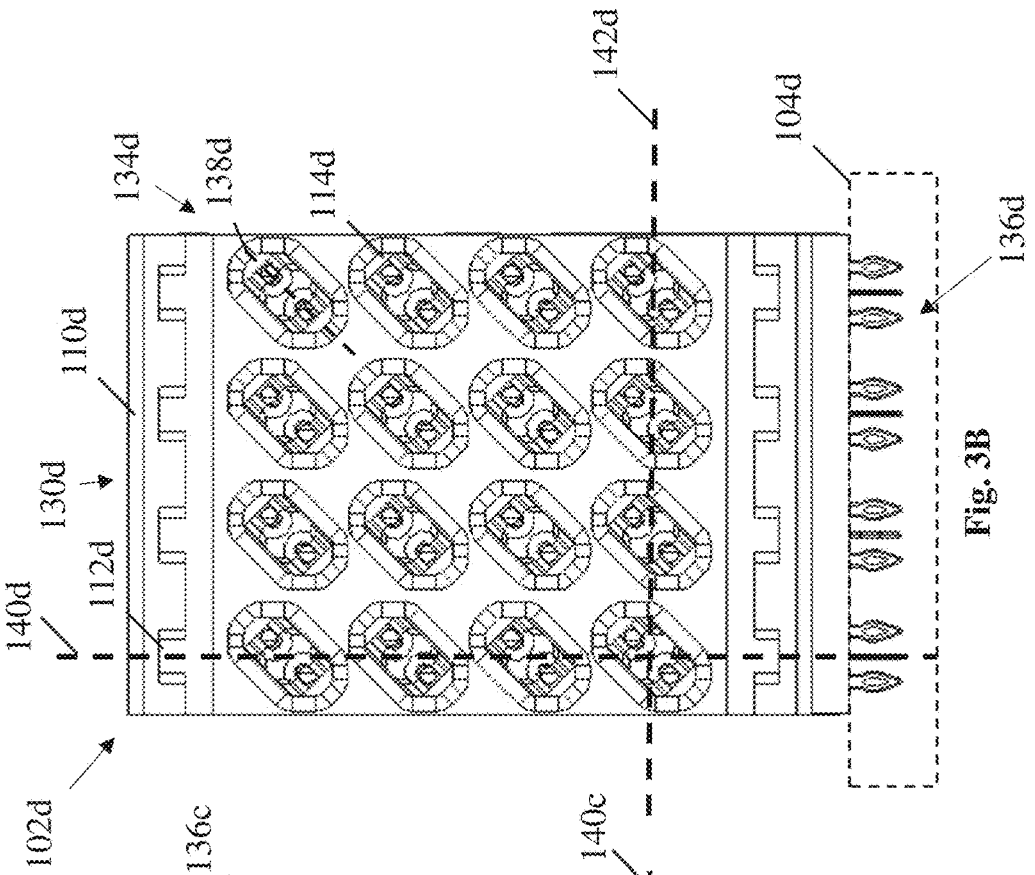
FIG. 3B is a front view of an electrical connector configured to mate with the connector of FIG. 3A.
Figure 3A:
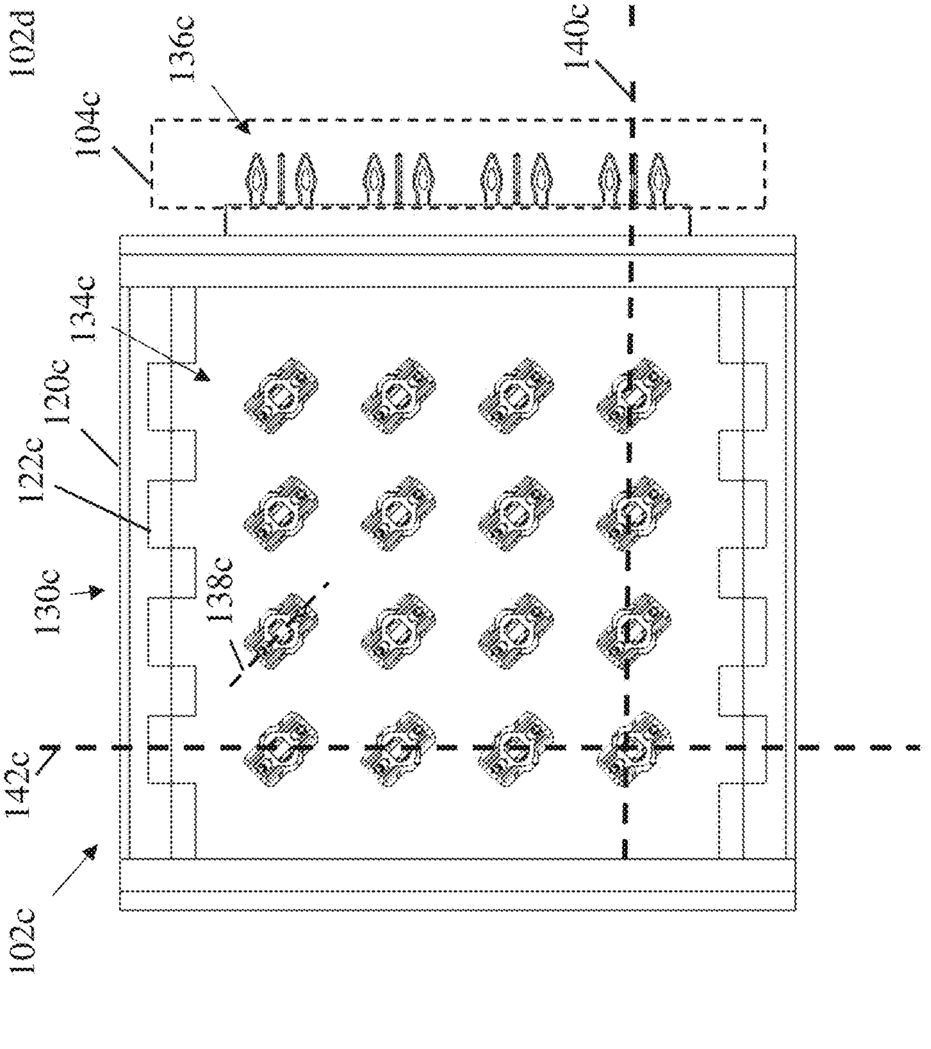
FIG. 3A is a front view of an electrical connector having an extender module assembly, in accordance with an alternative embodiment.

FIG. 3B is a front view of fourth electrical connector 102*d* configured to mate with third connector 102*c* illustrated in FIG. 3A. Although fourth electrical connector 102*d* is illustrated having fewer signal pairs than second electrical connector 102*b*, fourth electrical connector 102*d* may be otherwise configured in the manner described with reference to second electrical connector 102*d*. For example, electrical connector 102*d* may be assembled from front housing 110*d* and fourth wafers 130*d* having fourth mating end array 134*d* and fourth contact tail array 136*d*. These components may be configured in the manner described herein with reference to front housing 110*b*, second wafers 130*b*, second mating end array 134*b*, and second contact tail array 136*b*.

In FIG. 3B, fourth electrical connector 102*d* is mounted to substrate 104*d*. In some embodiments, fourth connector 102*d* comprises an edge connector mounted adjacent an edge of substrate 104*d*. Substrate 104*d* may comprise a printed circuit board. Contact tails of fourth contact tail array 136*d* are mounted to substrate 104*d*. In some embodiments, contact tails of fourth contact tail array 136*d* are configured for inserting into holes in substrate 104*d*. In some embodiments, contact tails of fourth contact tail array 136*d* are configured for mounting onto pads on substrate 104*d*, such as by solder mount.

Front housing 110*d* includes apertures 114*d* in which mating ends of pairs of signal conductors of fourth wafers 130*d* are positioned, enabling signal conductors from connector 102*c* inserted into apertures 114*d* to mate with the signal conductors of fourth wafers 130*d*. Ground conductors of fourth wafers 130*d* are similarly exposed within apertures 114*d* for mating with ground conductors from connector 102*c*.

Fourth mating end array 134*d* comprises rows extending along row direction 142*d* and spaced from each other in column direction 140*d* perpendicular to row direction 142*d*. Pairs of mating ends of fourth mating end array 134*d* are aligned along parallel lines 138*d*. In the illustrated embodiment, parallel lines 138*a* are disposed at an angle of 45 degrees relative to row direction 142*d*.

In the illustrated embodiment, mating ends of signal conductors of the second wafers are connected along parallel lines 138*d* disposed at a 45 degree angle relative to each of mating column direction 140*d* and mating row direction 142*d*.

Figure 3D:
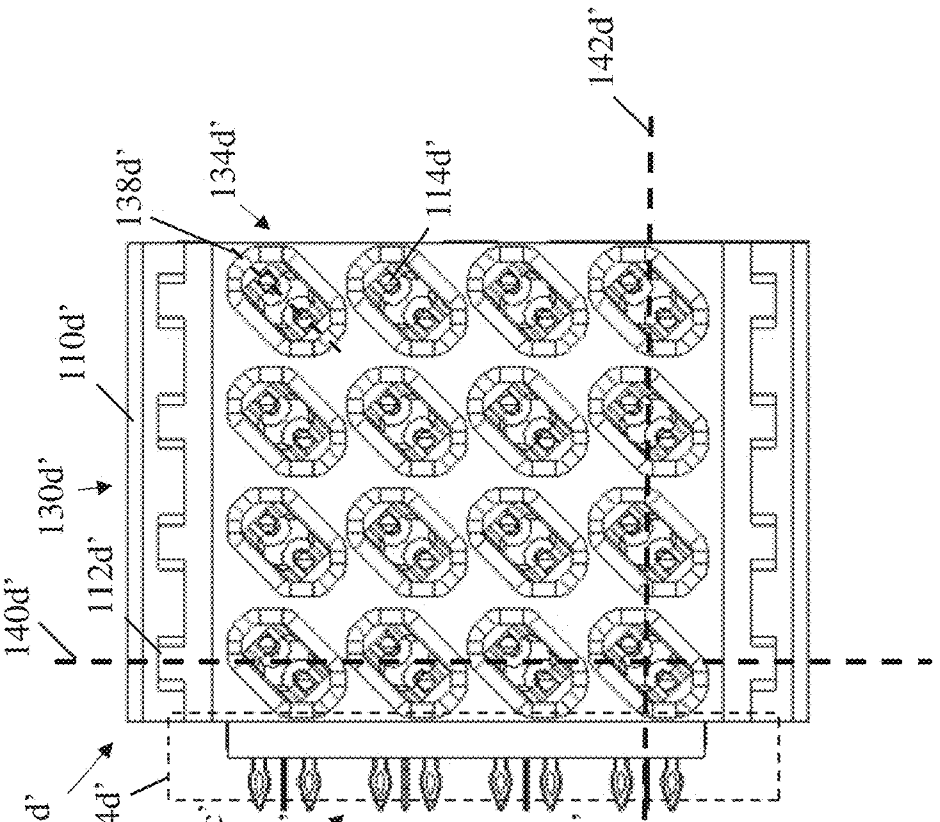
FIG. 3D is a front view of an electrical connector configured to mate with the connector of FIG. 3C.
Figure 3C:
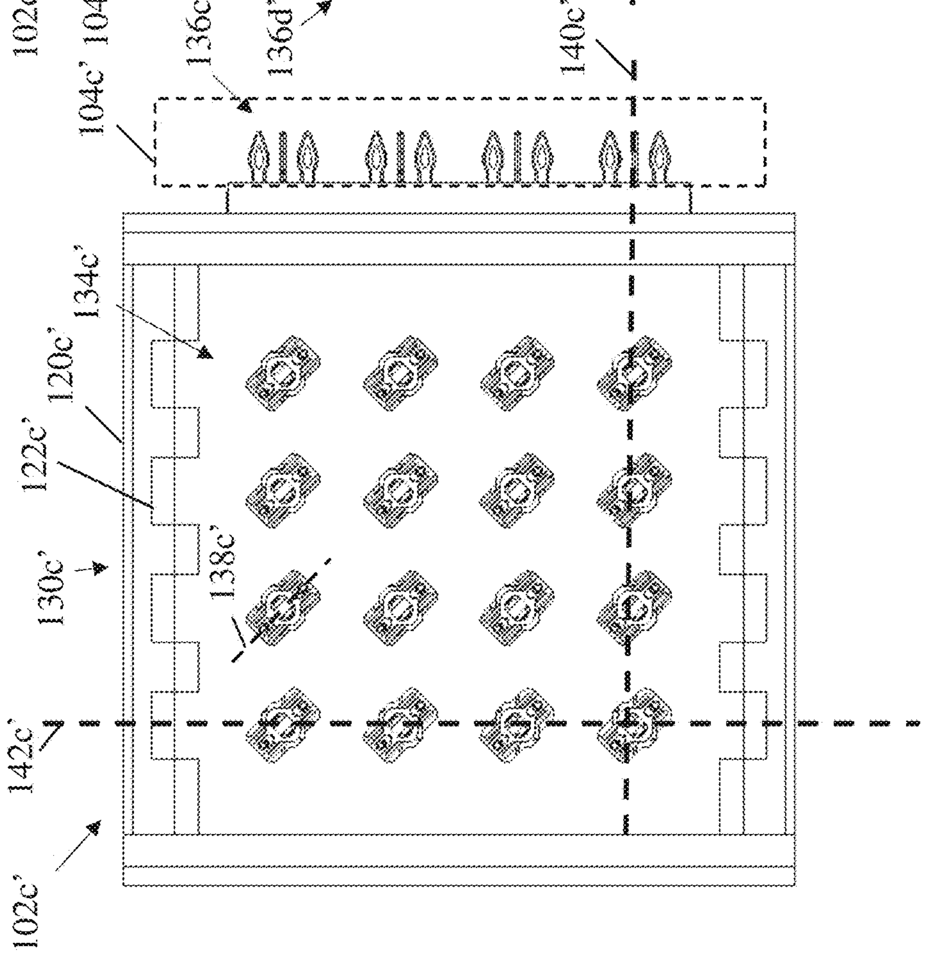
FIG. 3C is a front view of an electrical connector having an extender module assembly, in accordance with a further alternative embodiment.

Similar to connectors 102*a* and 102*b*, FIGS. 1-2, FIGS. 3A-3B illustrate connectors 102*c* and 102*d* having a direct attach orthogonal configuration. FIGS. 3C-3D illustrate electrical connectors 102*c*' and 102*d*' having a co-planar configuration. When connector 102*c*' is mated with connector 102*d*', substrate 104*c*' and substrate 104*d*' may be co-planar. Substrates 104*c*' and 104*d*' on which connectors 102*c*' and 102*d*' are mounted may be aligned in parallel. In this example, connectors 102*c*' and 102*d*' differ from connectors 102*a*, 102*b*, and 102*c* and 102*d* in that the mating interfaces of connectors 102*c*' and 102*d*' are angled in opposite directions whereas the mating interfaces of connectors 102*a*, 102*b*, and 102*c* and 102*d* are angled in the same direction. Otherwise, connectors 102*c*' and 102*d*' may be constructed in the manner described for connectors 102*a*, 102*b*, and 102*c* and 102*d*.

Mating end arrays 134*c*' and 134*d*' may be adapted for a co-planar configuration. Similar to FIGS. 3A-3B, mating ends of mating end array 134*c*' are positioned along parallel lines 138*c*' and mating ends of mating end array 134*d*' are positioned along parallel lines 138*d*'. In FIGS. 3C-3D, parallel lines 138*c*' and 138*d*' are perpendicular to one another as mating end arrays 134*c*' and 134*d*' are shown facing along a same direction. For example, while a same connector may be used on both sides of the direct attach orthogonal configuration shown in FIGS. 3A-3B, variants of a same connector may be used in the co-planar configuration shown in FIGS. 3C-3D.

In some embodiments, a relative position of pairs of mating ends of mating end array 134*c*' may be rotated 90 degrees with respect to the relative position of pairs of mating ends of mating end array 134*d*'. In some embodiments, parallel lines 138*c*' may be disposed at a counterclockwise angle of 45 degrees (e.g., +45 degrees) relative to mating row direction 142*c*', and parallel lines 138*d*' may be disposed at a clockwise angle of 45 degrees (e.g., −45 degrees, or +135 degrees counter-clockwise) relative to mating row direction 142*d*'. It should be appreciated that, alternatively, parallel lines 138*d*' may be disposed at a counter-clockwise angle of 45 degrees (e.g., +45 degrees) relative to mating row direction 142*d*', and parallel lines 138*c*' may be disposed at a clockwise angle of 45 degrees (e.g., −45 degrees, or +135 degrees counter-clockwise) relative to mating row direction 142*c*'.

Figure 4:
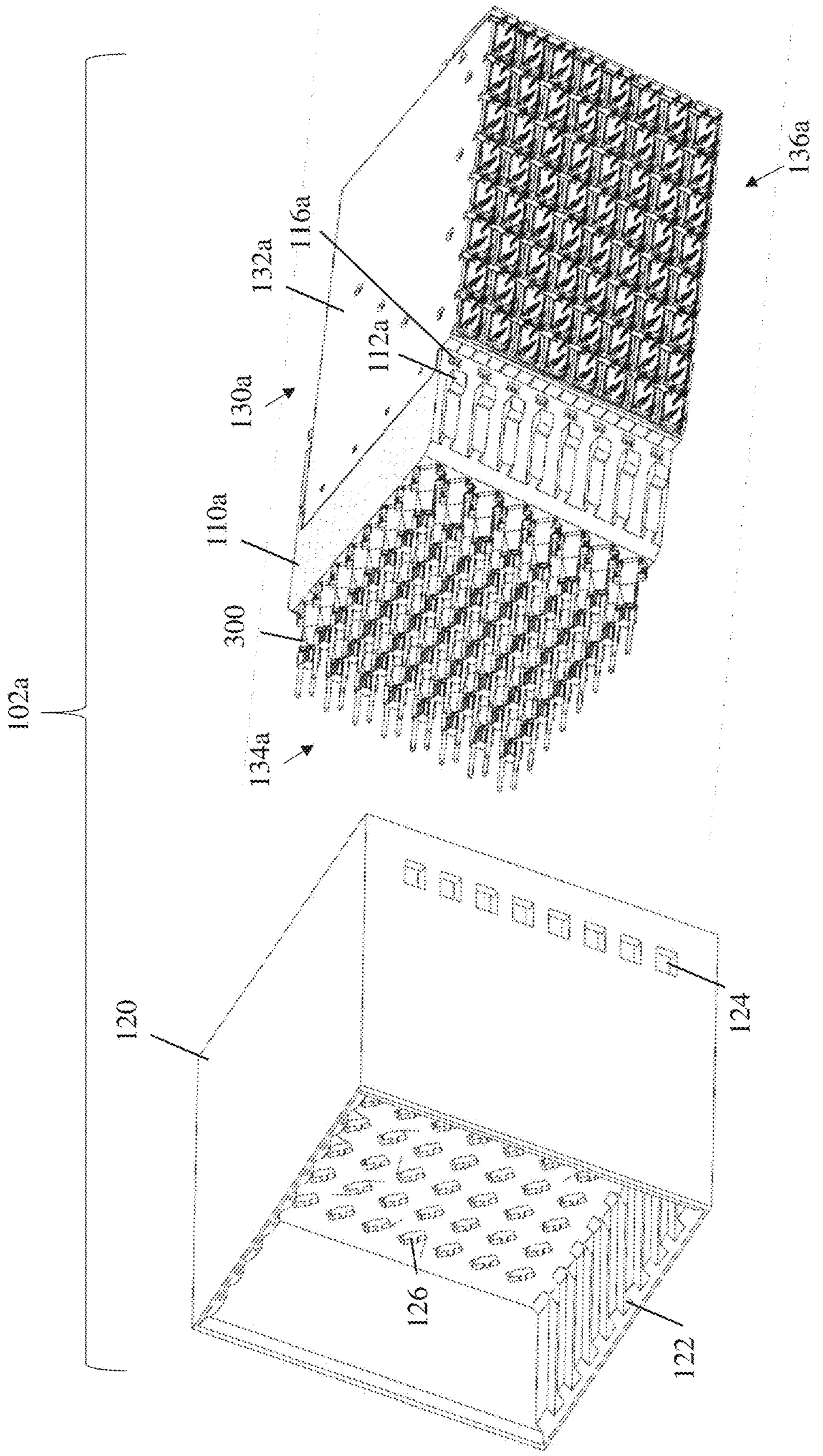
FIG. 4 is a partially exploded view of electrical connector 102*a* of FIG. 1.

FIG. 4 is a partially exploded view of electrical connector 102*a* of FIG. 1. In this illustrated embodiment of FIG. 4, extender housing 120 is shown removed from front housing 110*a* to show front housing 110*a* and an array of extender modules 300.

In the illustrated embodiment, front housing 110*a* is attached to wafers 130. Front housing 110*a* may be formed using a dielectric such as plastic, for example in one or more molding processes. Also as shown, front housing 110*a* includes projections 112*a*, which are here configured for latching front housing 110*a* to extender housing 120. For example, projections 112*a* may be received in openings 124 of extender housing 120. Extender modules 300 are shown protruding from front housing 110*a*. Extender modules 300 may be mounted to signal conductors of wafers 130 to form mating array 134*a*. Engagement of the projections 112*a* into openings 124 may be achieved by applying a force that exceeds the mating force required to press connectors 102*a* and 102*b* together for mating or to separate those connectors upon unmating. Accordingly, extender housing 120 may be fixed to front housing 110*a* during operation of the connectors 102*a* and 102*b*.

Apertures 126 of extender housing 120 are sized to allow mating ends of extender modules 300 to extend therethrough. Mating ends of the signal and ground conductors of the extender modules 300 may then be exposed within a cavity serving as a mating interface area bounded by walls of extender housing 120. The opposite ends of the signal and ground conductors within the extender modules 300 may be electrically coupled to corresponding signal and ground conductors within wafers 130*a*. In this way, connections between signal and ground conductors within wafers 130*a* and connector 102*b* inserted into the mating interface area.

Extender housing 120 may be formed using a dielectric such as plastic, for example in one or more molding processes. In the illustrated embodiment, extender housing 120 includes grooves 122. Grooves 122 are configured to receive projections 112*b* (FIG. 6) of front housing 110*b* of second connector 102*b*. Sliding of projections 112*b* in grooves 122 may aid in aligning mating array 134*a* of first electrical connector 102*a* with mating array 134*b* of second electrical connector 102*b* before sliding the two connectors into a mated configuration.

Figure 5:
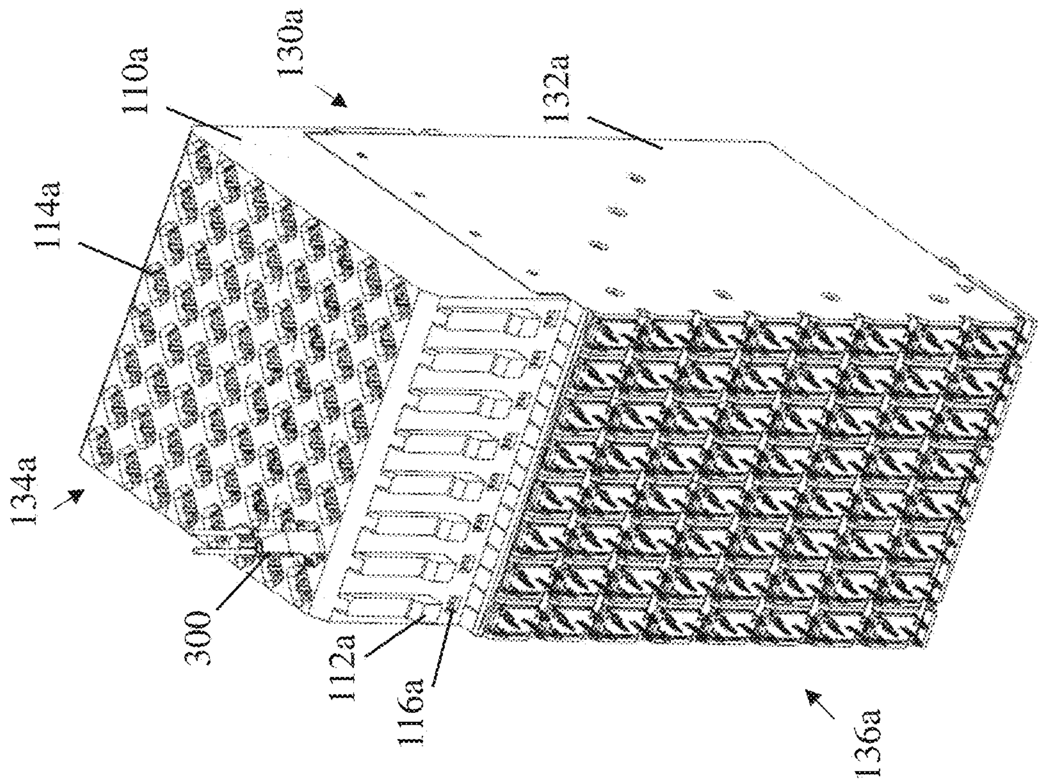
FIG. 5 is a perspective view of electrical connector 102*a* of FIG. 4 with a single extender module.

FIG. 5 is a perspective view of electrical connector 102*a* of FIG. 1 with a single extender module 300. In the illustrated embodiment, all extender modules 300 but one are removed so as to show apertures 114*a* of front housing 110*a* through which extender modules 300 extend. For example, apertures 114*a* are sized to expose mating ends of the signal conductors of wafers 130, and to allow a tail end of extender module 300 to be inserted into aperture 114*a* to engage with conductive elements within wafers 130*b*.

Figure 6:
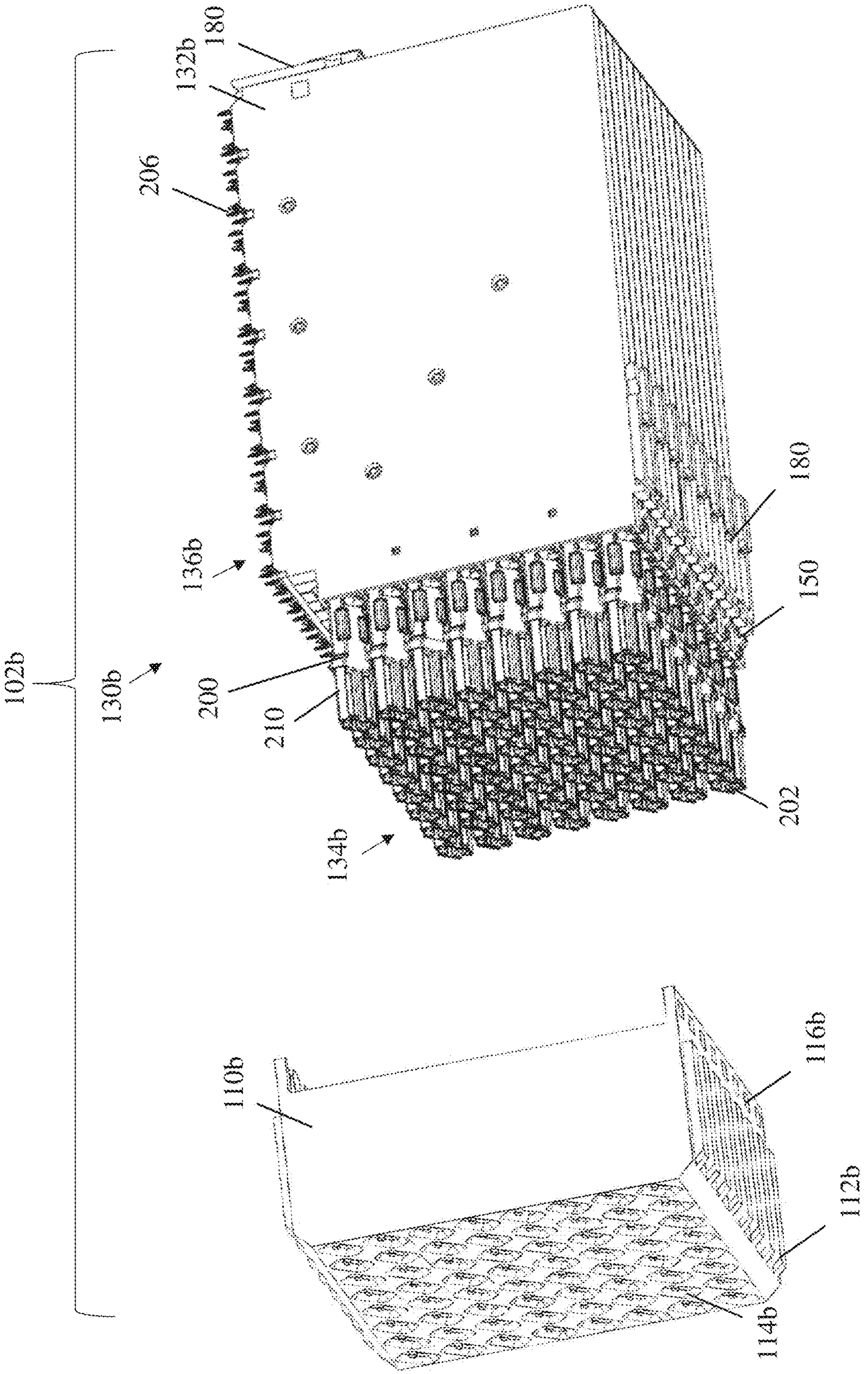
FIG. 6 is an exploded view of electrical connector 102*b* of FIG. 1.

FIG. 6 is a partially exploded view of second electrical connector 102*b* of FIG. 1. Here, front housing 110*b* is shown separated from wafers 130*b*. As shown in FIG. 6, wafers 130*b* of second electrical connector 102*b* are each formed from multiple connector modules 200. In the embodiment illustrated, there are eight connector modules per wafer. Mating ends 202 of connector modules 200 extend from wafer housing 132*b* to form mating end array 134*b*. When front housing 110*b* is attached to wafers 130*b*, mating end array 134*b* extends into front housing 110*b*. The mating ends 202 are accessible through respective apertures 114*b*.

Contact tails 206 extend from wafer housing 132*b* in a direction perpendicular to the direction in which mating ends 202 extend, so as to form contact tail array 136*b*. Connector modules 200 also include electromagnetic shielding 210 to provide isolation for electrical signals carried by signal pairs of adjacent connector modules 200. In the illustrated embodiment, that shielding also has structures that form mating contact portions a the mating ends 202 and structures that form contact tails that are within contact tail array 136*b*. The electromagnetic shielding may be formed from electrically conductive material, such as a sheet of metal bent and formed into the illustrated shape so as to form electrically conductive shielding.

Figure 9C:
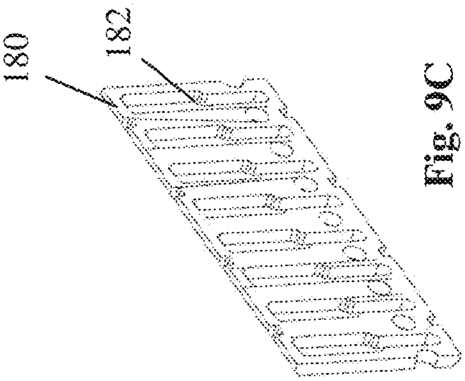
FIG. 9C is an alternate perspective view of the retaining member 180 of FIG. 9B.
Figure 9B:
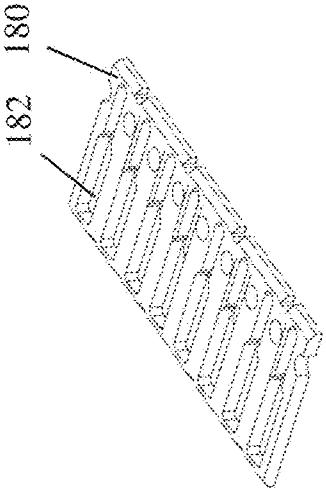
FIG. 9B is a perspective view of a first retaining member 180 of FIG. 9A.

Also shown in FIG. 6 of wafers 130*b* and retaining members 180. Retaining members 180 may be stamped of metal or formed of other suitable material. Retaining members 180 may be configured to secure multiple wafers 130*b* together, as described further herein including with reference to FIGS. 9A-9C.

A mechanism may be provided to secure front housing 110*b* to wafers 130*b*. In the illustrated embodiment, projecting tabs 150 are sized and positioned to extend into openings 116*b* of front housing 110*b* to secure front housing 110*b* to wafers 130*b*. The force required to insert and remove projecting tabs 150 from openings 116*b* may exceed the mating and/or unmating force of connectors 102*a* and 102*b*.

It should be appreciated that in the above-described embodiment, first and second electrical connectors 102*a* and 102*b* include portions that may have the same construction in both connectors. FIGS. 7-9C show in more detail portions of connectors 102*a* and 102*b* that may be the same for both first and second electrical connectors 102*a* and 102*b*. Description of FIGS. 7-9C refers to a generic electrical connector 102, which may apply in some embodiments to first or second electrical connectors 102*a* and 102*b*.

Figure 7:
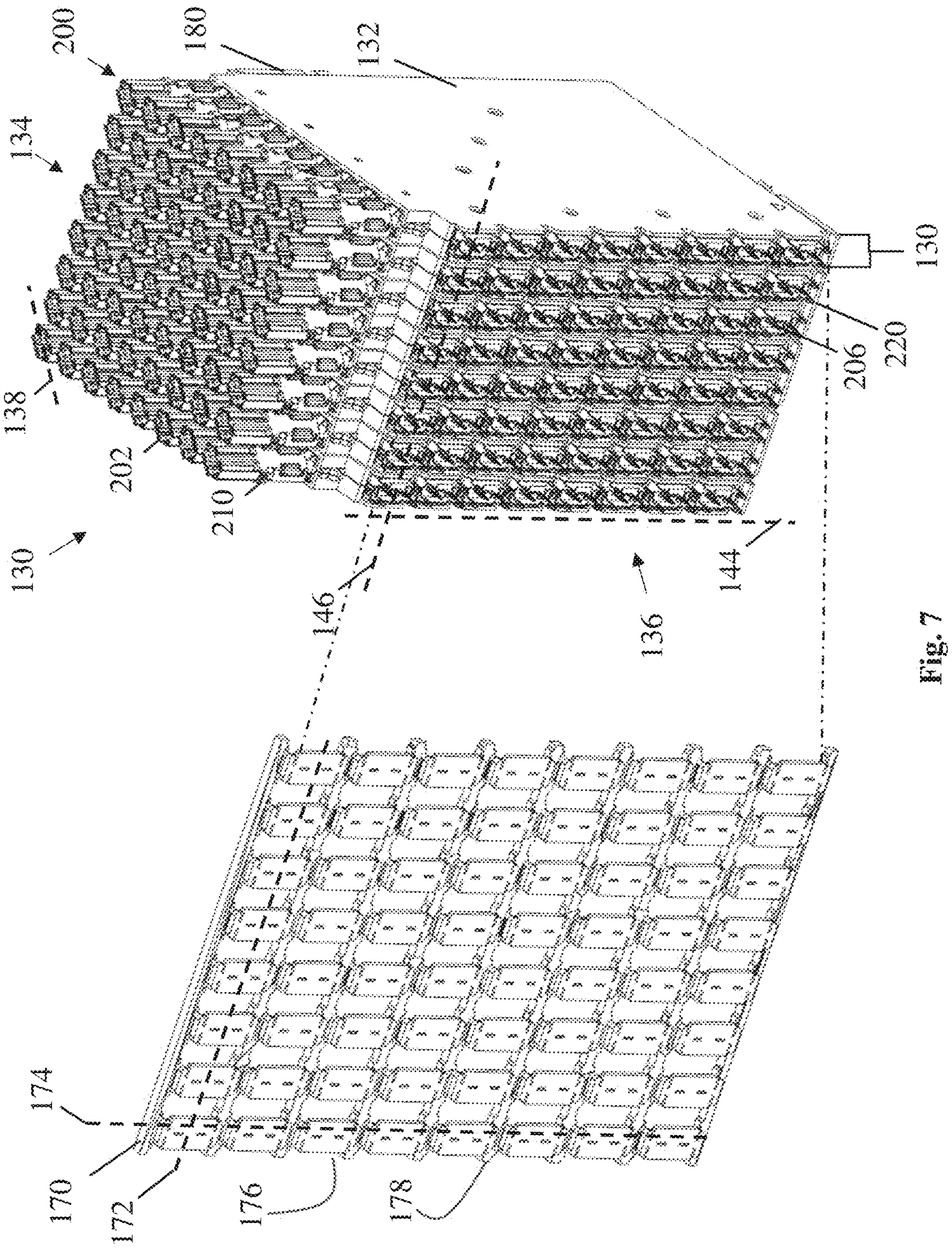
FIG. 7 is a partially exploded view of an electrical connector with front housing removed and with a compliant shield member, in accordance with some embodiments.

FIG. 7 is a partially exploded view of electrical connector 102 with compliant shield 170, and without a front housing. The inventors have recognized and appreciated that pairs of contact tails 206 and/or electromagnetic shielding tails 220 passing through compliant shield 170 may improve signal integrity in electrical connector 102.

Pairs of contact tails 206 of contact tail array 136 may extend through compliant shield 170. Compliant shield 170 may include lossy and/or conductive portions and may also include insulative portions. Contact tails 206 may pass through openings or insulative portions of compliant shield 170, and may be insulated from lossy or conductive portions. Ground conductors within connector 102 may be electrically coupled to the lossy or conductive portions, such as by electromagnetic shielding tails 220 passing through or pressing against lossy or conductive portions.

In some embodiments, the conductive portions may be compliant such that their thickness may be reduced when pressed between connector 102 and a printed circuit board when connector 102 is mounted to the printed circuit board. Compliance may result from the material used, and may result, for example, from an elastomer filled with conductive particles or a conductive foam. Such materials may lose volume when a force is exerted upon them or may be displaced so as to exhibit compliance. The conductive and/or lossy portions may be, for example, a conductive elastomer, such as a silicone elastomer filled with conductive particles such as particles of silver, gold, copper, nickel, aluminum, nickel coated graphite, or combinations or alloys thereof. Alternatively or additionally, such a material may be a conductive open-cell foam, such as a polyethylene foam plated with copper and nickel.

If insulative portions are present, they may also be compliant. Alternatively or additionally, the compliant material may be thicker than the insulative portions of compliant shield 170 such that the compliant material may extend from the mounting interface of connector 102 to the surface of a printed circuit board to which connector 102 is mounted.

Compliant material may be positioned to align with pads on a surface of a printed circuit board to which pairs of contact tails 206 of contact tail array 136 are to be attached to or inserted through. Those pads may be connected to ground structures within the printed circuit board such that, when electrical connector 102 is attached to the printed circuit board, the compliant material makes contact with the ground pads on the surface of the printed circuit board.

The conductive or lossy portions of compliant shield 170 may be positioned to make electrical connection to electromagnetic shielding 210 of connector modules 200. Such connections may be formed, for example, by electromagnetic shielding tails 220 passing through and contacting the lossy or conductive portions. Alternatively or additionally, in embodiments in which the lossy or conductive portions are compliant, those portions may be positioned to press against the electromagnetic shielding tails 220 or other structures extending from the electromagnetic shielding when electrical connector 102 is attached to a printed circuit board.

Insulative portions 176 may be organized into rows along a row direction 172 and a column direction 174. When pairs of contact tails 206 of contact tail array 136 extend through insulative portions 176, row direction 172 of compliant shield 170 may substantially align with contact tail row direction 146, and column direction 174 of compliant shield 170 may substantially align with contact tail column direction 144.

In the illustrated embodiment, conductive members 178 join insulative portions 176 and are positioned between rows of contact tail array 136. In this position, they may contact electromagnetic shielding tails 220, as a result of being pressed against the tails when compressed or as a result of shielding tails 220 passing through conductive members 178.

Figure 8:
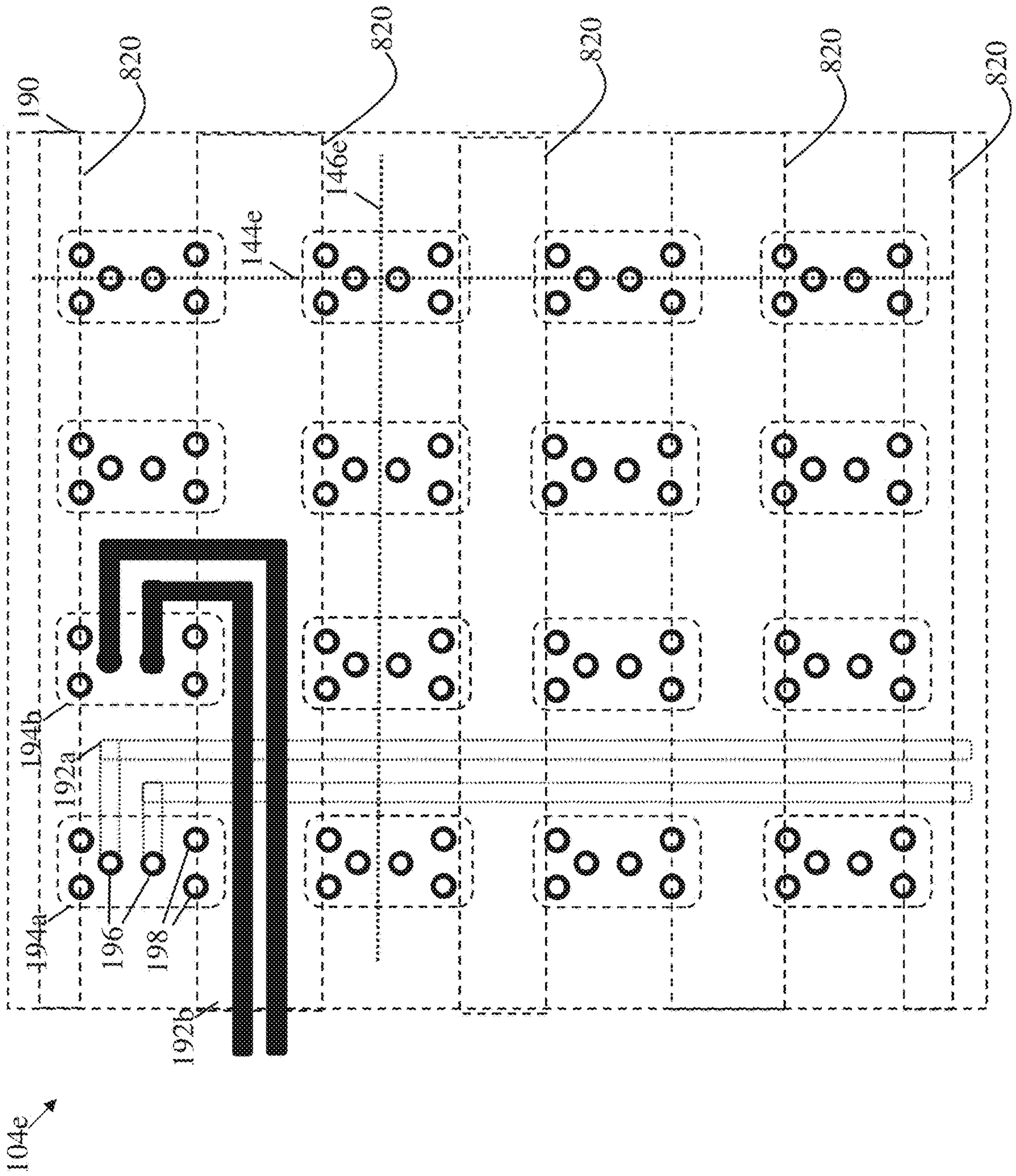
FIG. 8 is a plan view of a portion of a printed circuit board illustrating routing channels in a footprint for mounting an electrical connector, in accordance with some embodiments.

FIG. 8 is a plan view of a portion 190 of substrate 104*e*, illustrating a portion of a connector footprint to which connector 102 may be mounted. Here, a 4×4 grid of mounting locations, of which mounting locations 194*a* and 194*b* are numbered, is shown. Each mounting location can accommodate contact tails from a pair of signal conductors and electromagnetic shielding tails 220 from electromagnetic shielding around the pair. Here four such electromagnetic shielding tails 220 are shown per pair.

Mounting locations 194*a* and 194*b* each include conductive signal vias 196 and conductive ground vias 198. Conductive signal vias 196 and conductive ground vias 198 are configured to receive contact tails and/or electromagnetic shielding tails of an electrical connector. For example, conductive signal vias 196 and ground vias 198 may be formed as conductively plated holes into which press fit tails are inserted. Alternatively, the signal contact tails and/or electromagnetic shielding tails may be soldered to pads on top of conductive signal vias 196 and/or conductive ground vias 198.

Substrate 104*e* is implemented as a multi-layer printed circuit board in the illustrated embodiment. FIG. 8 illustrates a portion of an inner layer of the printed circuit board in which traces are visible. Only two traces are illustrated, but it should be appreciated that a pair of traces may be connected for each pair of signal conductors. Those traces may be on the layer illustrated or on another layer of the printed circuit board. Other layers may also contain constructive structures serving as ground planes. The shielding tails 220 may be connected to the ground planes.

Shown in phantom are ground pads 820, such as might be formed on a surface of the printed circuit board. Ground pads 820 may be connected to one or more of the ground planes within the printed circuit board. In the illustrated embodiment, ground pads 820 are positioned to align with conductive members 178 such that, when connector 102 is mounted to the printed circuit board, a conducting path is provided between electromagnetic shielding within connector 102 and ground structures within the printed circuit board.

In the embodiment illustrated, mounting locations are spaced to leave routing channels, of which routing channels 192*a* and 192*b* are numbered. Routing channels 192*a* and 192*b* accommodate traces that can route signals from the vias, which are in turn connected to contact tails of the connector, to other locations of the printed circuit board.

In some embodiments, conductive signal vias 196 and/or conductive shield vias have an unplated hole diameter of less than or equal to 20 mils. In some embodiments, conductive signal vias 196 and/or conductive ground vias 198 have an unplated hole diameter of less than or equal to 10 mils. The mounting locations may then be spaced in an array with a center to center separation in the column direction less than or equal to 2.5 mm and a center to center separation in the row direction of less than or equal to 2.5 mm. With this spacing, there is room for routing channels between the vias, including routing channels 192*a* in the column direction and routing channels 192*b* in the row direction. Having routing channels in both the row and column direction can be advantageous, as it can reduce the number of layers in a printed circuit board required to route traces to all of the signal vias in a connector footprint in comparison to a printed circuit board in which routing channels are available in only one direction. As cost, size and weight all increase with increased layer count, reducing the number of layers offers many advantages.

In some embodiments, conductive signal vias 196 of adjacent mounting locations 194*a* and 194*b* are configured to receive adjacent pairs of contact tails spaced a distance less than or equal to 5 mm along line 146*e*. In some embodiments, conductive signal vias 196 of adjacent mounting locations 194*a* and 194*b* are configured to receive adjacent pairs of contact tails of an electrical connector, wafer and/or connector module spaced a distance less than or equal to 4 mm from center to center along line 146*e*. In some embodiments, conductive signal vias 196 of adjacent mounting locations 194*a* and 194*b* are configured to receive adjacent pairs of contact tails of an electrical connector, wafer and/or connector module spaced a distance less than or equal to 2.4 mm along line 146*e*. In a perpendicular direction, adjacent mounting locations may be spaced less than 8 mm, or less than 5 mm from center to center along line 144*e*, or less than 4 mm or less than or equal to 2.4 mm, in some embodiments.

Routing channels in both the row and column direction, despite a compact array of mounting locations, can be achieved by implementing each of the mounting locations in a relatively compact area. That compactness of the each mounting location may depend on the separation between the signal conductors of a pair and the separation between the signal conductors and the electromagnetic shield surrounding them within a connector module 300.

The inventors have recognized and appreciated that these dimensions can be made smaller by including superelastic materials in electrical connectors. Superelastic materials may be characterized by the amount of strain required for those materials to yield, with superelastic materials tolerating a higher strain before yielding. Additionally, the shape of the stress-strain curve for a superelastic material includes a "superelastic" region.

Superelastic materials may include shape memory materials that undergo a reversible martensitic phase transformation when a suitable mechanical driving force is applied. The phase transformation may be a diffusionless solid-solid phase transformation which has an associated shape change; the shape change allows superelastic materials to accommodate relatively large strains compared to conventional (i.e. non-superelastic) materials, and therefore superelastic materials often exhibit a much larger elastic limit than traditional materials. The elastic limit is herein defined as the maximum strain to which a material may be reversibly deformed without yielding. Whereas conventional conductors typically exhibit elastic limits of up to 1%, superelastic conductive materials may have elastic limits of up to 7% or 8%. As a result, superelastic conductive materials can be made smaller without sacrificing the ability to tolerate sizeable strains. Moreover, some superelastic conductive materials may be returned to their original form, even when strained beyond their elastic limits, when exposed to a transition temperature specific to the material. In contrast, conventional conductors are usually permanently deformed once strained beyond their elastic limit.

Such materials may enable signal conductors that are small, yet provide robust structures. Such materials facilitate decreasing the width of electrical conductors of the electrical connectors, which can lead to decreasing spacing between the electrical conductors and electromagnetic shielding of the electrical connectors in connector modules 300. Superelastic members, for example, may have a diameter (or effective diameter as a result of having a cross sectional area that equals the area of a circle of that diameter) between and 20 mils in some embodiments, such as between 8 and 14 mils, or in some embodiments between 5 and 8 mils, or in any subrange of the range between 5 and 14 mils.

In addition to enabling routing channels in the row and column directions, more compact connector modules may have undesired resonant modes at high frequencies, which may be outside the desired operational frequency range of the electrical connector. There may be a corresponding reduction of the undesired resonant frequency modes in the operational frequency range of the electrical connector, which provides increased signal integrity for signals carried by the connector modules.

In some embodiments, contact tails of contact tail array 136 and/or mating ends of mating end array 134 may include superelastic (or pseudoelastic) material. Depending on the particular embodiment, the superelastic material may have a suitable intrinsic conductivity or may be made suitably conductive by coating or attachment to a conductive material. For example, a suitable conductivity may be in the range of about 1.5μΩcm to about 200 μΩcm. Examples of superelastic materials which may have a suitable intrinsic conductivity include, but are not limited to, metal alloys such as copper-aluminum-nickel, copper-aluminum-zinc, copper-aluminum-manganese-nickel, nickel-titanium (e.g. Nitinol), and nickel-titanium-copper. Additional examples of metal alloys which may be suitable include Ag—Cd (approximately 44-49 at % Cd), Au—Cd (approximately 46.5-50 at % Cd), Cu—Al—Ni (approximately 14-14.5 wt %, approximately 3-4.5 wt % Ni), Cu—Au—Zn (approximately 23-28 at % Au, approximately 45-47 at % Zn), Cu—Sn (approximately 15 at % Sn), Cu—Zn (approximately 38.5-41.5 wt % Zn), Cu—Zn—X (X=Si, Sn, Al, Ga, approximately 1-5 at % X), Ni—Al (approximately 36-38 at % Al), Ti—Ni (approximately 49-51 at % Ni), Fe—Pt (approximately 25 at % Pt), and Fe—Pd (approximately 30 at % Pd).

In some embodiments, a particular superelastic material may be chosen for its mechanical response, rather than its electronic properties, and may not have a suitable intrinsic conductivity. In such embodiments, the superelastic material may be coated with a more conductive metal, such as silver, to improve the conductivity. For example, a coating may be applied with a chemical vapor deposition (CVD) process, a physical vapor deposition (PVD) process, or any other suitable coating process, as the disclosure is not so limited. Coated superelastic materials also may be particularly beneficial in high frequency applications in which most of the electrical conduction occurs near the surface of conductors.

In some embodiments, a connector element including a superelastic material may be formed by attaching a superelastic material to a conventional material which may have a higher conductivity than the superelastic material. For example, a superelastic material may be employed only in a portion of the connector element which may be subjected to large deformations, and other portions of the connector which do not deform significantly during operation of the connector may be made from a conventional (high conductivity) material.

The inventors have recognized and appreciated that implementing portions of an electrical connector using superelastic conductive materials enables smaller structures that are nonetheless sufficiently robust to withstand the operational requirements of an electrical connector, and therefore, may facilitate higher signal conductor density within the portions made of superelastic material. This closer spacing may be carried through the interconnection system. For example, a mounting footprint for receiving electrical connector 102 on a substrate may be adapted for receiving high density contact tail array 136, as described above with reference to FIG. 8.

Spacing between conductive signal vias 196 and/or conductive ground vias 198 on substrate 104*e* may be adapted to match the spacing of pairs of contact tails 206 of contact tail array 136 and/or electromagnetic shielding tails 220 of electrical connector 102. Accordingly, closer spacing between signal conductors and/or smaller spacing between signal conductors and ground conductors will yield a more compact footprint. Alternatively or additionally, more space will be available for routing channels.

In some embodiments, contact tails of electrical connector 102 may be implemented with superconductive elastic materials, which may enable smaller vias and closer spacing between adjacent pairs than for conventional contact tails. In some embodiments, conductive signal vias 196 of adjacent mounting locations 194*a* and 194*b* may be spaced on a 2.4 mm by 2.4 mm grid in some embodiments.

Such close spacing may be achieved, by thin contact tails, such as may be implemented with superelastic wires of a diameter less than 10 mils, for example. In some embodiments, contact tails of connectors described herein may be configured to be inserted into plated holes formed with an unplated diameter of less than or equal to 20 mils. In some embodiments, the contact tails may be configured to be inserted into vias drilled with an unplated diameter of less than or equal to 10 mils. In some embodiments, the contact tails may each have a width between 6 and 20 mils. In some embodiments, the contact tails may each have a width between 6 and 10 mils, or between 8 and 10 mils in other embodiments.

Figure 9A:
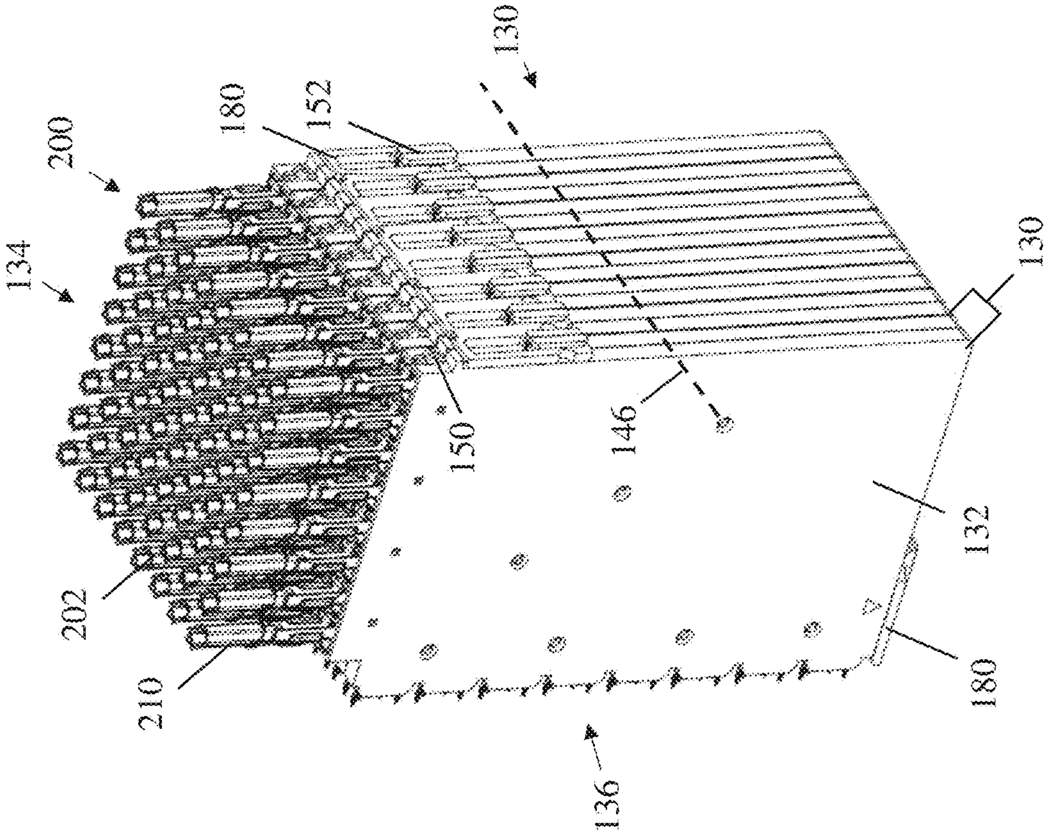
FIG. 9A is a perspective view of electrical connector 102 of FIG. 7 with front housing cut away and having retaining members, in accordance with some embodiments.

FIGS. 9A to 16C provide additional detail of components of connector 102. FIG. 9A illustrates wafers 130, and FIGS. 9B-9C illustrate retaining members 180 of electrical connector 102. In the illustrated embodiment of FIG. 9A, wafers 130 are positioned along contact tail row direction 146, and retaining tabs 152 of wafer housings 132 are engaged with retaining members 180. Retaining members 180 are configured to secure wafers 130 to one another. In FIGS. 9B-9C, retaining members 180 include slots 182 for receiving retaining tabs 152 of wafers 130. Retaining members 180 may be stamped from metal, but may alternatively be formed of a dielectric material such as plastic.

Figure 10B:
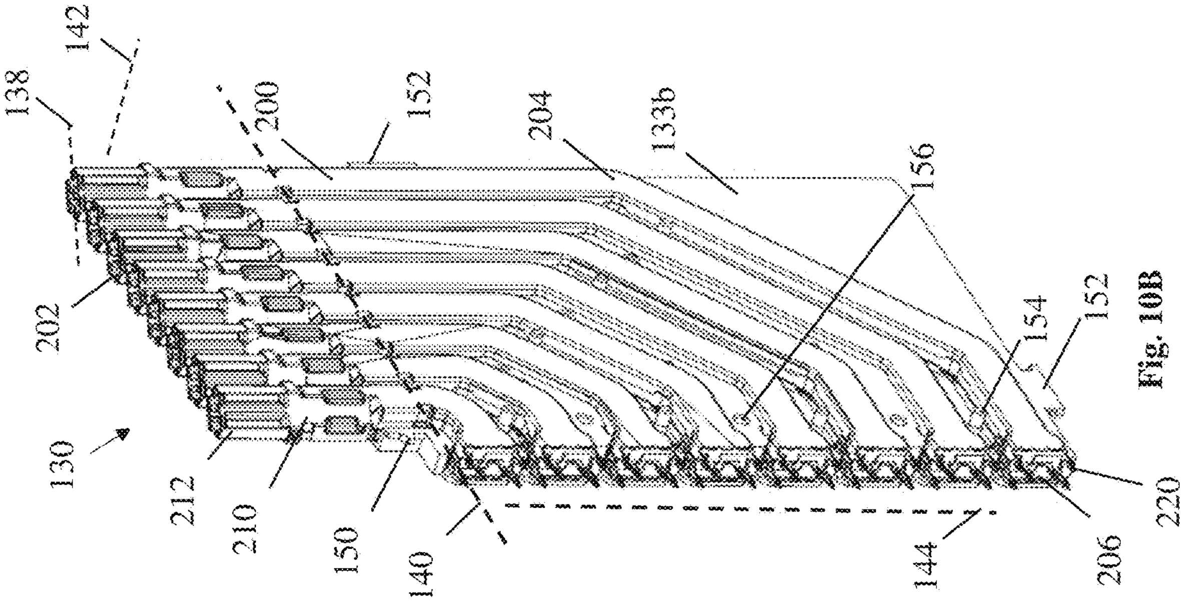
FIG. 10B is a perspective view of wafer 130 of FIG. 10A with a wafer housing member 133*b* cut away.
Figure 10A:
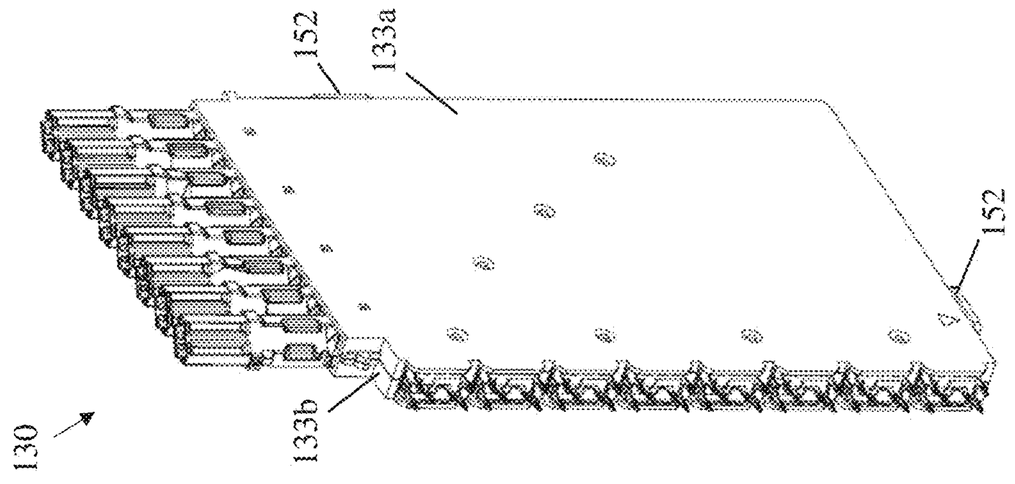
FIG. 10A is a perspective view of wafer 130 of electrical connector 102 illustrated in FIG. 7.

FIG. 10A is a perspective view of wafer 130 of electrical connector 102. In the illustrated embodiment, wafer housing 132 is formed from two housing members 133*a* and 133*b*. FIG. 10B is a perspective view of wafer 130 with a wafer housing member 133*a* cut away. As shown in FIGS. 10A and 10B, wafer 130 includes connector modules 200 between two wafer housing members 133*a* and 133*b*. In the illustrated embodiment, wafer housing members 133*a* and 133*b* hold connector modules 200 in wafer 130.

Wafer housing members 133*a* and 133*b* include projections 154, and holes 156 configured to receive projections 154, so as to hold wafer housing members 133*a* and 133*b* together. In some embodiments, wafer housing members 133*a* and 133*b* may be formed from or include a lossy conductive material such as conductively plated plastic, or an insulative material. The inventors have recognized and appreciated that implementing wafer housing members 133*a* and 133*b* using lossy conductive material provides damping for undesired resonant modes in and between connector modules 200, thereby improving signal integrity of signals carried by electrical connector 102.

Any suitable lossy material may be used for these and other structures that are "lossy." Materials that conduct, but with some loss, or material which by another physical mechanism absorbs electromagnetic energy over the frequency range of interest are referred to herein generally as "lossy" materials. Electrically lossy materials can be formed from lossy dielectric and/or poorly conductive and/or lossy magnetic materials. Magnetically lossy material can be formed, for example, from materials traditionally regarded as ferromagnetic materials, such as those that have a magnetic loss tangent greater than approximately 0.05 in the frequency range of interest. The "magnetic loss tangent" is the ratio of the imaginary part to the real part of the complex electrical permeability of the material. Practical lossy magnetic materials or mixtures containing lossy magnetic materials may also exhibit useful amounts of dielectric loss or conductive loss effects over portions of the frequency range of interest. Electrically lossy material can be formed from material traditionally regarded as dielectric materials, such as those that have an electric loss tangent greater than approximately 0.05 in the frequency range of interest. The "electric loss tangent" is the ratio of the imaginary part to the real part of the complex electrical permittivity of the material. Electrically lossy materials can also be formed from materials that are generally thought of as conductors, but are either relatively poor conductors over the frequency range of interest, contain conductive particles or regions that are sufficiently dispersed that they do not provide high conductivity or otherwise are prepared with properties that lead to a relatively weak bulk conductivity compared to a good conductor such as copper over the frequency range of interest.

Electrically lossy materials typically have a bulk conductivity of about 1 Siemen/meter to about 10,000 Siemens/meter and preferably about 1 Siemen/meter to about 5,000 Siemens/meter. In some embodiments material with a bulk conductivity of between about 10 Siemens/meter and about 200 Siemens/meter may be used. As a specific example, material with a conductivity of about 50 Siemens/meter may be used. However, it should be appreciated that the conductivity of the material may be selected empirically or through electrical simulation using known simulation tools to determine a suitable conductivity that provides a suitably low crosstalk with a suitably low signal path attenuation or insertion loss.

Electrically lossy materials may be partially conductive materials, such as those that have a surface resistivity between 1 Ω/square and 100,000 Ω/square. In some embodiments, the electrically lossy material has a surface resistivity between 10 Ω/square and 1000 Ω/square. As a specific example, the material may have a surface resistivity of between about 20 Ω/square and 80 Ω/square.

In some embodiments, electrically lossy material is formed by adding to a binder a filler that contains conductive particles. In such an embodiment, a lossy member may be formed by molding or otherwise shaping the binder with filler into a desired form. Examples of conductive particles that may be used as a filler to form an electrically lossy material include carbon or graphite formed as fibers, flakes, nanoparticles, or other types of particles. Metal in the form of powder, flakes, fibers or other particles may also be used to provide suitable electrically lossy properties. Alternatively, combinations of fillers may be used. For example, metal plated carbon particles may be used. Silver and nickel are suitable metal plating for fibers. Coated particles may be used alone or in combination with other fillers, such as carbon flake. The binder or matrix may be any material that will set, cure, or can otherwise be used to position the filler material. In some embodiments, the binder may be a thermoplastic material traditionally used in the manufacture of electrical connectors to facilitate the molding of the electrically lossy material into the desired shapes and locations as part of the manufacture of the electrical connector. Examples of such materials include liquid crystal polymer (LCP) and nylon. However, many alternative forms of binder materials may be used. Curable materials, such as epoxies, may serve as a binder. Alternatively, materials such as thermosetting resins or adhesives may be used.

Also, while the above described binder materials may be used to create an electrically lossy material by forming a binder around conducting particle fillers, the invention is not so limited. For example, conducting particles may be impregnated into a formed matrix material or may be coated onto a formed matrix material, such as by applying a conductive coating to a plastic component or a metal component. As used herein, the term "binder" encompasses a material that encapsulates the filler, is impregnated with the filler or otherwise serves as a substrate to hold the filler.

Preferably, the fillers will be present in a sufficient volume percentage to allow conducting paths to be created from particle to particle. For example, when metal fiber is used, the fiber may be present in about 3% to 40% by volume. The amount of filler may impact the conducting properties of the material.

Filled materials may be purchased commercially, such as materials sold under the trade name Celestran® by Celanese Corporation which can be filled with carbon fibers or stainless steel filaments. A lossy material, such as lossy conductive carbon filled adhesive preform, such as those sold by Techfilm of Billerica, Massachusetts, US may also be used. This preform can include an epoxy binder filled with carbon fibers and/or other carbon particles. The binder surrounds carbon particles, which act as a reinforcement for the preform. Such a preform may be inserted in a connector wafer to form all or part of the housing. In some embodiments, the preform may adhere through the adhesive in the preform, which may be cured in a heat treating process. In some embodiments, the adhesive may take the form of a separate conductive or non-conductive adhesive layer. In some embodiments, the adhesive in the preform alternatively or additionally may be used to secure one or more conductive elements, such as foil strips, to the lossy material.

Various forms of reinforcing fiber, in woven or non-woven form, coated or non-coated may be used. Non-woven carbon fiber is one suitable material. Other suitable materials, such as custom blends as sold by RTP Company, can be employed, as the present invention is not limited in this respect.

In some embodiments, a lossy portion may be manufactured by stamping a preform or sheet of lossy material. For example, a lossy portion may be formed by stamping a preform as described above with an appropriate pattern of openings. However, other materials may be used instead of or in addition to such a preform. A sheet of ferromagnetic material, for example, may be used.

However, lossy portions also may be formed in other ways. In some embodiments, a lossy portion may be formed by interleaving layers of lossy and conductive material such as metal foil. These layers may be rigidly attached to one another, such as through the use of epoxy or other adhesive, or may be held together in any other suitable way. The layers may be of the desired shape before being secured to one another or may be stamped or otherwise shaped after they are held together. As a further alternative, lossy portions may be formed by plating plastic or other insulative material with a lossy coating, such as a diffuse metal coating.

As shown in FIG. 10B, connector modules 200 are aligned along mating column direction 140. As shown in FIG. 10B, connector modules 200 include mating ends 202 and mounting ends where contact tails 206 of signal conductors within the module are exposed. The mating ends and mounting ends of modules 200 are connected by intermediate portions 204. Connector modules 200 also include electromagnetic shielding 210, having electromagnetic shielding tails 212 and electromagnetic shielding mating ends 212, that are at the mounting end and mating end of the module, respectively.

In the illustrated embodiment, mating ends of signal conductors of each connector module are separated along parallel lines 138 at mating ends 202, which make a 45 degree angle relative to mating column direction 140.

In the illustrated embodiment, contact tails 206 of signal conductors within the connector modules are positioned in a column along contact tail column direction 144, and pairs of contact tails 206 are also separated along contact tail column direction 144. As shown, contact tail column direction 144 is orthogonal to mating column direction 140. It should be appreciated, however, the mating end and mounting end may have any desired relative orientation. Contact tails 206 may be either edge or broadside coupled, in accordance with various embodiments.

Figure 11:
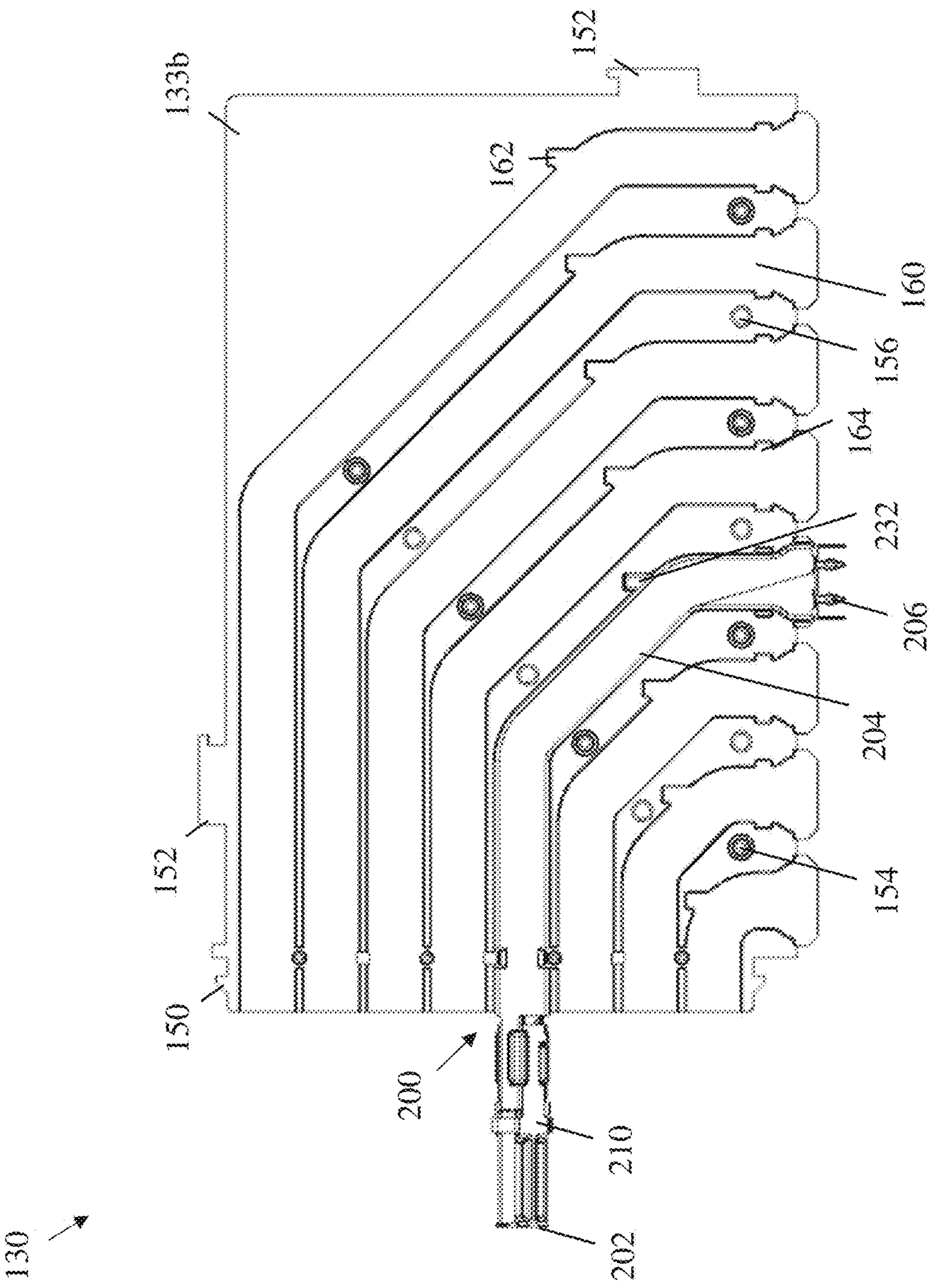
FIG. 11 is a plan view of an housing member 133*a* and one connector module 200 of wafer 130 of FIG. 10A.

FIG. 11 is a plan view of housing member 133*b* and one connector module 200 of wafer 130. As shown in FIG. 11, wafer housing member 133*b* includes grooves 160 shaped to receive connector modules 200. Housing member 133*a* similarly may include grooves that cooperate with grooves 160 to form channels in which connector modules 200 are disposed.

Grooves 160 include first notches 162 and second notches 164, each shaped to receive a projection from connector modules 200, such as a projection 232. Such notches and projections may provide mechanical integrity to wafer 130 such that modules 200 do not rotate when connector 102 is pressed onto a printed circuit board, for example.

Figures 12A, 12B, 12C:
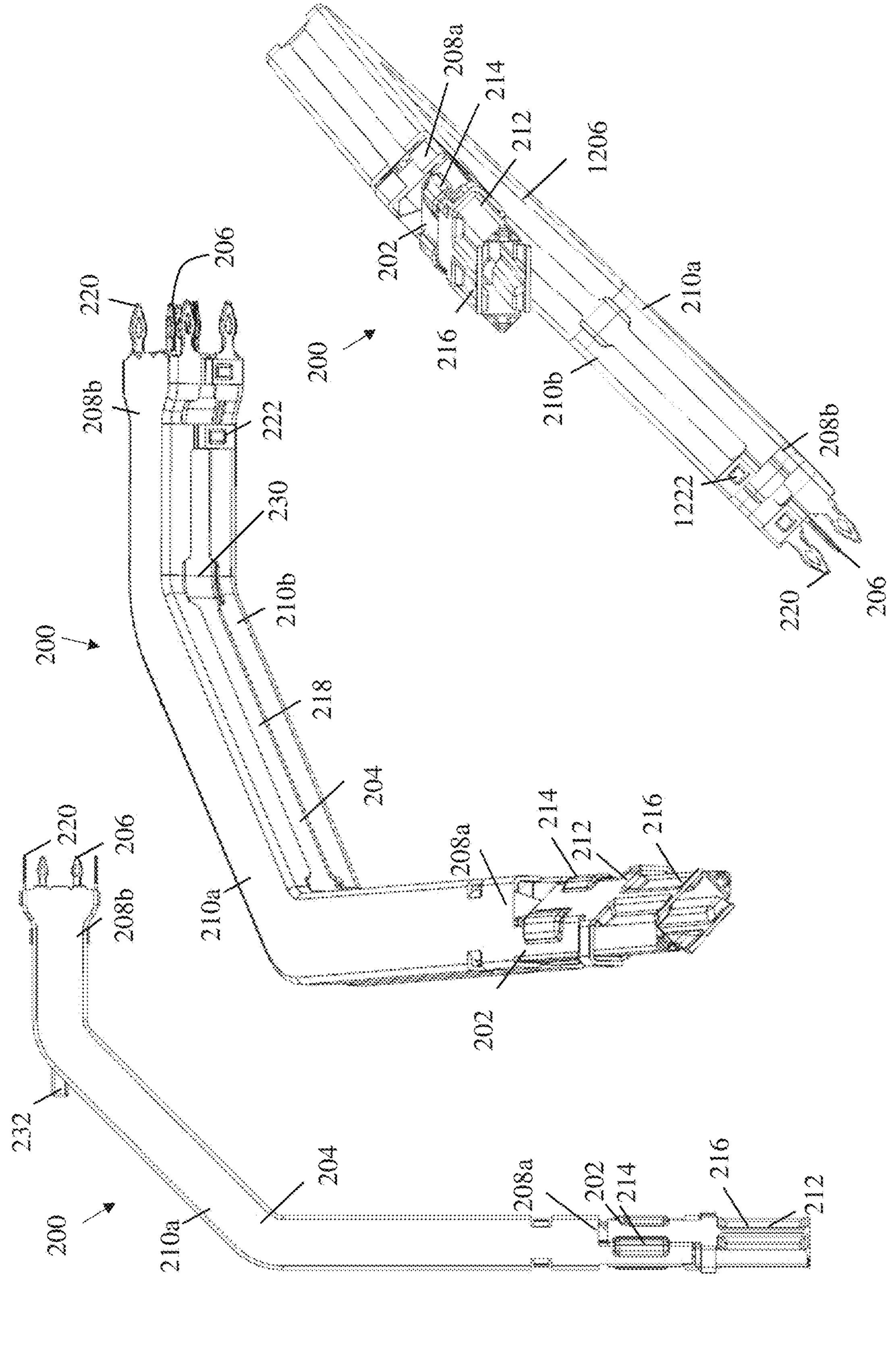
FIG. 12A is a side view of connector module 200 of FIG. 11.
FIG. 12B is a perspective view of connector module 200 of FIG. 11.
FIG. 12C is an alternate perspective view of connector module 200 of FIG. 11.

FIGS. 12A-12C illustrate a side view, a perspective view, and an alternate perspective view of a representative connector module 200, respectively. As shown in FIG. 10B, a wafer may include a column of connector modules 200. Each of the connector modules may be in a separate row at the mating and mounting interface of the connector. In a right angle connector, the modules in each row may have a different length intermediate portion 204. The mating ends and mounting ends may be the same, in some embodiments.

As shown in FIGS. 12A-12C, electromagnetic shielding members 210*a* and 210*b* are disposed around inner insulative member 230. First and second retaining members 222 of electromagnetic shielding members 210*a* and 210*b* retain first shielding member 210*a* to second shielding member 210*b* enclosing inner insulative member 230.

In the illustrated embodiment, electromagnetic shielding members 210 fully cover connector module 200 on two sides, with a gap 218 on the remaining two sides such that only partial covering is provided on those sides. Inner insulative member 230 is exposed through gap 218. However, in some embodiments, electromagnetic shielding members 210 may fully cover the insulative member 230 on 4 sides. Gaps 218 may be relatively narrow, so as not to allow any significant amount of electromagnetic energy to pass through the gap. The gaps, for example, may be less than one half or, in some embodiments, less than one quarter of a wavelength of the highest frequency in the intended operating range of the connector. Signal conductors within connector module 200 are described herein including with reference to FIGS. 16A-16C. Electromagnetic shielding members 210 may be electrically conductive shielding. For example, electromagnetic shielding members 210 may be stamped from a sheet of metal.

FIGS. 12A-12C indicate first transition region 208*a* and second transition region 208*b* of connector module 200. In first transition region 208*a*, mating ends 202 are connected to intermediate portions 204. In second transition region 208*b*, intermediate portions 204 are connected to contact tails 206.

Electromagnetic shielding members 210*a* and 210*b* include electromagnetic shielding mating ends 212, at mating ends 202, and electromagnetic shielding tails 220, which extend from module 200 parallel to and alongside contact tails 206 of signal conductors within module 200. Electromagnetic shielding mating ends 212 surround the mating ends of the signal conductors.

Electromagnetic shielding mating ends 212 are embossed with outwardly projecting portions 214 in first transition region 208*a* and with inwardly projecting portions 216 at the mating ends 202. Accordingly, outwardly projecting portions 214 are disposed between intermediate portions 204 and inwardly projecting portions 216. Embossing electromagnetic shielding mating ends 212 with outwardly projecting portions 214 offsets changes in impedance along a length of connector modules 200 associated with changes in shape of connector module 200 in the transition region. An impedance along signal paths through connector module 200 may be between 90 and 100 ohms at frequencies between 45-50 GHz, for example.

Embossing electromagnetic shielding mating ends 212 with inwardly projecting portions 216 provides a more constant impedance between an operating state in which connector module 200 is pressed firmly against a mating connector and an operating stated in which connector module 200 is partially demated such that there is a separation between connector module 200 and the mating connector but the connectors are sufficiently close that the signal conductors in those connectors mate. In some embodiments, an impedance change between fully mated and partially demated configurations of mating ends 202 is less than 5 ohms at operating frequencies of the connector, such as in a range of 45-50 GHz.

Figures 13A, 13B, 13C:
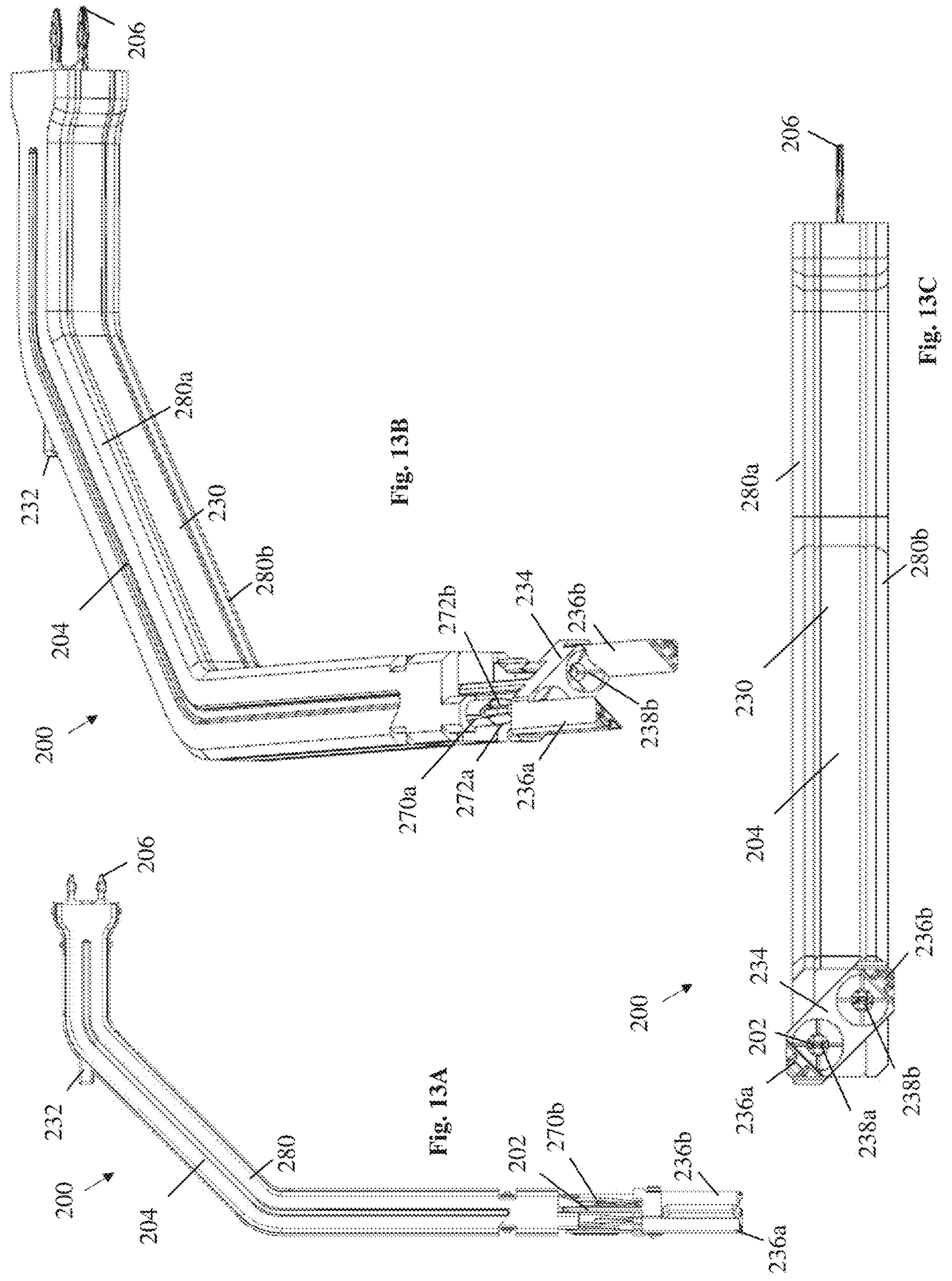
FIG. 13A is a side view of connector module 200 of FIG. 11 with electromagnetic shielding members 210 cut away.
FIG. 13B is a perspective view of connector module 200 of FIG. 13A.
FIG. 13C is an alternative side view of connector module 200 of FIG. 13A.

FIGS. 13A-13C are a side view, a perspective view, and an alternative side view, respectively, of connector module 200 with electromagnetic shielding members 210*a* and 210*b* cut away. As shown in FIGS. 13A-13C, outer insulative members 280*a* and 280*b* are disposed on opposite sides of inner insulative member 230. Outer insulative members 280*a* and 280*b* may be formed using a dielectric material such as plastic. Projection 232 of inner insulative member 230 is disposed closer to contact tails 206 than to mating ends 202 and extends in a direction opposite the direction along which contact tails 206 extend.

Mating ends 202 of signal conductors within connector module 200 include compliant receptacles 270*a* and 270*b*, each having mating arms 272*a* and 272*b*. In the illustrated embodiment, compliant receptacles 270*a* and 270*b* are configured to receive and make contact with a mating portion of a signal conductor of a mating connector between mating arms 272*a* and 272*b*.

Also shown in FIGS. 13A-13C, insulative portions of connector module 200 may insulate receptacles 270*a* and 270*b* from each other. Those insulative portions may also position receptacles 270*a* and 270*b* and provide apertures through which mating portions of a mating connector may enter receptacles 270*a* and 270*b*. Those insulative portions may be formed as part of insulative member 230. In the embodiment illustrated, inner insulative member 230 has an extended portion 234, which includes arms 236*a* and 236*b* and apertures 238*a* and 238*b*. Extended portion 234 extends beyond compliant receptacles 270*a* and 270*b* in a direction along which mating ends 202 are elongated. Arms 236*a* and 236*b* are spaced farther apart than are mating ends 202. Apertures 238*a* and 238*b* may be configured to receive wires therethrough such that the wires extend into compliant receptacles 270*a* and 270*b*. For example, gaps between arms 272*a* and 272*b* of compliant receptacles 270*a* and 270*b* are aligned with apertures 238*a* and 238*b*.

Figure 14B:
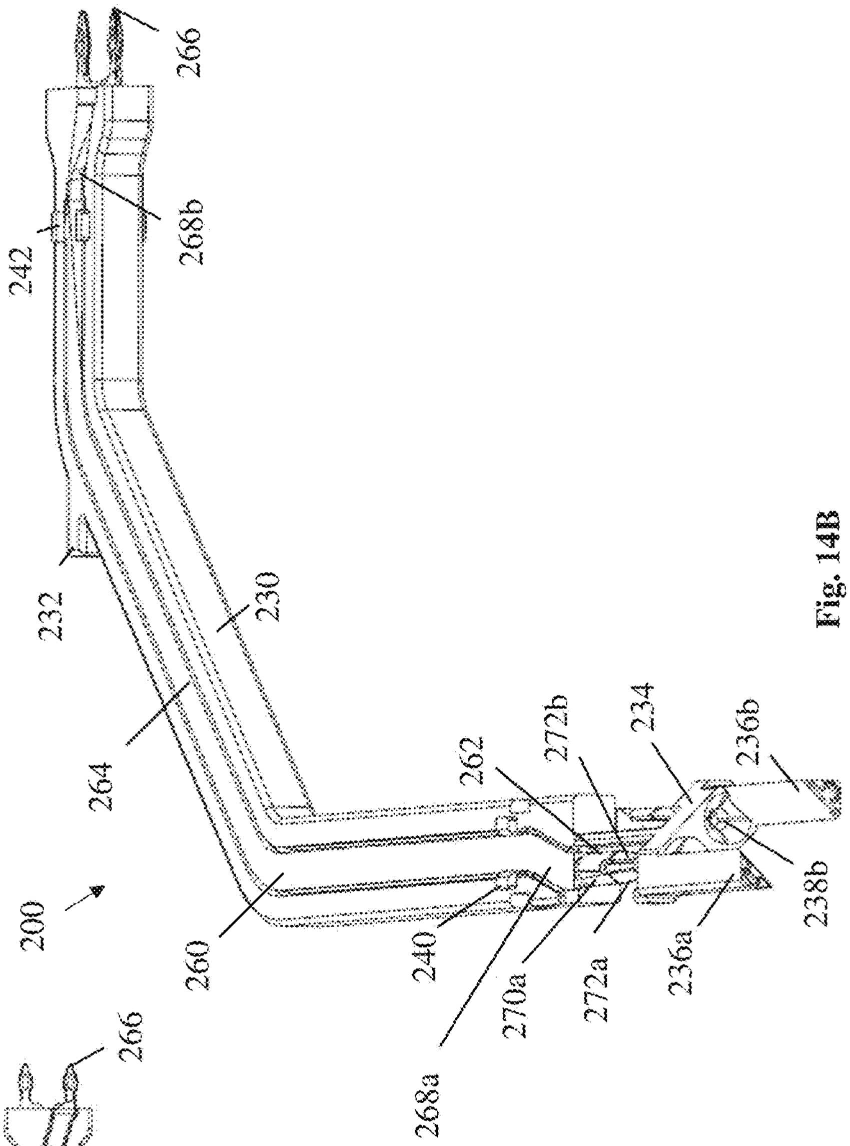
FIG. 14B is a perspective view of connector module 200 of FIG. 14A.
Figure 14A:
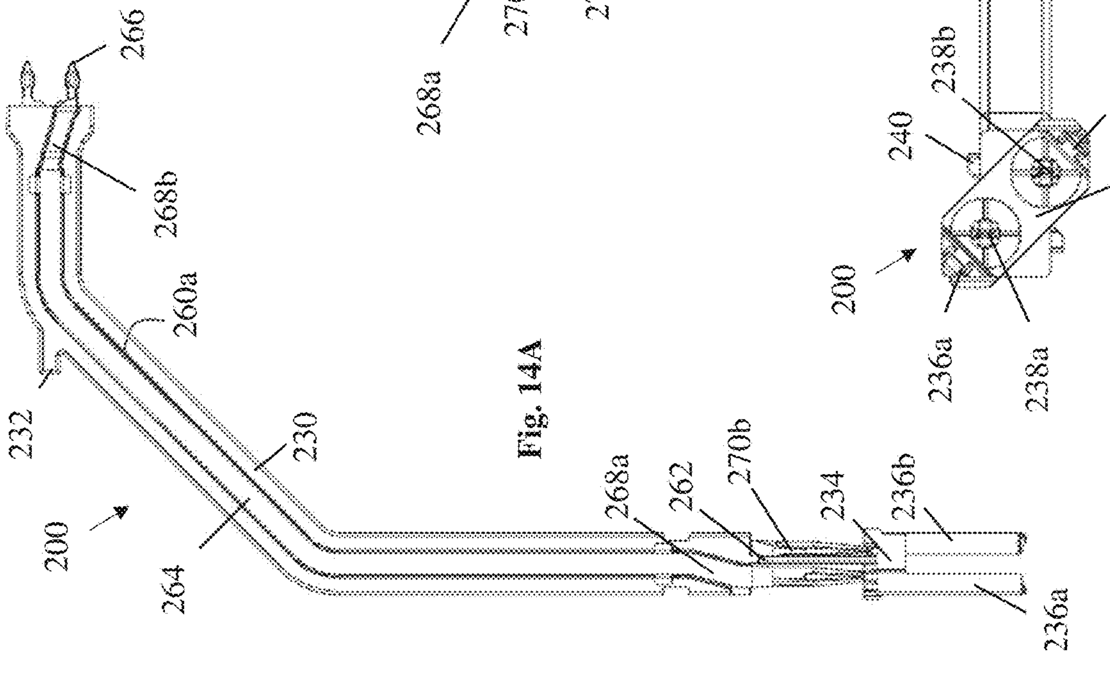
FIG. 14A is a side view of connector module 200 of FIG. 11 with electromagnetic shielding members 210 as well as outer insulative members 180*a* and 180*b* cut away.
Figure 14C:
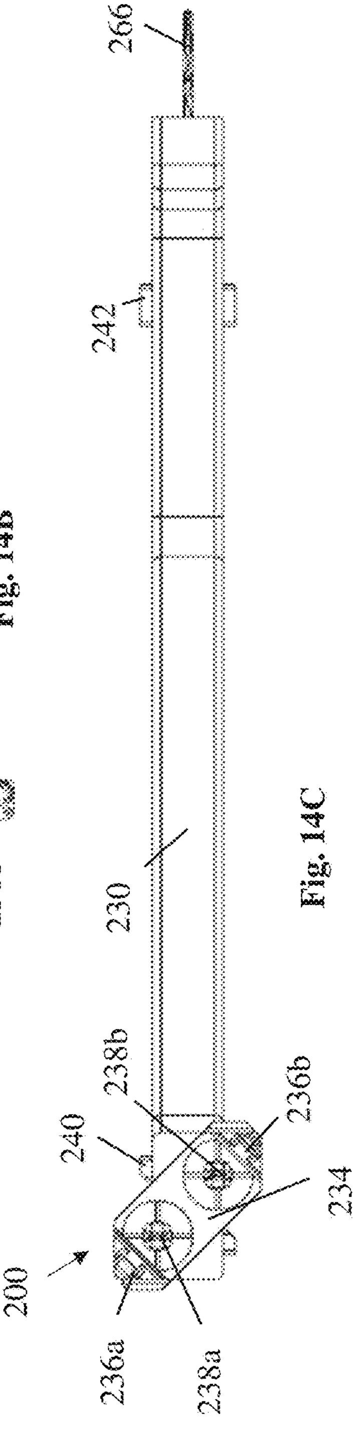
FIG. 14C is an alternative side view of connector module 200 of FIG. 14A.

FIGS. 14A-14C are a side view, a perspective view, and an alternative side view, respectively, of connector module 200 with electromagnetic shielding members 210*a* and 210*b* as well as outer insulative members 280*a* and 280*b* cut away. As shown in FIGS. 14A-14C, connector module 200 includes signal conductors 260, here shown as signal conductors 260*a* and 260*b* implemented as a differential pair. When connector module 200 is assembled, signal conductor 260*a* may be disposed between outer insulative member 280*a* and inner insulative member 230, and signal conductor 260*b* may be disposed between outer insulative member 280*b* and inner insulative member 230.

One or more of inner insulative member 230 and outer insulative members 280*a* and 280*b* may include features to hold the insulative components together, thereby firmly positioning the signal conductors 260 within in the insulative structure. In the illustrated embodiment, first and second retaining members 240 and 242 of inner insulative member 230 may extend into openings in outer insulative members 280*a* and 280*b*. In the illustrated embodiment, first retaining members 240 are disposed adjacent mating ends 202 and extend in a direction perpendicular to the direction along which mating ends 202 extend. Second retaining members 242 are disposed adjacent contact tails 206 and extend in a direction perpendicular to the direction along which contact tails 206 extend.

Intermediate portions of signal conductors 260*a* and 260*b* are on opposite sides of inner insulative member 230. In the illustrated embodiments, signal conductors 260*a* and 260*b* are each stamped from a sheet of metal and then bent into the desired shape. The intermediate portions are flat with a thickness equaling the thickness of the sheet of metal. As a result, the intermediate portions have opposing broadsides, joined by edges that are thinner than the broad sides. In the embodiment, the intermediate portions are aligned broadside to broadside, providing for broadside coupling within the module 200.

In FIGS. 14A-14C, signal conductors 260 include mating ends 262, intermediate portions 264, and contact tails 266 located at mating ends 202, intermediate portions 204, and contact tails 206 of connector module 200. As shown, mating ends 262 include compliant receptacles 270*a* and 270*b*, and contact tails 266 include eye of the needle press fit tails.

In the illustrated embodiment, the mating ends 262 and contact tails 266 of the pair of signal conductors 260 are not aligned broadside to broadside, as are the intermediate portions 264. Accordingly, the relative position of the signal conductors 260*a* and 260*b* of the pair changes between the intermediate portions 264 and each of the mating ends 262 and contact tails 266. The relative positions change in transition regions 268*a* and 268*b*.

A first transition region 268*a* of signal conductors 260 connects mating ends 262 to intermediate portions 264. A second transition region 268*b* connects contact tails 266 of signal conductors 260 to intermediate portions 264. In each of these transition regions 268*a* and 268*b*, the angular position about an axis parallel to the longitudinal dimension of the signal conductors 260*a* and 260*b* of the pair changes. The angular distance between the signal conductors 260*a* and 260*b* may remain the same, such as at 180 degrees. In the illustrated embodiment, the angular position of the signal conductors 260*a* and 260*b* changes 45 degrees within transition region 268*a* and 90 degrees within transition region 268*b* so that, considered across the transition regions 268*a* and 268*b*, there are angular twists to the pair.

Inner insulative member 230 may be shaped to accommodate a pair of signal conductors with such transition regions. In the illustrated embodiment, signal conductors 260 are disposed in grooves 250 on opposite sides of inner insulative member 230. Transition regions 268*a* and 268*b* of signal conductors 260 are disposed within transition guides 252*a* and 252*b* of grooves 250. Grooves 250 of inner insulative member 230 are described herein including with reference to FIG. 15.

Figure 23:
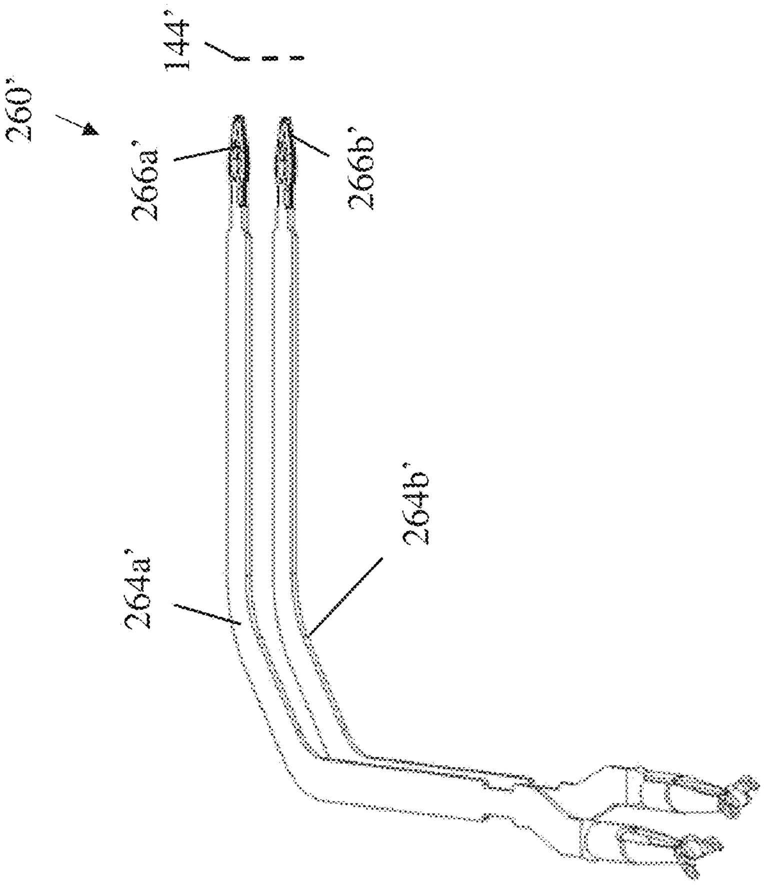
FIG. 23 is a perspective view of signal conductors of an alternative embodiment of a pair of signal conductors.

It should be appreciated that some embodiments do not include second transition region 268*b*, such as in FIG. 23 where the contact tails are shown aligned broadside to broadside.

Figure 15:
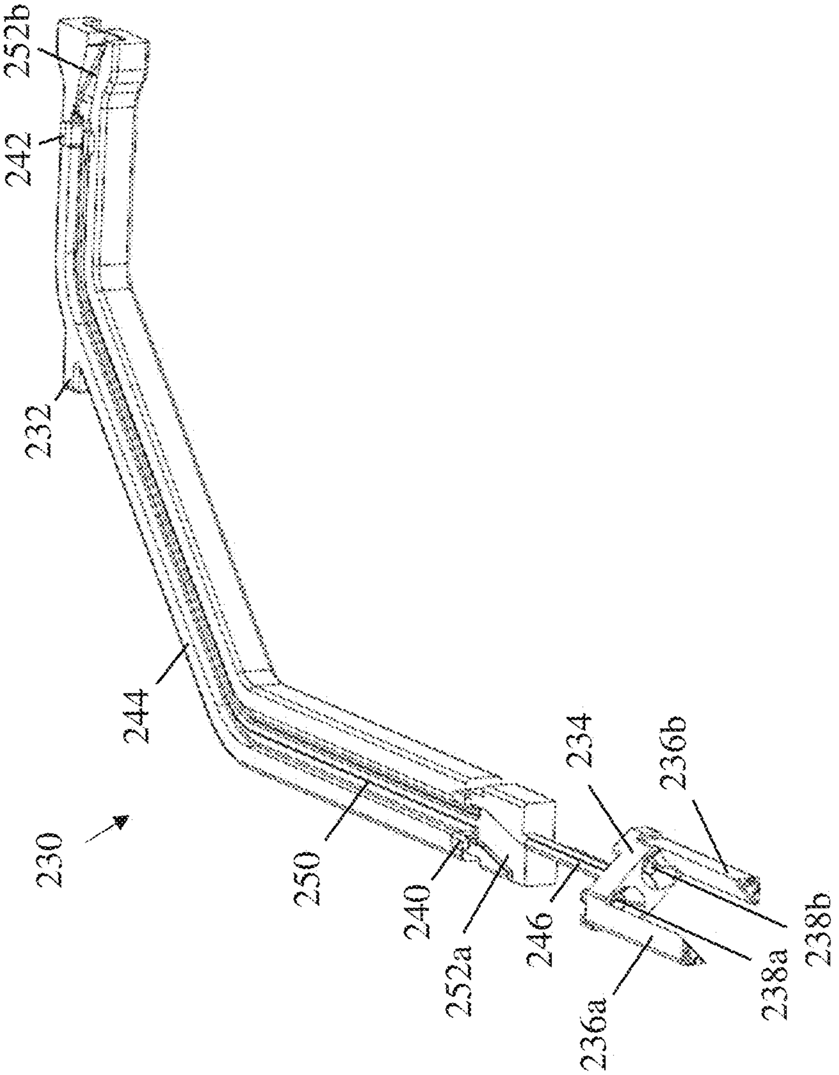
FIG. 15 is a perspective view of inner insulative member 230 of connector module 200 of FIGS. 14A-C.

FIG. 15 is a perspective view of inner insulative member 230 of connector module 200. As shown in FIG. 15, inner insulative member 230 includes main body 244 and extended portion 234 joined together by connecting portion 246. Inner insulative member 230 may be formed using a dielectric material such as plastic and may be formed by molding, for example. Opposing sides of main body 244 include grooves 250. Grooves 250 are shaped to receive signal conductors 260 of connector module 200. In the illustrated embodiment, grooves 250 include first and second transition guides 252*a* and 252*b* configured to conform to the signal conductors in transition regions 268*a* and 268*b*. For example, transition guides 252*a* and 252*b* may be shaped to accommodate a transition of signal conductors 260. Connecting portion 246 is disposed between extended portion 234 and main body 244.

Figures 16A, 16B, 16C:
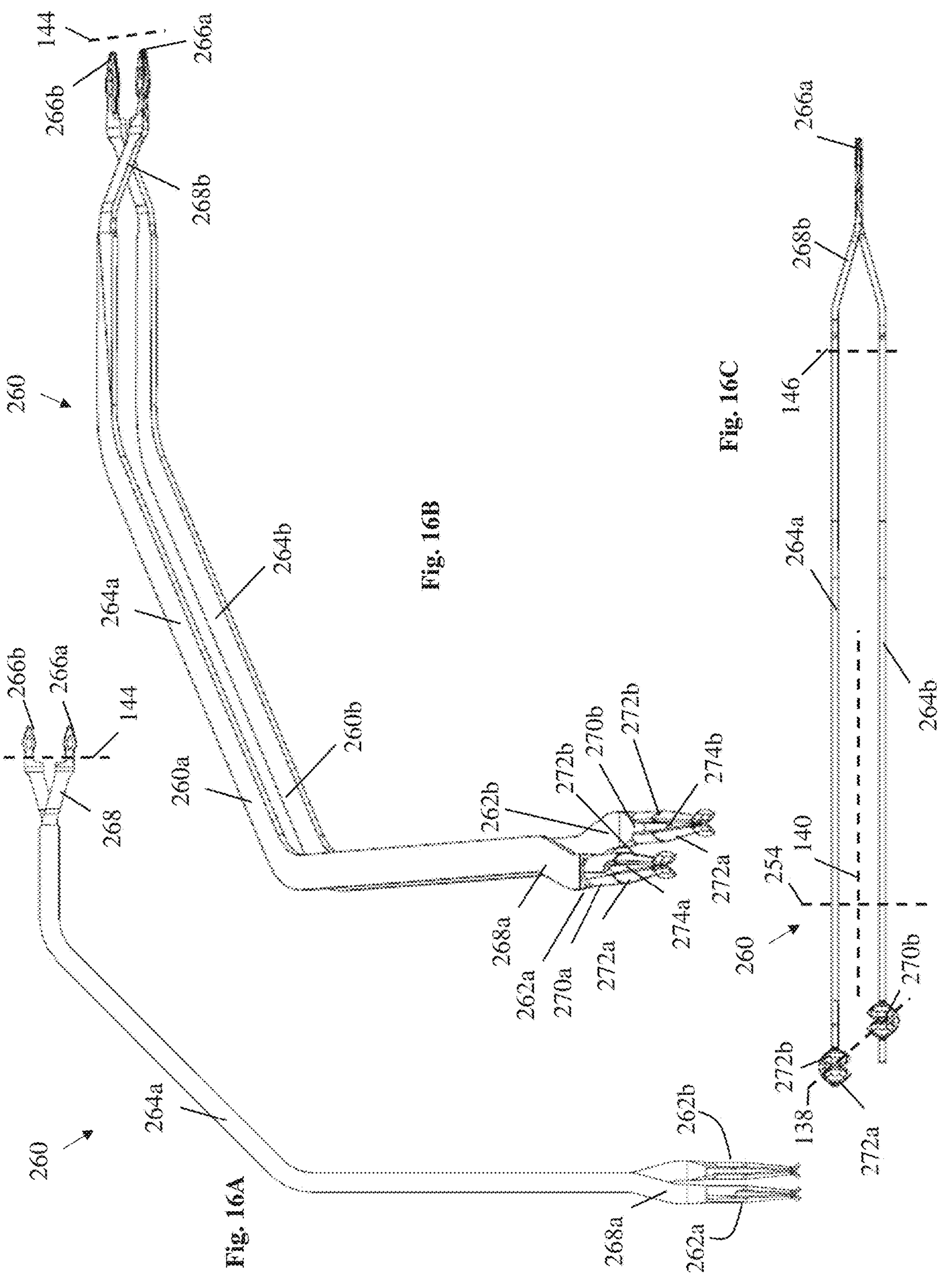
FIG. 16A is a side view of signal conductors 260*a* and 260*b* of connector module 200 of FIG. 14A-C.
FIG. 16B is a perspective view of signal conductors 260*a* and 260*b* of FIG. 16A.
FIG. 16C is an alternative side view of signal conductors 260*a* and 260*b* of FIG. 16A.

FIG. 16A-16C are a side view, a perspective view, and an alternative side view of signal conductors 260*a* and 260*b* of connector module 200 of FIG. 14A-C. As shown in FIGS. 16A-16C, mating ends 262*a* and 262*b* extend in a first direction and contact tails 266*a* and 266*b* extend in a second direction at a right angle relative to the first direction. In the illustrated embodiment, contact tails 266*a* and 266*b* are configured as press-fit ends. Thus, contact tails 266*a* and 266*b* may be configured to compress upon insertion into a hole, such as in a printed circuit board.

Here, each signal conductor 260*a* and 260*b* is configured to carry a component of a differential signal. Signal conductors 260*a* and 260*b* each may be formed as a single, integral conductive element, which may be stamped from a metal sheet. However, in some embodiments, signal conductors 260*a* and 260*b* each may be formed of multiple conductive elements fused, welded, brazed or otherwise joined together. For example, portions of signal conductors 260*a* and 260*b*, such as contact tails 266*a* and 266*b* and mating ends 262*a* and 262*b*, may be formed using super-elastic conductive materials.

As a result of transition region 268*a*, mating ends 262*a* and 262*b* are separated from each other along line 138, while intermediate portions 264*a* and 264*b* adjacent mating ends 262*a* and 262*b* are separated along mating row direction 142. As illustrated, for example in FIG. 7, connector 102 may be constructed such that all of the modules 200 positioned in rows that extend in the row direction 142. All of the modules may include similarly oriented mating ends, such that, for each module, the mating ends of the signal conductors will be separated from each other along a line parallel to line 138.

A relative position of signal conductors 260*a* and 260*b* varies along first transition region 268*a* such that at a first end of first transition region 268*a* adjacent mating ends 262*a* and 262*b*, signal conductors 260*a* and 260*b* are aligned along first parallel line 138, and at a second end of first transition region 268*a* adjacent intermediate portions 264*a* and 264*b*, signal conductors 260*a* and 260*b* are aligned along mating row direction 142. In the illustrated example, first transition region 268*a* provides a 45 degree twist between line 138 and mating row direction 142. Within first transition region 268*a*, signal conductor 260*a* extends away from contact tail column direction 144, and signal conductor 260*b* extends towards contact tail column direction 144.

Despite the variation of the relative position of the signal conductors 260*a* and 260*b* across the transition region, the inventors have recognized and appreciated that signal integrity of the pair of signal conductors may be enhanced by configuring module 200 to maintain each of signal conductors 260*a* and 260*b* adjacent the same respective shielding member 210*a* or 210*b* throughout the transition region. Alternatively or additionally, the spacing between the signal conductors 260*a* and 260*b* and the respective shielding member 210*a* or 210*b* may be relatively constant over the transition region. The separation between signal conductor and shielding member, for example, may vary by no more than 30%, or 20% or 10% in some embodiments.

Module 200 may include one or more features that provide this relative positioning and spacing of signal conductors and shielding members. As can be seen, for example from a comparison of FIGS. 12A . . . 12C and FIGS. 16A . . . 16C, shielding member 210*a* and 210*b* have a generally planar shape in the intermediate portions 204, which parallels the intermediate portions of 264 of a respective signal conductor 260*a* or 260*b*. The shield mating ends 212 may be formed from the same sheet of metal as the intermediate portions, with the shield mating ends 212 twisted with respect to the intermediate portions 204. The twist of the shielding member may have the same angle and/or same rate of angular twist as the signal conductors, ensure that each signal conductor, ensuring that the same shielding member is adjacent the same signal conductor throughout the transition region.

Further, as can be seen in FIGS. 16A-16C, mating ends 262*a* and 262*b* are formed by rolling conductive material of the sheet of metal from which signal conductors 260 are formed into a generally tubular configuration. That material is rolled towards the centerline between mating ends 262*a* and 262*b*. Such a configuration leaves a flat surface of the signal conductors facing outwards toward the shield members, which may aid in keeping a constant spacing between the signal conductors and the shield members, even in the twist region.

It should be appreciated, that a spacing between signal conductors 260*a* and 260*b* may be substantially constant in units of distance. Alternatively, the spacing may provide a substantially constant impedance. In such a scenario, for example, where the signal conductors are wider, such as a result of being rolled into tubes, the spacing relative to the shield may be adjusted to ensure that the impedance of the signal conductors is substantially constant. As shown in FIGS. 16A-16C, contact tails 266*a* and 266*b* are separated along contact tail column direction 144, and intermediate portions 264*a* and 264*b* adjacent contact tails 266*a* and 266*b* are separated along contact tail row direction 146. Thus, contact tails 266*a* and 266*b* are separated along a first direction, and intermediate portions 264*a* and 264*b* adjacent contact tails 266*a* and 266*b* are separated along a second direction perpendicular to the first direction. This difference in the direction in which segments of the same conductors are separated is the result of second transition region 268*b*. In the illustrated embodiment, the signal conductors twist 90 degrees in second transition region 268*b* such that there is a 90 degree difference between the contact tail column direction 144 and second contact tail row direction 146. A relative position of signal conductors 260*a* and 260*b* varies along second transition region 268*b* such that at a first end of second transition region 268*b* adjacent contact tails 266*a* and 266*b*, signal conductors 260*a* and 260*b* are aligned along contact tail column direction 144, and at a second end of second transition region 268*b* adjacent intermediate portions 264*a* and 264*b*, signal conductors 260*a* and 260*b* are aligned along contact tail row direction 146.

As described above, extender modules 300 enable the mating interface of electrical connector 102 to be adapted. In some embodiments, such as is illustrated in FIG. 1, connectors, such as connector 102, may be mated to each other by attaching extender modules to one of the connectors. Extender modules 300 may be mounted on connector modules 200 to provide a modified mating interface for electrical connector 102. Accordingly, extender modules 300 may be configured at one end for attachment to the mating interface of a connector 102 and, at the other end, for mating with a connector 102. In such a configuration, there may be one extender module attached to each connector module 200.

Figures 17A, 17B, 17C:
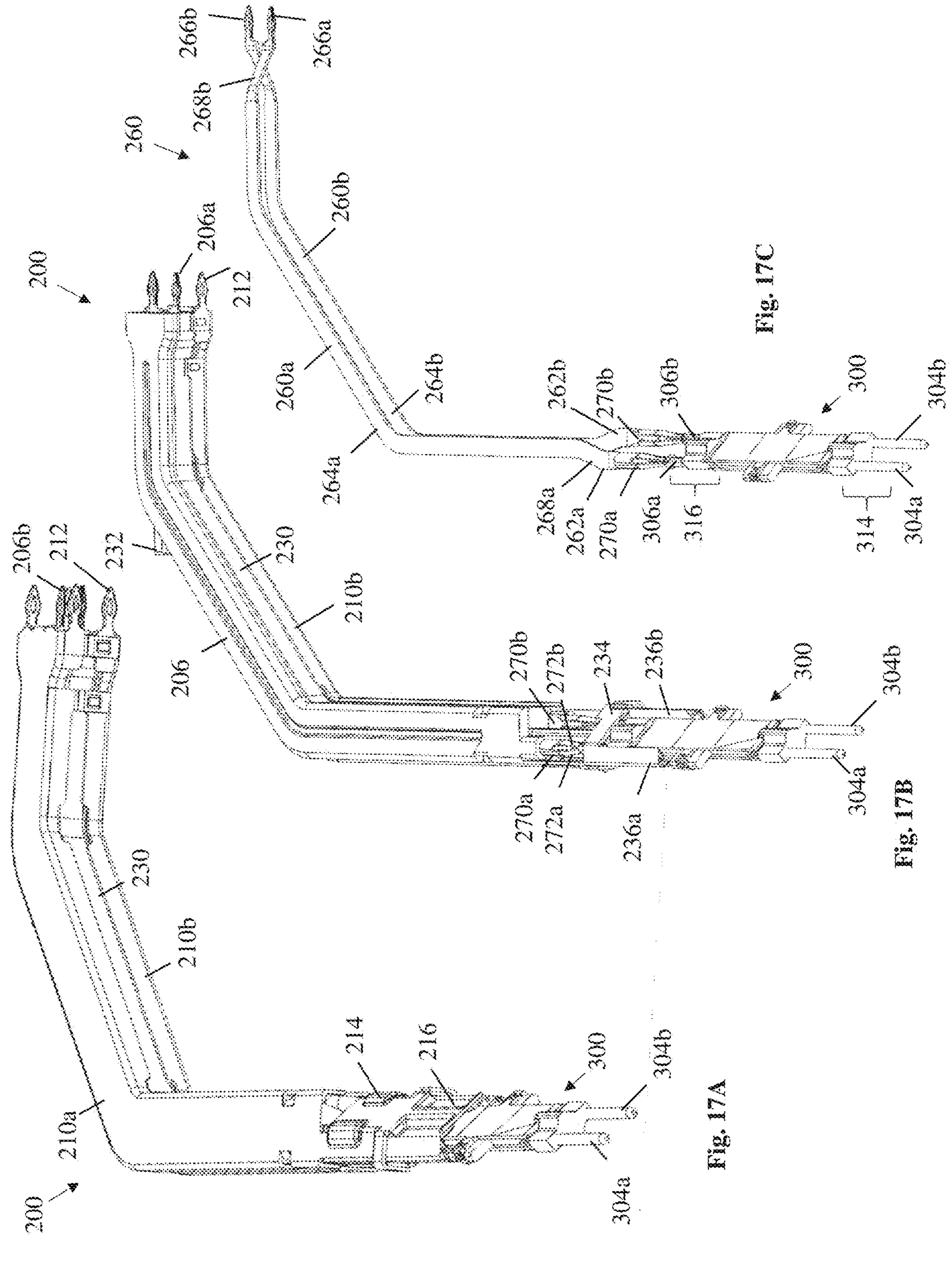
FIG. 17A is a perspective view of connector module 200 of FIG. 11 with extender module 300 of FIG. 5.
FIG. 17B is a perspective view of connector module 200 and extender module 300 of FIG. 17A, with electromagnetic shielding members 210*a* and 210*b* cut away.
FIG. 17C is a perspective view of signal conductors 260 of connector module 200 and extender module of FIG. 17C.

FIG. 17A is perspective view of connector module 200 with an extender module 300 attached. FIG. 17B is a perspective view of connector module 200 and extender module 300, with electromagnetic shielding members 210*a* and 210*b* cut away. FIG. 17C is a perspective view of signal conductors 260 of connector module 200 and extender module of FIG. 17C.

Extender module 300 includes mating portions 304*a* and 304*b* at an end of extender module 300. Mating portions 304*a* and 304*b* extend away from connector module 200. Here, the mating portions 304*a* and 304*b* are configured as round conductors that fit into receptacles of a mating connector. In embodiments in which the mating connector has receptacles, such as receptacles 270*a* and 270*b*, mating arms 272*a* and 272*b* will be sized to be deflected upon insertion of mating portions 304*a* and 304*b*, and generate a contact force. In some embodiments, the contact force may be between 25 and 45 gm. In some embodiments, contact force may be between 30 and 40 gm.

In FIGS. 17A-C, extender module 300 is attached to connector module 200. The attachment between extender module 300 and connector module 200 may be separable such that extender module 300 may be removed from connector module 200 and reattached multiple times. However, in the embodiment illustrated, extender module 300 is configured to make a connection to connector module 200 that remains throughout the useful life of the connector resulting from the combination. Portions 306*a* and 306*b* of signal conductors 302 of extender module 300 extend toward connector module 200 and are configured to make such a connection.

In the illustrated embodiment, mating portions 304*a* and 304*b* of signal conductors 302 of extender module 300 are located at mating interface 314 of extender module 300. Second portions 306*a* and 306*b* of signal conductors 302 of extender module 300 are located at mounting interface 316 of extender module 300. Each of mating portions 304*a* and 304*b* and second portions 306*a* and 306*b* extend along a direction parallel to a direction in which extender module 300 is elongated. Second portions 306*a* and 306*b* include contact tails configured to extend through apertures 238*a* and 238*b* of extended portion 234 of inner insulative member 230. When mounted to connector module 200, second portions 306*a* and 306*b* are positioned between mating arms 272*a* and 272*b* of each of compliant receptacles 270*a* and 270*b*. In the illustrated embodiment, second portions 306*a* and 306*b* terminate in press fit ends configured for inserting between mating arms 272*a* and 272*b*. Mounting second portions 306*a* and 306*b* of signal conductors 302 of extender module 300 to mating ends 262 of signal conductors 260 of connector module 200 may require at least 60 N of force.

In some embodiments, mating portions 304*a* and 304*b* and/or second portions 306*a* and 306*b* may be formed of superelastic conductive materials. Use of superelastic materials may enable those components to have a small width while providing sufficient robustness. For example, mating portions 304*a* and 304*b* may have an effective diameter between 5 and 20 mils. Signal conductors with superelastic mating portions may be formed entirely of superelastic material. Alternatively, conductor may be formed in part from a conventional metal, such as phosphor bronze, with a superelastic component attached to it. For example, the superelastic wire may be attached by tabs forming a mechanical connection or brazed to the conventional metal member. In some embodiments, mating portions 304*a* and 304*b* and/or second portions 306*a* and 306*b* may include superelastic wires having a width between 5 and 20 mils. In some embodiments, mating portions 304*a* and 304*b* and/or second portions 306*a* and 306*b* may include superelastic wire having a width of less than 12 mils.

Mating portions 304*a* and 304*b* of signal conductors 302 of extender module 300 may be configured to mate with mating ends 262*a* and 262*b* of signal conductors 260 of connector module 200. In the illustrated embodiment, mating portions 304*a* and 304*b* terminate in pins configured to extend through apertures 238*a* and 238*b* of extended portion 234 and are sized to fit between arms 272*a* and 272*b* of compliant receptacles 270*a* and 270*b*. When formed using superelastic materials, mating portions 304*a* and 304*b* may be spaced apart a distance less than a distance the apertures of extended portion 234 are spaced apart, such that mating portions 304*a* and 304*b* deform as they extend through the apertures and/or into mating ends 262*a* and 262*b*, and reform when removed from the apertures and/or mating ends 262*a* and 262*b*.

Use of small diameter wires may also support closer spacing between signal pairs within the connector and also shielding surrounding each pair that has a relatively small cross sectional area, including at the mating interface of the connector, where the electromagnetic shielding may have its largest cross sectional area. The effective diameter of the signal conductors at the mating interface is set by the outer dimensions of the arms 272*a* and 272*b* of compliant receptacles 270*a* and 270*b*, as deflected by the insertion of the mating portions 304*a* and 304*b*. Smaller diameter mating portions 304*a* and 304*b* enables the outer dimensions of the arms 272*a* and 272*b*, as deflected, to be smaller. That smaller dimension for the signal conductors in turn leads to smaller separation between the components at the mating interface, including signal conductors and grounded electromagnetic shielding surrounding the signal conductors to provide a desired impedance for the signal conductors.

The cross-sectional area of the largest portion of an electromagnetic shielding, for example, may be in the range of 3 to 5 $mm^2$, with a largest dimension less than 4 mm, such as 3.8 mm or less, or less than 3.5 or 3 mm in some embodiments. Such small dimensions may establish a frequency for the lowest frequency resonant mode supported by the enclosure formed by the electromagnetic shielding that is outside the desired operating range of the connector. Resonant frequencies outside the operating range improve the integrity of signals passing through the connection system.

A further advantage of connectors described herein is the consistency of the mating interfaces provided. Regardless of whether the connector is mated directly with another connector, or with one or more extender modules forming the mating interface therebetween, each mating interface may provide desirable impedance characteristics. For instance, mating portions 304*a* and 304*b* of signal conductors 302 of extender module 300 may provide the same benefits of uniformity of impedance associated with mating portions of a mating connector, even if mating portions 304*a* and 304*b* are not fully seated within the mating ends of the mated connector, such as compliant receptacles 270*a* and 270*b* of connector module 200. In some embodiments, an impedance change between mated and demated configurations of mating ends 202 may be less than 5 ohms at operating frequencies of the connector, such as in a range of 45-50 GHz.

Figure 18C:
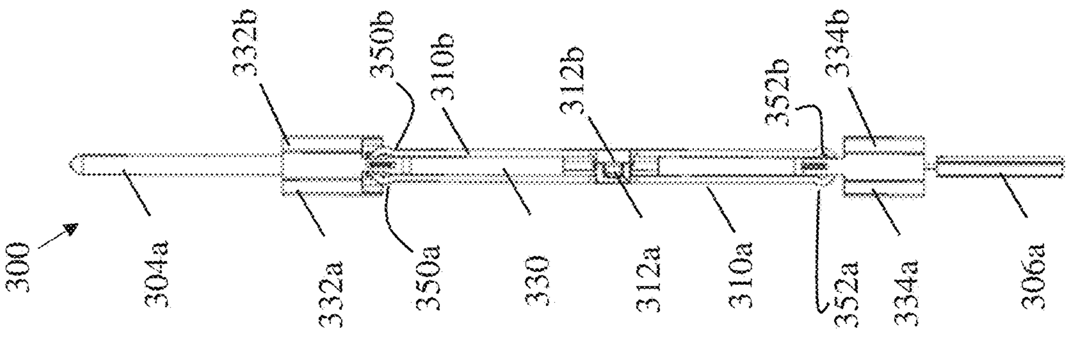
FIG. 18C is an alternative side view of extender module 300 of FIG. 18A.
Figure 18B:
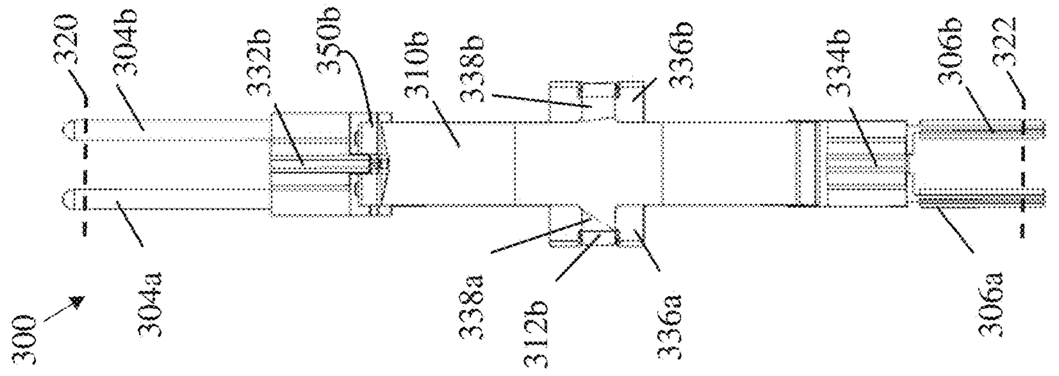
FIG. 18B is a side view of extender module 300 of FIG. 18A.
Figure 18A:
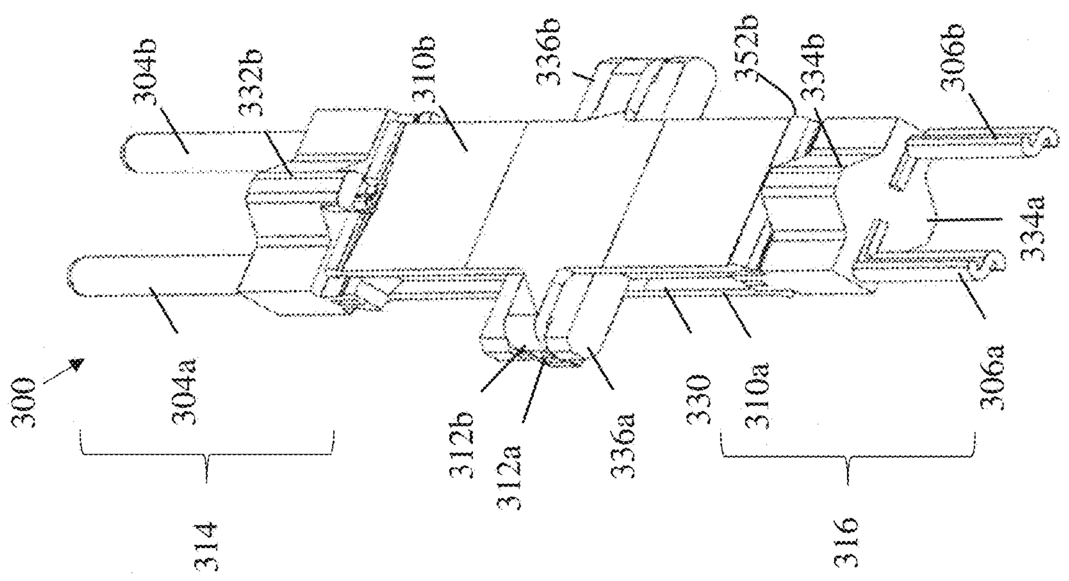
FIG. 18A is a perspective view of extender module 300 of FIG. 5.

FIGS. 18A-18C are a perspective view, a side view, and an alternative side view of extender module 300. As shown in FIGS. 18A-18C, extender module 300 includes insulative member 330, electromagnetic shielding members 310*a* and 310*b*, and a pair of signal conductors that each has a mating portion and a portion for attachment to a signal conductor within a connector extending from insulative member 330.

In the illustrated embodiment, extender module 300 is elongated in a straight line from mating portions 304*a* and 304*b* at mating interface 314 to second portions 306 and 306*b* at mounting interface 316. Mating portions 304*a* and 304*b* of signal conductors 302 are separated from each other along first line 320. Second portions 306*a* and 306*b* of signal conductors 302 are similarly separated from each other along a line, here second line 322 parallel to first line 320.

Additional details of the second portions 306*a* and 306*b* are visible in FIGS. 18A-18C. As illustrated, those portions are press fit tails having a shape that will compress when inserted into an opening to assert a force against the sides of the opening. The press-fit tail is illustrated as an "S" shaped or serpentine cross-section. Press-fits of other shapes, such as an eye of the needle press fit used to attach signal conductors to printed circuit boards may alternatively be used on some or all of the connector modules.

Insulative member 330 may be formed using a dielectric material such as plastic, which may be insert molded or otherwise formed around the signal conductors of the extender module. Insulative member may be formed with structural features. For example, insulative member 330 may include features to facilitate attachment to or mating with signal modules. Projections 332*a* and 332*b* and projections 334*a* and 334*b* may be shaped to fit between projecting portions 216 at mating ends 202 of a connector module 200. Alternatively or additionally, insulative member 330 may include features to facilitate engagement to or positioning with respect to a front housing 110 and/or an extender housing 120. Wings 336*a* and 336*b* may provide this function. Wings 336*a* and 336*b* are disposed between mating interface 314 and mounting interface 316, and extend in opposite directions parallel to lines 320 and 322. Wings 336*a* and 336*b* each have recessed portions 338*a* or 338*b*, which are indented in a direction opposite a direction the respective wing 336*a* or 336*b* extends.

Electromagnetic shielding members 310*a* and 310*b* may be attached on opposite sides of extender module 300. Electromagnetic shielding members 310*a* and 310*b* may include electrically conductive shielding. For example, electromagnetic shielding members 310*a* and 310*b* may be stamped from a sheet of metal. Electromagnetic shielding member 310*a* includes first attachment member 312*a* and electromagnetic shielding member 310*b* includes second attachment member 312*b* for engaging with first attachment member 312*a* to attach electromagnetic shielding members 310*a* and 310*b* to one another. In the illustrated embodiment, first attachment member 312*a* includes a hooked tab and second attachment member 312*b* includes an opening for receiving the tab such that the hooked portion of the tab is latched in the opening. First and second attachment members 312*a* and 312*b* engage with one another at recessed portions 338*a* and 338*b* of wings 336*a* and 336*b*.

Electromagnetic shielding members 310*a* and 310*b* may also include features for mating with electromagnetic shielding members within connector modules to which extender module 300 is mated or attached. In the example of FIGS. 18A-18C, mating contact surfaces are formed on portions of electromagnetic shielding members 310*a* and 310*b*. Mating contact portions 350*a*, 350*b*, 352*a* and 352*b* are formed at each distal end of shielding members 310*a* and 310*b*, adjacent the mating or mounting interfaces. Mating contact portions 350*a*, 350*b*, 352*a* and 352*b* are here illustrated as a convex surface formed in electromagnetic shielding members 310*a* and 310*b*. That convex surface may be plated with gold or other material resistant to oxidation to enhance electrical contact. Further, the distal most portion of the electromagnetic shielding members 310*a* and 310*b*, beyond the mating contact portions, may be embedded within or guarded by portions of insulative member 330 so as to preclude stubbing or catching of electromagnetic shielding members 310*a* and 310*b* on structures with connector modules 200 upon insertion into a mating end 262 of signal conductors 260 of connector module 200.

Figure 19B:
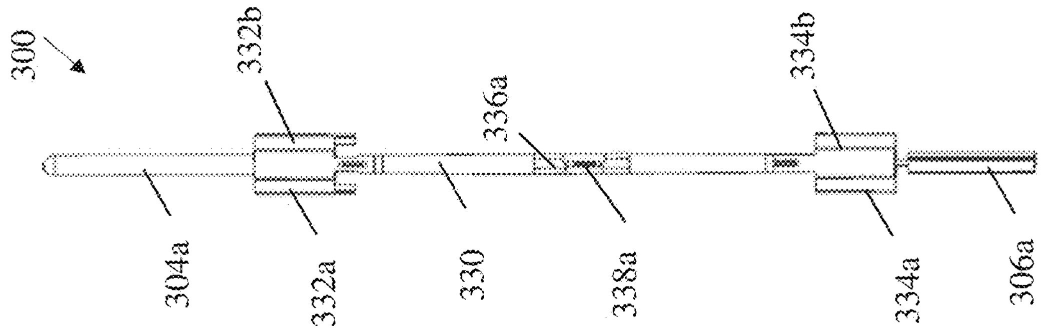
FIG. 19B is a side view of the extender module of FIG. 19A.
Figure 19A:
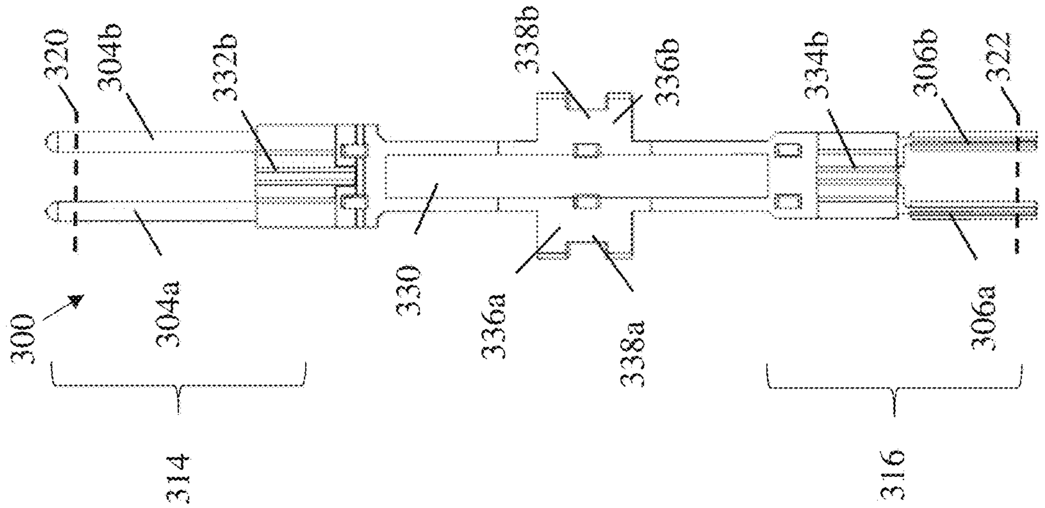
FIG. 19A is a side view of extender module 300 of FIG. 18A, with electromagnetic shielding members 310*a* and 310*b* cut away from the extender module.

FIGS. 19A-19B are a side view and an alternate side view of extender module 300, with electromagnetic shielding members 310*a* and 310*b* cut away from the extender module so as to better illustrate insulative member 330.

Figure 20B:
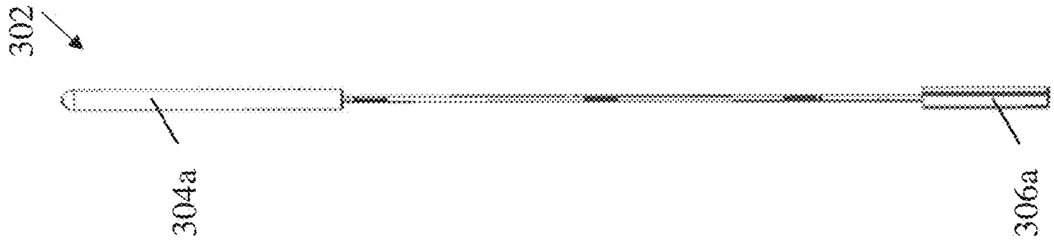
FIG. 20B is an alternative side view of signal conductors 302*a* and 302*b* of FIG. 20A.
Figure 20A:
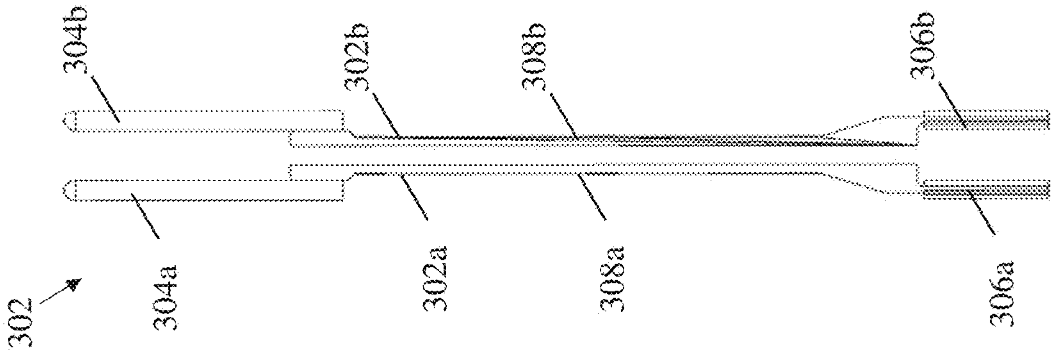
FIG. 20A is a side view of signal conductors 302*a* and 302*b* of extender module 300 of FIG. 18A.

FIGS. 20A-20B are a side view and an alternative side view of signal conductors 302*a* and 302*b* of extender module 300.

Signal conductors 302*a* and 302*b* may be stamped from a sheet of metal. Alternatively, signal conductors 302*a* and 302*b* may be formed using multiple conductive elements fused, welded, brazed or otherwise joined together. For example, mating portions 304*a* and 304*b* and/or second portions 306*a* and 306*b* of signal conductors 302*a* and 302*b* may be formed separately and then attached to one another. Such an approach may enable mating portions 304*a* and 304*b* to be readily formed with smooth surfaces and/or with different material properties. In some embodiments mating portions 304*a* and 304*b* may be formed of a superelastic conductive material. In some embodiments, mating portions 304*a* and 304*b* include superelastic wires having a diameter between 5 and 20 mils.

The construction techniques employed in making extender modules 300 may also be used in forming modules of other configurations. FIG. 21A illustrates a header connector 2120, such as might be mounted to a printed circuit board formed with modules 2130 that may be formed using construction techniques as described above in connection with extender modules 300. In this example, header connector 2120 has a mating interface that is the same as the mating interface of connector 102*a*. In the illustrated embodiment, both have mating ends of pairs of signal conductors aligned along parallel lines angled at 45 degrees relative to column and/or row directions of the mating interface. Accordingly, header connector 2120 may mate with a connector in the form of connector 102*b*. The mounting interface 2124 of header connector 2120, however, is in a different orientation with respect to the mating interface than the mounting interface of connector 102*a*. Specifically, mounting interface 2124 is parallel to mating interface 2122 rather than perpendicular to it. Header connector 2120 may be adapted for use in backplane, midboard, mezzanine, and other such configurations. For example, header connector 2120 may be mounted to a backplane, a midplane or other substrate that is perpendicular to a daughtercard or other printed circuit board to which a right angle connector, such as connector 102*b*, is attached.

Alternatively, header connector 2120 may receive a mezzanine connector having a same mating interface as connector 102*b*. The mating ends of the mezzanine connector may face a first direction and the contact tails of the mezzanine connector may face a direction opposite the first direction. For example, the mezzanine connector may be mounted to a printed circuit board that is parallel to the substrate onto which header connector 2120 is mounted.

In the embodiment illustrated in FIG. 21A, header connector 2120 has a housing 2126, which may be formed of an insulative material such as molded plastic. However, some or all of housing 2126 may be formed of lossy or conductive material. The floor of housing 2126, though which connector modules pass, for example, may be formed of or include lossy material coupled to electromagnetic shielding of connector modules 2130. As another example, housing 2126 may be die cast metal or plastic plated with metal.

Housing 2126 may have features that enable mating with a connector. In the illustrated embodiment, housing 2126 has features to enable mating with a connector 102*b*, the same as housing 120. Accordingly, the portions of housing 2126 that provide a mating interface are as described above in connection with housing 120 and FIG. 2A. The mounting interface 2124 of housing 2126 is adapted for mounting to a printed circuit board.

Such a connector may be formed by inserting connector modules 2130 into housing 2126 in rows and columns. Each module may have mating contact portions 2132*a* and 2132*b*, which may be shaped like mating portions 304*a* and 304*b*, respectively. Mating contact portions 2132*a* and 2132*b* may similarly be made of small diameter superelastic wires.

Figure 21B:
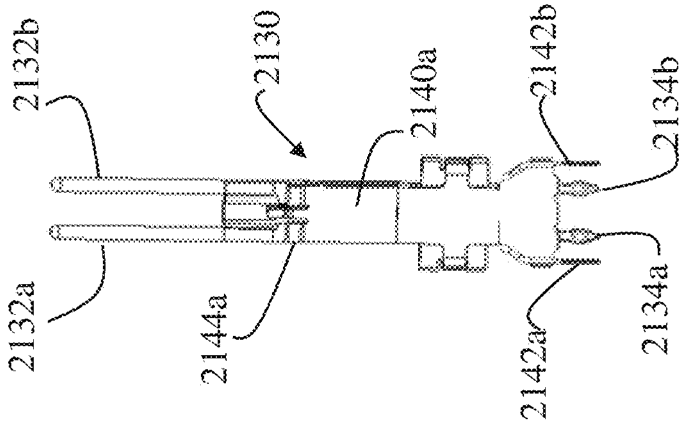
FIG. 21B is a perspective view of a connector module of the header connector of FIG. 21A.
Figure 22:
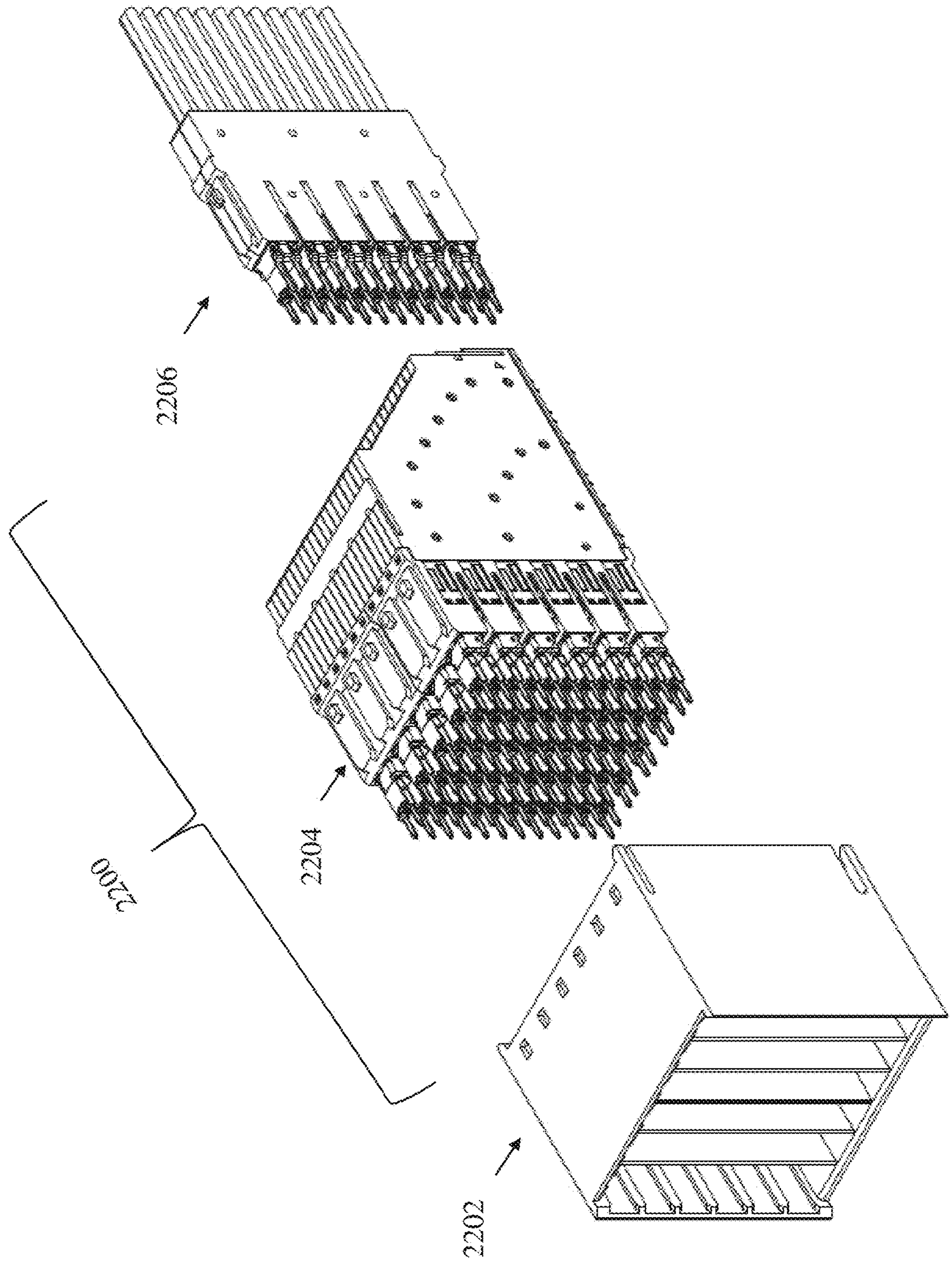
FIG. 22 is a perspective view of an alternative configuration of a connector in which some connector modules are configured for attachment to a printed circuit board and other connector modules are terminated to a cable.

FIG. 21B shows an exemplary connector module 2130 in greater detail. As with extender module 300, portions of a pair of conductive elements may be held within an insulative portion (not numbered). Mating contact portions 2132*a* and 2132*b*, which may be integral with the portions of the conductive elements within the housing or separately formed and attached to those portions, extend from a mating interface portion of connector module 2130.

Contact tails 2134*a* and 2134*b* may extend from a mounting interface portion of the connector module 2130. Contact tails 2134*a* and 2134*b* may be integral with the portions of the conductive elements within the housing, and may be shaped like contact tails 206*a* and 206*b* (FIG. 17C).

Connector module 2130 may also have electromagnetic shielding members on opposing sides, similar to electromagnetic shielding members 310*a* and 310*b*. Electromagnetic shielding member 2140*a* is visible in the view of FIG. 21B. A complementary shielding member (not visible) may be attached to the opposing side of connector module 2130. The mating end of shielding member 2140*a* may be shaped similarly to the mating ends of shielding members 310*a* and 310*b*. For example, shielding member 2140*a* includes mating contact portion 2144*a*, which may be shaped like mating contact portion 350*a*.

The mounting ends of connector module 2130 may be shaped like the mounting ends of connector modules 200. Accordingly, the electromagnetic shielding members may include contact tails 2142*a* and 2142*b* that are shaped and positioned with respect to contact tails 2134*a* and 2134*b* in the same way that electromagnetic shielding tails 220 are shaped and positioned with respect to contact tails 206*a* and 206*b*.

In the embodiment illustrated in FIG. 21A, pairs of mating contact portions 2132*a* and 2132*b* are separated from each other along parallel lines that are at an approximately 45 degree angle with respect to the row and/or column directions. Such a configuration may be achieved by conductive elements passing straight through connector modules 2130 such that contact tails 2134*a* and 2134*b* are in the same plane as mating contact portions 2132*a* and 2132*b*. In that configuration, module 2130 would be mounted in housing 2126 with the side visible in FIG. 21B at a 45 degree angle with respect to the row and column directions.

Mounting connector modules 2130 with such a 45 degree rotation with respect to the row or column direction may produce a footprint similar to that shown in FIG. 8. However, each of the mounting locations, such as mounting locations 194*a* and 194*b*, would similarly be rotated 45 degrees with respect to the row and column directions. In such a configuration, routing channels might be created in the row direction, as illustrated, in FIG. 8. Rather than routing channels in the column direction, routing channels might extend at a 45 degree angle with respect to the row direction.

Alternatively, connector modules 2130 might be configured to provide a footprint as in FIG. 8. The mounting interface 2124 may be configured like the mounting interface illustrated in FIG. 7, for example. Such a mounting interface may be achieved by a 45 degree twist in the conductive elements passing through connector modules 2130. In such an embodiment, the conductive elements may be shaped with such a twist and inserted into a portion of a housing with a groove similarly shaped to provide such a twist.

Modularity of components as described herein may support other connector configurations using the same or similar components. Those connectors may be readily configured to mate with connectors as describe herein. FIG. 22, for example, illustrates a modular connector in which some of the connector modules, rather than having contact tails configured for mating with a printed circuit board, are configured for terminating a cable, such as a twin-ax cable. In the example of FIG. 22, a connector has a wafer assembly 2204, a cabled wafer 2206 and a housing 2202. In this example, cabled wafer 2206 may be positioned side-by-side with the wafers in wafer assembly 2204 and inserted into housing 2202, in the same way that wafers are inserted into a housing 110 or 120 to provide a mating interface with receptacles or pins, respectively. In alternative embodiments, the connector of FIG. 22 may be solely a cable connector, such as by having only cabled wafers 2206, or may be a hybrid-cable connector as shown with wafer assembly 2204 and cabled wafer 2206 side by side or, in some embodiments, with some modules in the wafer having tails configured for attachment to a printed circuit board and other modules having tails configured for terminating a cable.

With a cabled configuration, signals passing through that mating interface of the connector may be coupled to other components within an electronic system including connector 2200. Such an electronic system may include a printed circuit board to which connector 2200 is mounted. Signals passing through the mating interface in modules mounted to that printed circuit board may pass over traces in the printed circuit board to other components also mounted to that printed circuit board. Other signals, passing through the mating interface in cabled modules may be routed through the cables terminated to those modules to other components in the system. In some system, the other end of those cables may be connected to components on other printed circuit boards that cannot be reached through traces in the printed circuit board.

In other systems, those cables may be connected to components on the same printed circuit board to which the other connector modules are mounted. Such a configuration may be useful because connectors as described herein support signals with frequencies that can be reliably passed through a printed circuit board only over relatively short traces. High frequency signals, such as signals conveying 56 or 112 Gbps, are attenuated significantly in traces on the order of 6 inches long or more. Accordingly, a system may be implemented in which a connector mounted to a printed circuit board has cabled connector modules for such high frequency signals, with the cables terminated to those cabled connector modules also connected at the mid-board of the printed circuit board, such as 6 or more inches from the edge or other location on the printed circuit board at which the connector is mounted.

In the example of FIG. 22, the pairs at the mating interfaces are not rotated with respect to the row or column direction. But a connector with one or more cabled wafers may be implemented with rotation of the mating interface as described above. For example, mating ends of the pairs of signal conductors may be disposed at an angle of 45 degrees relative to mating row and/or mating column directions. The mating column direction for a connector may be a direction perpendicular to board mounting interface, and the mating row direction may be the direction parallel to the board mounting interface.

Further, it should be appreciated that, though FIG. 22 shows that cabled connector modules are in only one wafer and all wafers have only one type of connector module, neither is a limitation on the modular techniques described herein. For example, the top row or rows of connectors modules may be cabled connector modules while the remaining rows may have connector modules configured for mounting to a printed circuit board.

Additional exemplary embodiments of the technology described herein are described further below.

In a first example, a connector module comprises a pair of signal conductors, wherein the pair of signal conductors comprises a pair of mating ends, a pair of contact tails and a pair of intermediate portions connecting the pair of mating ends to the pair of contact tails, the pair of mating ends are elongated in a direction that is at a right angle relative to a direction in which the pair of contact tails are elongated, the mating ends of the pair of mating ends are separated in a direction of a first line, the intermediate portions of the pair of intermediate portions are separated in a direction of a second line, and the first line is disposed at an angle greater than 0 degrees and less than 90 degrees relative to the second line.

The first line may be disposed at an angle greater than 30 degrees and less than 60 degrees relative to the second line.

The first line may be disposed at a 45 degree angle relative to the second line.

The pair of signal conductors may further comprise a transition region connecting the pair of intermediate portions and the pair of mating ends, at which a first signal conductor of the pair of signal conductors extends towards a third line along which the pair of contact tails are separated, and a second signal conductor of the pair of signal conductors extends away from the third line.

The connector module may further comprises electromagnetic shielding at least partially surrounding the mating ends of the pair of signal conductors, and the electromagnetic shielding bounds an area around the mating ends of less than 4.5 $mm^2$.

The electromagnetic shielding may be embossed with an outwardly projecting portion adjacent the transition region, so as to offset changes in impedance along a length of the pair of signal conductors associated with changes in shape of the pair of signal conductors along the length.

The electromagnetic shielding may be further embossed with an inwardly projecting portion adjacent the pair of mating ends so as to reduce a disparity between a mated and partially demated impedance of the connector module.

The electromagnetic shielding may comprise a pair of electrically conductive shielding members, each of the electrically conductive shielding members may comprise an intermediate portion and a mating portion integral with the intermediate portion and a transition between the mating portion and the intermediate portion, and the transition may provide a twist in the shielding members at the angle of the first line with respect to the second line.

The connector module may further comprise a first insulative member supporting the pair of signal conductors, each mating end of the pair of mating ends of the pair of signal conductors may comprise a pair of mating arms separated by a gap, and the first insulative member may comprise a portion extending beyond the pair of mating ends and comprising a pair of apertures aligned with the gaps.

The pair of mating ends may be configured to receive wires through the pair of apertures and to retain the wires between the pairs of mating arms.

The contact tails may be configured for inserting into holes in a substrate.

The contact tails may be configured for inserting into holes having a diameter of less than or equal to 20 mils.

The contact tails may each have a width between 6 and 20 mils.

The contact tails may be configured for inserting into holes having a diameter of less than or equal to 10 mils.

The contact tails may each have a width between 6 and 10 mils.

The contact tails may be configured for making electrical connection to pads of a substrate.

The transition region may comprise a 45 degree transition of the pair of signal conductors over a length between 1.4 and 2 mm.

The connector module may further comprise an insulative portion comprising a first side and a second side, the first side comprises a first groove and the second side comprises a second groove, and a first intermediate portion of the pair of intermediate portions is disposed in the first groove and a second intermediate portion of the pair of intermediate portions is disposed in the second groove.

In a second example, a wafer may comprise a plurality of signal conductor pairs, each signal conductor pair comprising a pair of mating ends, a pair of contact tails and a pair of intermediate portions connecting the pair of mating ends to the pair of contact tails, the pairs of mating ends of the plurality of signal conductor pairs are positioned in a column along a column direction, the intermediate portions of the pairs of intermediate portions of the plurality of signal conductor pairs are aligned in a direction perpendicular to the column direction and positioned for broadside coupling, and the mating ends of the plurality of signal conductor pairs are separated along lines disposed at an angle of greater than 0 degrees and less than 90 degrees relative to the column direction.

The lines may be disposed at an angle of greater than 30 degrees and less than 60 degrees relative to the column direction.

The lines may be disposed at an angle of 45 degrees relative to the column direction.

The wafer may further comprise a housing supporting the plurality of signal conductor pairs.

Each of the plurality of signal conductor pairs may comprise a plurality of connector modules, each connector module of the plurality of connector modules further comprised of electromagnetic shielding disposed around the signal conductor pair, with portions of the electromagnetic shielding at least partially surrounding the mating ends of the signal conductors of the signal conductor pair and being rectangular with a width less than 2 mm and a length less than 3.8 mm.

The housing may comprise a first housing member comprising a plurality of grooves, and a connector module of the plurality of connector modules is disposed within a groove of the plurality of grooves.

The housing may be formed of a lossy conductive material.

The column direction may be a mating interface column direction, the pairs of contact tails of the plurality of signal conductor pairs are positioned in a column along a mounting interface column direction, and contact tails of the pairs of contact tails may be separated in a mounting interface row direction perpendicular to the mounting interface column direction.

The mating interface column direction may be orthogonal to the mounting interface column direction.

The pairs of contact tails may be configured to be inserted into holes having a diameter of less than or equal to 20 mils.

Each contact tail of the pairs of contact tails may have a width between 6 and 20 mils.

The pairs of contact tails may be configured to be inserted into holes having a diameter of less than or equal to 10 mils.

Each contact tail of the pairs of contact tails may have a width between 6 and 10 mils.

Center-to-center spacing between adjacent pairs of contact tails in the mounting interface column direction may be less than or equal to 5 mm.

Center-to-center spacing between adjacent pairs of contact tails in the mounting interface column direction may be less than or equal to 2.4 mm.

The mounting interface row direction may be orthogonal to the mounting interface column direction.

In a third example, a connector may comprise a plurality of signal conductor pairs. For each signal conductor pair of the plurality of signal conductor pairs, the signal conductor pair comprises a pair of mating ends, a pair of contact tails, and a pair of intermediate portions connecting the pair of mating ends to the pair of contact tails, the signal conductor pair further comprises a transition region between the pair of mating ends and the pair of intermediate portions, the pairs of mating ends of the plurality of signal conductor pairs are disposed in an array comprising a plurality of rows, the plurality of rows extending along a row direction and spaced from each other in a column direction perpendicular to the row direction, the pairs of mating ends of the plurality of signal conductor pairs are aligned along first parallel lines that are disposed at an angle of greater than 0 degrees and less than 90 degrees relative to the row direction, and, for each signal conductor pair of the plurality of signal conductor pairs, within the transition region, a relative position of the signal conductors of the signal conductor pair varies such that, at a first end of the transition region adjacent the mating end, the signal conductors are aligned along a line of the first parallel lines and at a second end of the transition region the signal conductors are aligned in the row direction.

The first parallel lines may be disposed at an angle of greater than 30 degrees and less than 60 degrees relative to the row direction.

The first parallel lines may be disposed at an angle of 45 degrees relative to the row direction.

Each pair of intermediate portions may be broadside coupled, and wherein each pair of contact tails is broadside coupled.

The pairs of contact tails of the plurality of signal conductor pairs may be arranged in a second array, and the second array comprises columns of the pairs of contact tails extending along a third direction.

The third direction may be orthogonal to the row direction.

The third direction may be perpendicular to both of the column direction and the row direction.

Each of the plurality of signal conductor pairs may further comprise a second transition region, within the second transition regions, a relative position of signal conductors of the signal conductor pairs may vary such that, at a first end of the second transition region adjacent the contact tails, the pair of signal conductors are aligned along second parallel lines parallel to the third direction, and, at a second end of the transition region adjacent the intermediate portions, the pair of signal conductors are aligned along third parallel lines disposed at an angle of greater than 45 degrees and less than 135 degrees relative to the third direction.

The second parallel lines may be disposed at an angle of greater than 80 degrees and less than 100 degrees relative to the third direction.

The second parallel lines may be perpendicular to the third direction.

The second parallel lines may be parallel to the row direction.

An electronic assembly may comprise the connector of the third example in combination with a first printed circuit board comprising a first edge, wherein the connector is a first connector and the contact tails of the first connector are mounted to the first printed circuit board adjacent the first edge, a second printed circuit board, and a second connector mounted to the second printed circuit board and configured for mating with the first connector.

The contact tails of the first connector may be inserted into holes of the first printed circuit board.

The contact tails of the first connector may be mounted to pads on a surface of the first printed circuit board.

The contact tails of the first connector may be pressed into holes of the first printed circuit board having unplated diameters of less than or equal to 20 mils.

The contact tails of the first connector may have a width between 6 and 20 mils.

The contact tails of the first connector may be pressed into holes of the first printed circuit board having unplated diameters between 6 and 12 mils.

The contact tails of the first connector may have a width between 6 and 12 mils.

The first printed circuit board may comprise first and second layers, traces fabricated on the first layer and extending in a first direction may be connected to a first of the pairs of contact tails of the first connector, and traces fabricated on the second layer and extending in a second direction perpendicular to the first direction may be connected to a second of the pairs of contact tails of the first connector.

The second array may comprise the pairs of contact tails of the first connector, the pairs of contact tails being disposed in a repeating pattern with center-to-center spacing between adjacent pairs of contact tails in the third direction of less than or equal to 5 mm and center-to-center spacing between adjacent pairs of contact tails in a direction perpendicular to the third direction of less than or equal to 5 mm.

The second array may comprise the pairs of contact tails of the first connector, the pairs of contact tails may be disposed in a repeating pattern with center-to-center spacing between adjacent pairs of contact tails in the third direction of less than or equal to 2.4 mm and center-to-center spacing between adjacent pairs of contact tails in a direction perpendicular to the third direction of less than or equal to 2.4 mm.

The first printed circuit board may be perpendicular to the second printed circuit board.

A surface of the second printed circuit board may face the mating ends of the first connector.

The mating ends of the first connector may extend in a first direction, the contact tails of the first connector may extend in a second direction, and a surface of the second printed circuit board may faces in a direction perpendicular to the first and second directions.

The second connector may further comprise a plurality of signal conductor pairs, each of the plurality of signal conductor pairs may comprise a pair of mating ends, a pair of contact tails, a pair of intermediate portions connecting the pair of mating ends to the pair of contact tails, and a transition region between the pair of mating ends and the pair of intermediate portions, the mating ends of the plurality of signal conductor pairs may be disposed in a first array comprising a plurality of rows, the plurality of rows extending along the row direction and spaced from each other in the column direction perpendicular to the row direction, the signal conductors of the signal conductor pairs may be aligned along first parallel lines that are disposed at an angle of greater than 0 degrees and less than 90 degrees relative to the row direction, and, within the transition regions, a relative position of the signal conductors of the signal conductor pairs may vary such that, at a first end of the transition region adjacent the mating ends, the signal conductors are aligned along the first parallel lines and at an end of the transition region the signal conductors are aligned in the row direction.

The second connector may further comprise a plurality of extender modules, each of the plurality of extender modules comprising a pair of signal conductors each having first and second portions, the second portions of the plurality of extender modules are mounted to mating ends of the plurality of signal conductors of the second connector, the first portions of the plurality of extender modules are configured to be received in the mating ends of the first connector, and the pairs of signal conductors of the plurality of extender modules are each elongated in a straight line from the first portions to the second portions.

The electronic assembly may be further configured to transmit data from the first connector to the second connector at a rate of approximately 112 Gb/s.

The electronic assembly may be further configured to operate with a bandwidth of approximately 50-60 GHz.

In a fourth example, a connector module comprises an insulative member and a pair of signal conductors held by the insulative member, wherein each signal conductor of the pair of signal conductors comprises a first portion at a first end, a second portion at a second end extending from the insulative portion and an intermediate portion disposed between the first and second ends, and the first portion comprises a wire with a diameter between 5 and 20 mils.

The wire may be a superelastic wire.

The superelastic wire of each signal conductor of the pair of signal conductors may be brazed to the intermediate portion of the signal conductor.

The connector module may further comprise electromagnetic shielding at least partially surrounding the intermediate portions of the pair of signal conductors, and the electromagnetic shielding bounds an area around the first portions of less than 4.5 $mm^2$.

The electromagnetic shielding may be embossed with an outwardly projecting portion adjacent the first ends, so as to offset changes in impedance along a length of the pair of signal conductors associated with changes in shape of the pair of signal conductors along the length.

The electromagnetic shielding member may be further embossed with an inwardly projecting portion adjacent distal ends of the first portions so as to reduce a disparity between a fully mated and a partially demated impedance of the connector module.

The electromagnetic shielding member may comprise electrically conductive shielding.

The second portions may comprise superelastic wires with a width between 5 and 20 mils.

The diameter of the superelastic wires may be less than 12 mils.

The superelastic wires may be configured for inserting into a hole having a diameter of less than or equal to 10 mils.

A mating force of the superelastic wires may be between 25 and 45 gm.

A mating force of the superelastic wires may be between 30 and 40 gm.

The second portions may comprise press-fit members.

Cross sections of the press-fit members may have a serpentine shape.

An electrical connector may comprise a plurality of the connector modules disposed in a plurality of parallel rows, extending in a row direction.

An impedance change between fully mated and partially demated configurations of the first portions may be less than 5 Ohms at 20 GHz.

Second portions of the connector modules of the plurality of connector modules may comprise contact tails, pairs of the contact tails being disposed in a second plurality of rows extending in a first direction and positioned along a second direction perpendicular to the first direction in a repeating pattern with center-to-center spacing between adjacent pairs of contact tails in the first direction of less than or equal to 2.5 mm and center-to-center spacing between adjacent pairs of contact tails in the second direction perpendicular to the first direction of less than or equal to 2.5 mm.

Second portions of the plurality of connector modules may comprise contact tails, pairs of the contact tails being disposed in a second plurality of rows extending in a first direction and positioned along a second direction perpendicular to the first direction in a repeating pattern with center-to-center spacing between adjacent pairs of contact tails in the first direction of less than or equal to 2.4 mm and center-to-center spacing between adjacent pairs of contact tails in the second direction perpendicular to the first direction of less than or equal to 2.4 mm.

First portions of each signal conductor pair of the plurality of connector modules may be aligned along first parallel lines disposed at a 45 degree angle with respect to the row direction.

An overall impedance of each connector module may be between 90 ohms and 100 ohms over the range of 45-50 GHz.

In a fifth example, an extender module comprises a pair of signal conductors, each signal conductor of the pair of signal conductors comprising a first portion at a first end and a second portion at a second end and electromagnetic shielding at least partially surrounding the pair of signal conductors, the first portions of the pair of signal conductors are configured as mating portions and are positioned along a first line, and the second portions of the pair of signal conductors are configured to compress upon insertion into a hole and are positioned along a second line parallel to the first line.

The electromagnetic shielding may comprise electrically conductive shielding.

The second portions may be "S" shaped in cross-section.

The second portions may be configured for insertion into interface holes having a diameter of less than or equal to 20 mils.

The second portions may have a width between 6 and 20 mils.

The second portions may be configured for inserting into interface holes having a diameter of less than or equal to 10 mils.

The second portions may have a width between 6 and 10 mils.

A connector may comprise an insulative portion and plurality of signal conductors supported by the insulative portion, each of the plurality of signal conductors having a mating portion bounding an interface hole, and a plurality of the extender modules, the second portions of the signal conductors of the extender modules being inserted into the interface holes.

The plurality of extender modules may further comprise a plurality of signal conductor pairs having pairs of second portions each aligned along first parallel lines, the plurality of signal conductors further comprises a plurality of signal conductor pairs having pairs of intermediate portions and pairs of mating portions connected by transition regions, signal conductors of each signal conductor pair are aligned along the first parallel lines at a first portion of the transition region adjacent the pair of mating portions, and the signal conductors are aligned along second parallel lines disposed at a 45 degree angle relative to the first parallel lines at a second portion of the transition region adjacent the pair of intermediate portions.

In a sixth example, a connector comprises an insulative portion, a plurality of signal conductors held by the insulative portion, and a plurality of shielding members, the plurality of signal conductors comprise elongated mating portions extending from the insulative portion, the plurality of signal conductors comprise a plurality of pairs of signal conductors disposed in a plurality of rows extending in a row direction, the plurality of shielding members at least partially surround pairs of the plurality of pairs, and the mating portions of the plurality of pairs are separated along first parallel lines disposed an angle of 45 degrees relative to the row direction.

The plurality of shielding members may comprise electrically conductive shielding.

The insulative portion may comprise a planar portion having a first surface and a second surface, opposite the first surface, the mating portions extend in a direction perpendicular to the first surface, and the signal conductors further comprise tails that extend through the second surface.

The contact tails may be disposed in a second plurality of rows extending in a first direction and positioned along a second direction perpendicular to the first direction in a repeating pattern with center-to-center spacing between adjacent pairs of contact tails in the first direction of less than or equal to 5 mm and center-to-center spacing between adjacent pairs of contact tails in the second direction perpendicular to the first direction of less than or equal to 5 mm.

The contact tails may be disposed in a second plurality of rows extending in a first direction and positioned along a second direction perpendicular to the first direction in a repeating pattern with center-to-center spacing between adjacent pairs of contact tails in the first direction of less than or equal to 2.4 mm and center-to-center spacing between adjacent pairs of contact tails in the second direction perpendicular to the first direction of less than or equal to 2.4 mm.

The contact tails may be configured for inserting into holes having a diameter of less than or equal to 20 mils.

The contact tails may have a width of between 6 and 20 mils.

The contact tails may be configured for inserting into holes having a diameter of less than or equal to 10 mils.

The contact tails may have a width of between 6 and 10 mils.

The plurality of pairs of signal conductors may further comprise intermediate portions connected to the mating portions by transition regions, signal conductors of each pair of signal conductors are separated along the first parallel lines at a first portion of the transition region adjacent the mating portions, and the signal conductors may be separated along second parallel lines parallel to the row direction at a second portion of the transition region adjacent the intermediate portions.

It should be appreciated that aspects of each of the above described examples may be combined in a single embodiment. Further, optional aspects of each of the examples may be used alone or in combination.

Having thus described several aspects of at least one embodiment of this invention, it is to be appreciated that various alterations, modifications, and improvements will readily occur to those skilled in the art.

For example, FIG. 23 illustrates a pair of signal conductors 260' that has an angled mating interface, as described above in connection with signal conductors 260. Like signal conductors 260, signal conductors 260' have intermediate portions 264*a*' and 264*b*' that are broadside coupled. Unlike signal conductors 260, signal conductors 260' have broadside coupled contact tails 266*a*' and 266*b*', which are separated along line 144', which parallel to the row direction of the board mounting interface of a connector including signal conductors 260'. Signal conductors as shown in FIG. 23, may be incorporated into a connector using techniques as described herein.

For example, signal conductors 260*a* and 260*b* are described as being configured for carrying a differential signal. In other embodiments, modules 200 may contain conductors configured to carry a single ended electrical signal. For example, one signal conductor may carry a signal and the other may be grounded. Alternatively, in some embodiments, a single signal conductor may be used in place of a pair of signal conductors 260*a* and 260*b* in some embodiments with the ground reference carried by the electromagnetic shielding.

As another example, it is described that extender modules 300 are attached to connector modules using press fit connections. Other forms of attachment may be use, including separable contacts that are the same at both ends of the extender module or other forms of fixed attachment, such as soldering or brazing.

Further, electrical connectors 102*a-d* described herein may be adapted for any suitable configuration such as backplane or midplane. For example, in a backplane configuration, first connector 102*a* and second connector 102*b* may mate along a same direction which one of first contact tail array 136*a* and second contact tail array 136*b* faces and which the other one faces opposite. Alternatively, surfaces of substrate 104*c* onto which first contact tail array 136*a* is mounted and of a substrate 104*d* onto which second contact tail array 136*b* is mounted may be parallel to one another. In a further configuration, first contact tail array 136*a* and second contact tail array 136*b* may face a first direction, with first and second connectors 102*a* and 102*b* configured to mate along a direction perpendicular to the first direction.

It should be appreciated that, in some embodiments, connector module 200 may include a single insulative member rather than having separate outer insulative members 280*a* and 280*b* and inner insulative member 230. In some embodiments, connector module 200 includes one insulative member in place of outer insulative members 280*a* and 280*b*, and also includes inner insulative member 230. In some embodiments, a dielectric constant of outer insulative members 280*a* and 280*b* may differ from that of inner insulative member 230. Alternatively, outer insulative members 280*a* and 280*b* and inner insulative member 230 have substantially a same dielectric constant.

It should be appreciated that, rather than compliant receptacles 270*a* and 270*b*, mating ends 262 may include alternative mating components, such as pins, compliant beams or wires. Likewise, contact tails 266*a* and 266*b* may be alternatively configured for mounting in other ways than press fit, such as to conductive pads on a surface of a printed circuit board.

As yet another example, transition regions were described in which there is a twist of either 45 or 90 degrees. Other amounts of twist are possible in the transition regions. In some embodiments, parallel lines 138 are disposed at an angle of greater than 0 degrees and less than 90 degrees relative to mating row direction 142 or mating column direction 140. In some embodiments, parallel lines 138 are disposed at an angle of greater than 30 degrees and less than 60 degrees relative to mating row direction 142 or mating row direction 140. In some embodiments, parallel lines 138 are parallel to mating column direction 140 or mating row direction 142.

Likewise, in some embodiments, contact tail row direction 146 may be disposed at an angle greater than 45 degrees and less than 135 degrees relative to contact tail column direction 144. In some embodiments, contact tail row direction 146 may be disposed at an angle greater than 80 degrees and less than 100 degrees relative to contact tail column direction 144. In the illustrated embodiment, contact tail row direction 146 is perpendicular to contact tail column direction 144. However, in some embodiments, contact tail row direction 146 is parallel to contact tail column direction 144.

Moreover, the twist in each of two mating connectors may be the same, or may be different in angular amount. Further, the twist in each of two mating connectors may be in the same direction or in opposite directions. For example, in the embodiment illustrated in FIG. 16A, the twist is in a clockwise direction from the contact tails 266*a* and 266*b* to intermediate portions 264*a* and 264*b*. The twist is again in the clockwise direction from intermediate portions 264*a* and 264*b* to mating ends 262*a* and 262*b*. Either or both such twists may be in a counterclockwise direction, and the direction of twist in each transition region 268*a* and/or 268*b* may be the same or different in mating connectors. For example, the twist in the transition region 268*a* from intermediate portions 264*a* and 264*b* to mating ends 262*a* and 262*b* may be opposite in each of two mating connectors to support parallel board connector configurations.

As an example of a further variation, pairs of signal conductors could be configured without any twist in the pairs. The mating interfaces of each pair may be at an angle, such as 45 degrees, with respect to the mating interface row direction. The tails of each pair may be at the same angle with respect to the mounting interface row direction. Such a configuration may be used in a mezzanine, or other suitable style of connector, and may enable the footprint for the connector to occupy less surface area of a printed circuit board to which the connector is mounted.

It should be appreciated that, in some embodiments, contact tails of third contact tail array 136*c* are configured for inserting into holes having a diameter of less than or equal to 20 mils. In some embodiments, contact tails of third contact tail array 136*c* are configured for inserting into holes having a diameter of less than or equal to 10 mils. In some embodiments, contact tails of third contact tail array 136*c* each have a width between 6 and 20 mils. In some embodiments, contact tails of third contact tail array 136*c* each have a width between 6 and 10 mils.

As a further example of a possible variation, extender module 300 was illustrated with two electromagnetic shielding members that cover two opposing sides of the module. Alternatively, electromagnetic shielding may be implemented with a shielding member that covers, or partially covers, 3 sides or all 4 sides of the module. In some embodiments, the electromagnetic shielding member partially covers some or all sides with a gap on the partially covered side(s). Such shielding configurations may be implemented with one or more shielding members.

As another possible variation, it should be appreciated that, while some embodiments described herein include second portions 306*a* and 306*b* of extender module 300 implemented by contact tails, in some embodiments second portions 306*a* and 306*b* may be shaped like mating portions 304*a* and 304*b*. The mating portions may include pins configured to extend through apertures of extended portion 234 and may be sized to fit between arms 272*a* and 272*b* of compliant receptacles 270*a* and 270*b* such that the pins may be removed from compliant receptacles 270*a* and 270*b* without damage to either connector.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as “first,” “second,” “third,” etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

All definitions, as defined and used herein, should be understood to control over dictionary definitions, definitions in documents incorporated by reference, and/or ordinary meanings of the defined terms.

The indefinite articles “a” and “an,” as used herein in the specification and in the claims, unless clearly indicated to the contrary, should be understood to mean “at least one.”

As used herein in the specification and in the claims, the phrase “at least one,” in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase “at least one” refers, whether related or unrelated to those elements specifically identified.

The phrase “and/or,” as used herein in the specification and in the claims, should be understood to mean “either or both” of the elements so conjoined, i.e., elements that are conjunctively present in some cases and disjunctively present in other cases. Multiple elements listed with “and/or” should be construed in the same fashion, i.e., “one or more” of the elements so conjoined. Other elements may optionally be present other than the elements specifically identified by the “and/or” clause, whether related or unrelated to those elements specifically identified. Thus, as a non-limiting example, a reference to “A and/or B”, when used in conjunction with open-ended language such as “comprising” can refer, in one embodiment, to A only (optionally including elements other than B); in another embodiment, to B only (optionally including elements other than A); in yet another embodiment, to both A and B (optionally including other elements); etc.

As used herein in the specification and in the claims, “or” should be understood to have the same meaning as “and/or” as defined above. For example, when separating items in a list, “or” or “and/or” shall be interpreted as being inclusive, i.e., the inclusion of at least one, but also including more than one, of a number or list of elements, and, optionally, additional unlisted items. Only terms clearly indicated to the contrary, such as “only one of” or “exactly one of,” or, when used in the claims, “consisting of,” will refer to the inclusion of exactly one element of a number or list of elements. In general, the term “or” as used herein shall only be interpreted as indicating exclusive alternatives (i.e. “one or the other but not both”) when preceded by terms of exclusivity, such as “either,” “one of,” “only one of,” or “exactly one of.” “Consisting essentially of,” when used in the claims, shall have its ordinary meaning as used in the field of patent law.

Also, the phraseology and terminology used herein is for the purpose of description and should not be regarded as limiting. The use of “including,” “comprising,” or “having,” “containing,” “involving,” and variations thereof herein, is meant to encompass the items listed thereafter and equivalents thereof as well as additional items.

What is claimed is:

1. A connector module, comprising:

a pair of signal conductors, wherein:

the pair of signal conductors comprises a pair of mating ends, a pair of contact tails, and a pair of intermediate portions connecting the pair of mating ends to the pair of contact tails;

the pair of mating ends are elongated in a first direction that is at a right angle relative to a second direction in which the pair of contact tails are elongated;

the mating ends of the pair of mating ends are separated in a direction of a first line that is perpendicular to the first direction;

the intermediate portions of the pair of intermediate portions are broadside-coupled and are separated in a direction of a second line that is perpendicular to the first direction; and the first line is disposed at an angle greater than 0 degrees and less than 90 degrees relative to the second line.

2. The connector module of claim 1, wherein the first line is disposed at an angle greater than 30 degrees and less than 60 degrees relative to the second line.

3. The connector module of claim 2, wherein the first line is disposed at a 45-degree angle relative to the second line.

4. The connector module of claim 1, wherein the pair of signal conductors further comprises a transition region connecting the pair of intermediate portions to the pair of mating ends.

5. The connector module of claim 4, further comprising an electromagnetic shielding member that at least partially surrounds the pair of mating ends and is embossed with a projecting portion adjacent the transition region so as to offset changes in impedance along a length of the pair of signal conductors associated with changes in the shape of the pair of signal conductors along the length.

6. The connector module of claim 4, further comprising an electromagnetic shielding member that at least partially surrounds the pair of mating ends and is embossed with a projecting portion adjacent the pair of mating ends so as to reduce a disparity between a mated and partially demated impedance of the connector module.

7. The connector module of claim 4, wherein, at the transition region, a first signal conductor of the pair of signal conductors jogs towards a third line along which the pair of contact tails are separated, and a second signal conductor of the pair of signal conductors jogs away from the third line.

8. The connector module of claim 1, wherein the contact tails of the pair of contact tails are broadside-coupled.

9. A wafer, comprising:

a support; and a plurality of connector modules of claim 1 arranged in a column and held by the support, each connector module of the wafer further comprising an electromagnetic shielding member at least partially surrounding the mating ends of the pair of signal conductors.

10. A wafer, comprising:

a support; and a plurality of connector modules arranged in a column and held by the support, each connector module comprising a pair of signal conductors and an electromagnetic shielding member, wherein:

the pair of signal conductors comprises a pair of mating ends, a pair of contact tails, and a pair of intermediate portions connecting the pair of mating ends to the pair of contact tails;

the electromagnetic shielding member at least partially surrounds the pair of mating ends;

the pair of mating ends are elongated in a first direction;

the pair of contact tails are elongated in a second direction that is at a right angle relative to the first direction;

the mating ends of the pair of mating ends are separated in a direction of a first line that is perpendicular to the first direction;

the intermediate portions of the pair of intermediate portions are separated in a direction of a second line that is perpendicular to the first direction; and the first line is disposed at an angle greater than 0 degrees and less than 90 degrees relative to the second line.

11. The wafer of claim 10, wherein the first line is disposed at an angle greater than 30 degrees and less than 60 degrees relative to the second line.

12. The wafer of claim 11, wherein the first line is disposed at a 45-degree angle relative to the second line.

13. The wafer of claim 10, wherein the pair of signal conductors further comprises a transition region connecting the pair of intermediate portions to the pair of mating ends.

14. The wafer of claim 13, wherein the electromagnetic shielding member is embossed with a projecting portion adjacent the transition region so as to offset changes in impedance along a length of the pair of signal conductors associated with changes in the shape of the pair of signal conductors along the length.

15. The wafer of claim 13, wherein the electromagnetic shielding member is embossed with a projecting portion adjacent the pair of mating ends so as to reduce a disparity between a mated and partially demated impedance of the connector module.

16. The wafer of claim 13, wherein the electromagnetic shielding member is embossed with an outwardly projecting portion adjacent the transition region and an inwardly projecting portion adjacent the pair of mating ends.

17. The wafer of claim 10, wherein:

each connector module of the wafer comprises electromagnetic shielding;

the electromagnetic shielding comprises the electromagnetic shielding member as a first electromagnetic shielding member and further comprises a second electromagnetic shielding member; and each of the first and second electromagnetic shielding members comprises:

an intermediate portion;

a mating portion integral with the intermediate portion; and a transition between the mating portion and the intermediate portion, wherein the first and second electromagnetic shielding members twist at the angle of the first line with respect to the second line at the transition.

18. The wafer of claim 10, wherein:

each connector module of the wafer comprises electromagnetic shielding that includes the electromagnetic shielding member;

the electromagnetic shielding at least partially surrounds the pair of mating ends of the pair of signal conductors at a first portion along a length of the pair of signal conductors;

at the first portion, the electromagnetic shielding has a cross-section with a width less than 2 millimeters (mm) and a length less than 3.8 mm.

19. A connector, comprising:

a housing;

a first wafer and a second wafer, each supported by the housing and comprising a plurality of signal conductor pairs, wherein:

for each of the plurality of signal conductor pairs, the signal conductor pair comprises a pair of mating ends, a pair of contact tails, and a pair of intermediate portions connecting the pair of mating ends to the pair of contact tails;

the first and second wafers are disposed in an array comprising a plurality of rows, the plurality of rows extending along a row direction and spaced from each other in a column direction perpendicular to the row direction;

the first and second wafers are adjacent one another in the row direction;

the pairs of mating ends of the plurality of signal conductor pairs of the first and second wafers are aligned along first lines that are parallel to one another; and the first lines are disposed at an angle of greater than 30 degrees and less than 60 degrees relative to the row direction.

20. The connector of claim 19, wherein the first lines are disposed at an angle of 45 degrees relative to the row direction.

21. The connector of claim 19, wherein:

the signal conductor pair further comprises a transition region between the pair of mating ends and the pair of intermediate portions; and for each signal conductor pair of the plurality of signal conductor pairs of the first and second wafers, within the transition region, a relative position of the signal conductors of the signal conductor pair varies such that, at a first end of the transition region adjacent the mating ends, the signal conductors are aligned along a line of the first lines and, at a second end of the transition region, the signal conductors are aligned in the row direction.

22. The connector of claim 21, wherein the pairs of contact tails of the plurality of signal conductor pairs are arranged in a second array, the second array comprising columns of the pairs of contact tails that extend along a third direction.

23. The connector of claim 22, wherein the third direction is perpendicular to the row direction.

24. The connector of claim 23, wherein the third direction is perpendicular to both of the column direction and the row direction.

25. The connector of claim 22, wherein center-to-center spacing between adjacent pairs of contact tails in the second array is less than or equal to 5 millimeters (mm).

26. The connector of claim 25, wherein center-to-center spacing between adjacent pairs of contact tails in the second array is less than or equal to 2.4 mm.

27. A connector, comprising:

a support member;

a plurality of modules supported by the support member and disposed in at least one column extending in a column direction;

wherein:

for the modules of the plurality of modules within a column of the at least one column:

each module comprises a signal conductor pair and shielding at least partially surrounding the signal conductor pair;

the signal conductor pairs of the modules comprise respective pairs of mating ends that are aligned along respective first lines that are parallel to one another; and the plurality of modules within the column are positioned such that the first lines are disposed at an angle of greater than 30 degrees and less than 60 degrees relative to the column direction.

28. The connector of claim 27, wherein the at least one column comprises a plurality of columns and the plurality of signal conductor pairs of the plurality of columns are disposed in a plurality of rows.

29. The connector of claim 27, further comprising:

a second support member adjacent the support member along a row direction that is perpendicular to the column direction;

a second plurality of modules supported by the second support member and disposed in at least one second column extending in the column direction, wherein:

for the modules of the second plurality of modules within a second column of the at least one second column:

each module comprises a signal conductor pair and shielding at least partially surrounding the signal conductor pair; and the signal conductor pairs of the modules comprise respective pairs of mating ends that are aligned along respective second lines that are parallel to one another and to the first lines.

30. The connector of claim 27, wherein the shielding of each module of the plurality of modules is separate from the shielding of other modules of the plurality of modules.

* * * * *